United States Patent
Chatterjee et al.

(10) Patent No.: US 12,435,327 B2
(45) Date of Patent: Oct. 7, 2025

(54) GENETICALLY ENCODED TYROSINE SULFATION OF PROTEINS IN EUKARYOTES

(71) Applicant: Trustees of Boston College, Chestnut Hill, MA (US)

(72) Inventors: Abhishek Chatterjee, Lexington, MA (US); James S. Italia, Charlestown, MA (US)

(73) Assignee: Trustees of Boston College, Chestnut Hill (MA)

( * ) Notice: Subject to any disclaimer, the term of this patent is extended or adjusted under 35 U.S.C. 154(b) by 959 days.

(21) Appl. No.: 17/594,570

(22) PCT Filed: Apr. 23, 2020

(86) PCT No.: PCT/US2020/029567
§ 371 (c)(1),
(2) Date: Oct. 22, 2021

(87) PCT Pub. No.: WO2020/219708
PCT Pub. Date: Oct. 29, 2020

(65) Prior Publication Data
US 2022/0119793 A1    Apr. 21, 2022

Related U.S. Application Data

(60) Provisional application No. 62/837,217, filed on Apr. 23, 2019.

(51) Int. Cl.
C12N 9/00    (2006.01)
C12P 21/00   (2006.01)

(52) U.S. Cl.
CPC ............ *C12N 9/93* (2013.01); *C12P 21/00* (2013.01); *C12Y 601/01001* (2013.01)

(58) Field of Classification Search
None
See application file for complete search history.

(56) References Cited

U.S. PATENT DOCUMENTS

| | | | |
|---|---|---|---|
| 7,393,670 B2* | 7/2008 | Kiga | C12N 9/93 435/183 |
| 8,420,792 B2* | 4/2013 | Tian | C12N 9/93 435/325 |

FOREIGN PATENT DOCUMENTS

| | | |
|---|---|---|
| EP | 1424395 A1 | 6/2004 |
| WO | WO 2010/141851 A1 | 12/2010 |

OTHER PUBLICATIONS

Kiga, Daisuke; et al; "An engineered Escherichia coli tyrosyl-tRNA synthetase for site-specific incorporation of an unnatural amino acid into proteins in eukaryotic translation and its application in a wheat germ cell-free system" Proceedings of the National Academy of Science, 9715-9723, 2002 (Year: 2002).*

(Continued)

*Primary Examiner* — David W Berke-Schlessel
(74) *Attorney, Agent, or Firm* — HoustonHogle LLP

(57) ABSTRACT

An engineered tyrosyl-tRNA synthetase/tRNA pair that co-translationally incorporates O-sulfotyrosine in response to UAG codons in *E. coli* and mammalian cells is described herein. This platform enables recombinant expression of eukaryotic proteins homogeneously sulfated at chosen sites.

15 Claims, 29 Drawing Sheets

Specification includes a Sequence Listing.

(56) References Cited

OTHER PUBLICATIONS

Zhang, Jianzhi; "Rates of Conservative and Radical Nonsynonymous Nucleotide Substitutions in Mammalian Nuclear Genes" Journal of Molecular Evolution, 50, 56-68, 2000 (Year: 2000).*
Yampolsky, Lev Y; Stoltzfus, Arlin; "The Exchangeability of Amino Acids in Proteins" Genetics, 170, 1459-1472, 2005) (Year: 2005).*
Nehring, Sebastion; et al; "Performance Analysis of Orthogonal Pairs Designed for an Expanded Eukaryotic Genetic Code" PLoS One, 7, e31992, 2012 (Year: 2012).*
Chin, J. W., et al., "An expanded eukaryotic genetic code," Science, 301: 964-967 (2003).
Chin, J.W., "Expanding and reprogramming the genetic code," Nature, 550: 53-60 (2017).
Italia, J. S., et al. "An orthogonalized platform for genetic code expansion in both bacteria and eukaryotes," Nature chemical biology, 13: 446-450 (2017).
Italia, J. S., et al., "Expanding the genetic code of mammalian cells," Biochemical Society transactions, 45: 555-562 (2017).
Li, X., et al., "Characterization of a Sulfated Anti-HIV Antibody Using an Expanded Genetic Code," Biochemistry, 57(20): 2903-2907 (2018).
Liu, C. C., et al. "Crystal structure of a biosynthetic sulfo-hirudin complexed to thrombin," Journal of the American Chemical Society, 129: 10648-10649 (2007).
Mikkelsen, J., et al., "Heterogeneity in the tyrosine sulfation Chinese hamster ovary cell produced recombinant FVIII," Biochemistry,30: 1533-1537 (1991).
Stone, M. J., et al., "Homogeneous sulfopeptides and sulfoproteins: synthetic approaches and applications to characterize the effects of tyrosine sulfation on biochemical function," Accounts of chemical research, 48: 2251-2261 (2015).
Stone, M. J., et al., "Tyrosine sulfation: an increasingly recognised post-translational modification of secreted proteins," New biotechnology, 25: 299-317 (2009).
Thompson, R.E., et al., "Tyrosine sulfation modulates activity of tick-derived thrombin inhibitors," Nature chemistry, 9: 909 (2017).
Tollefsen, D. M., "Heparin cofactor II," Advances in experimental medicine and biology, 425: 35-44 (1997).
Tollefsen, D.M., "Heparin cofactor II modulates the response to vascular injury," Arteriosclerosis, thrombosis, and vascular biology, 27: 454-460 (2007).
Zheng, Y., et al., "Virus-enabled optimization and delivery of the genetic machinery for efficient unnatural amino acid mutagenesis in mammalian cells and tissues," ACS synthetic biology, 6: 13-18 (2016).

International Preliminary Report on Patentability, mailed on Nov. 4, 2021, from International Application No. PCT/US2020/029567, filed on Apr. 23, 2020. 7 pages.
Ciaccia, A. V., et al., "Arginine 200 of Heparin Cofactor II Promotes Intramolecular Interactions of the Acidic Domain Implication for Thrombin Inhibition," Journal of Biological Chemistry, 272: 14074-14079 (1997).
Dumas, A., et al., "Designing logical codon reassignment-Expanding the chemistry in biology," Chemical Science, 6: 50-69 (2015).
Farzan, M., et al., "Tyrosine sulfation of the amino terminus of CCR5 facilitates HIV-1 entry," Cell, 96: 667-676 (1999).
Hortin, G., et al., "Identification of two sites of sulfation of human heparin cofactor II," Journal of Biological Chemistry, 261: 15827-15830 (1986).
Huang, C.-c., et al., "Structural basis of tyrosine sulfation and VH-gene usage in antibodies that recognize the HIV type 1 coreceptor-binding site on gp120," Proceedings of the National Academy of Sciences of the United States of America, 101: 2706-2711 (2004).
Italia, J.S., et al., "Genetically Encoded Protein Sulfation in Mammalian Cells," Nature Chemical Biology, 16: 379-382 (2020).
Italia, J.S., et al., "Resurrecting the bacterial tyrosyl-tRNA synthetase/tRNA pair for expanding the genetic code of both *E. coli* and *Eukaryotes*," Cell chemical biology, 25: 1304-1312 (2018).
Liu, C.C., et al., "Recombinant expression of selectively sulfated proteins in *Escherichia coli*," Nature biotechnology, 24: 1436-1440 (2006).
Mitchell, J. W., et al., "Aspartic acid residues 72 and 75 and tyrosine-sulfate 73 of heparin cofactor II promote intramolecular interactions during glycosaminoglycan binding and thrombin inhibition," Journal of Biological Chemistry, 277: 19823-19830 (2002).
Moore, K. L., "Protein tyrosine sulfation: a critical posttranslation modification in plants and animals," Proceedings of the National Academy of Sciences of the United States of America, 106: 14741-14742 (2009).
Seibert, C., et al., "Toward a framework for sulfoproteomics: Synthesis and characterization of sulfotyrosine-containing peptides," Biopolymers, 90, 459-477 (2008).
Watson, E. E., et al., "Mosquito-Derived Anophelin Sulfoproteins Are Potent Antithrombotics," ACS central science, 4: 468-476 (2018).
Yang, Y.S., et al., "Tyrosine sulfation as a protein post-translational modification," Molecules (Basel, Switzerland) 20: 2138-2164 (2015).
Young, D. D., et al., "Playing with the molecules of life," ACS chemical biology (2018).
International Search Report and Written Opinion of the International Searching Authority, mailed on Aug. 7, 2020, from International Application No. PCT/US2020/029567, filed on Apr. 23, 2020. 15 pages.
Liu, C.C. et al., "Recombinant expression of selectively sulfated proteins in *Escherichia coli*," Nature Biotechnology, 24(11): 1436-1440 (2006).

* cited by examiner ttctctgtcacagaatgaaaattttctgtcatctcttcgttattaatgtttgtaattgactgaatatcaacgcttatttgcagcctgaatggcga
atgggacgcgccctgtagcggcgcattaagcgcggcgggtgtggtggttacgcgcagcgtgaccgctacacttgccagcgccctag
cgcccgctccttcgctttcttcccttccttctctcgccacgttcgccggctttccccgtcaagctctaaatcggggggctcccctttaggggttcc
gatttagtgctttacggcacctcgaccccaaaaaacttgattagggtgatggttcacgtagtgggccatcgccctgatagacggtttttcg
cccttgacgttggagtccacgttcttaatagtggactcttgttccaaactggaacaacactcaacccatctcggtctattctttgatttat
aagggattttgccgatttcggcctattggttaaaaaatgagctgatttaacaaaaatttaacgcgaattttaacaaaatattaacgtttacaat
tcaggtggcacttttcggggaaatgtgcgcggaaccccctatttgtttatttttctaaatacattcaaatatgtatccgctcatgagacaataa
ccctgataaatgcttcaataatattgaaaaaggaagagtatgagtattcaacatttccgtgtcgcccttattccttttttgcggcattttgcct
tcctgttttgctcacccagaaacgctggtgaaagtaaaagatgctgaagatcagttgggtgcacgagtgggttacatcgaactggatct
caacagcggtaagatccttgagagttttcgccccgaagaacgttttccaatgatgagcacttttaaagttctgctatgtggcgcggtattat
cccgtattgacgccgggcaagagcaactcggtcgccgcatacactattctcagaatgacttggttgagtactcaccagtcacagaaaa
gcatcttacggatggcatgacagtaagagaattatgcagtgctgccataaccatgagtgataacactgcggccaacttacttctgacaac
gatcggaggaccgaaggagctaaccgcttttttgcacaacatgggggatcatgtaactcgccttgatcgttgggaaccggagctgaat
gaagccataccaaacgacgagcgtgacaccacgatgcctgtagcaatggcaacaacgttgcgcaaactattaactggcgaactactt
actctagcttcccggcaacaattaatagactggatggaggcggataaagttgcaggaccacttctgcgctcggcccttccggctggctg
gtttattgctgataaatctggagccggtgagcgtgggtctcgcggtatcattgcagcactggggccagatggtaagccctcccgtatcgt
agttatctacacgacggggagtcaggcaactatggatgaacgaaatagacagatcgctgagataggtgcctcactgattaagcattggt
aactgtcagaccaagtttactcatatatactttagattgatttaaaacttcattttaatttaaaaggatctaggtgaagatcctttttgataatct
catgaccaaaatcccttaacgtgagttttcgttccactgagcgtcagaccccgtagaaaagatcaaaggatcttcttgagatccttttttct
gcgcgtaatctgctgcttgcaaacaaaaaaaccaccgctaccagcggtggtttgtttgccggatcaagagctaccaactctttttccgaa
ggtaactggcttcagcagagcgcagataccaaatactgtccttctagtgtagccgtagttaggccaccacttcaagaactctgtagcacc
gcctacatacctcgctctgctaatcctgttaccagtggctgctgccagtggcgataagtcgtgtcttaccgggttggactcaagacgata
gttaccggataaggcgcagcggtcgggctgaacggggggttcgtgcacacagcccagcttggagcgaacgacctacaccgaactg
agatacctacagcgtgagcattgagaaagcgccacgcttcccgaagggagaaaggcggacaggtatccggtaagcggcagggtcg
gaacaggagagcgcacgagggagcttccaggggaaacgcctggtatctttatagtcctgtcgggtttcgccacctctgacttgagcg
tcgatttttgtgatgctcgtcaggggggcggagcctatggaaaaacgccagcaacgcggcctttttacggttcctggccttttgctggcc
ttttgctcacatgttctttcctgcgttatcccctgattctgtggataaccgtattaccgcctttgagtgagctgataccgctcgccgcagccg
aacgaccgagcgcagcgagtcagtgagcgaggaagcggaagagcgcctgatgcggtattttctccttacgcatctgtgcggtatttca
caccgcagaccagccgcgtaacctggcaaaatcggttacggttgagtaataaatggatgccctgcgtaagcgggtgtgggcggaca
ataaagtcttaaactgaacaaaatagatctaaactatgacaataaagtcttaaactagacagaatagttgtaaactgaaatcagtccagtta
tgctgtgaaaagcatactggacttttgttatggctaaagcaaactcttcattttctgaagtgcaaattgcccgtcgtattaaagaggggcg
tggccaagggcatggtaaagactatattcgcggcgttgtgacaatttaccgaacaactccgcggccgggaagccgatctcggcttgaa
cgaattgttaggtggcggtacttgggtcgatatcaaagtgcatcacttcttcccgtatgcccaactttgtatagagagccactgcgggatc
gtcaccgtaatctgcttgcacgtagatcacataagcaccaagcgcgttggcctcatgcttgaggagattgatgagcgcggtggcaatg
ccctgcctccggtgctcgccggagactgcgagatcatagatatagatctcactacgcggctgctcaaacctgggcagaacgtaagcc
gcgagagcgccaacaaccgcttcttggtcgaaggcagcaagcgcgatgaatgtcttactacggagcaagttcccgaggtaatcgga
gtccggctgatgttgggagtaggtggctacgtctccgaactcacgaccgaaaagatcaagagcagcccgcatggatttgacttggtca
gggccgagcctacatgtgcgaatgatgcccatacttgagccacctaactttgttaggggcgactgccctgctgcgtaacatcgttgctg
ctgcgtaacatcgttgctgctccataacatcaaacatcgacccacggcgtaacgcgcttgctgcttggatgcccgaggcatagactgta caaaaaaacagtcataacaagccatgaaaaccgccactgcgccgttaccaccgctgcgttcggtcaaggttctggaccagttgcgtga
gcgcatacgctacttgcattacagtttacgaaccgaacaggcttatgtcaactgggttcgtgccttcatccgtttccacggtgtgcgtcac
ccggcaaccttgggcagcagcgaagtcgaggcatttctgtcctggctggcgaacgagcgcaaggtttcggtctccacgcatcgtcag
gcattggcggccttgctgttcttctacggcaaggtgctgtgcacggatctgccctggcttcaggagatcggtagacctcggccgtcgcg
gcgcttgccggtggtgctgaccccggatgaagtggttcgcatcctcggttttctggaaggcgagcatcgtttgttcgcccaggactcta
gctatagttctagtggttggctacgtacccgtagtggctatggcagggcttgcgcttaatgcgccgctacagggcgcgtggggataccc
cctagagccccagctggttctttccgcctcagaagccatagagcccaccgcatccccagcatgcctgctattgtcttcccaatcctcccc
cttgctgtcctgccccaccccaccccccagaatagaatgacacctactcagacaatgcgatgcaatttcctcatttattaggaaaggac
agtgggagtggcaccttccagggtcaaggaaggcacggggagggcaaacaacagatggctggcaactagaaggcacagtcg
aggctgatcagcgggtttaaacgggccctctagactcgagttatttccagcaaatcagacagtaattcttttttaccgcgacgcagtaagg
taaaacgaccaaacagacgatcttcttctttaaagaagtattcaggatcggactgttttttcaccgttaatggtgatggcattggaggcgata
gttttacgtgcctgaccacgggaaggttgcagttcagaatcgaccagtgcctgcatcaggtctgcgcccttttccatctcaaccatcggt
acgccgtcctgcgccagctgttcgaagtccgcttcactcagcgcactcaaagaaccgctgaacaggcattcggtaatacgttttgccgc
ctgtaaaccttcttcaccgtgaaccagacgagtcacctgctccgccagtacatactgggcgcgcggtgcttaccgctgttttatcttctt
cttccagggcgttgatctcttcaatgctcataaaggtgaagaacttcaggaagcggtaaacgtcggcatccgcagtgttgatccagaact
ggtagaatttgtacgggctggttttcttcggatccaaccagactgcgccgccttcagttttaccaaatttggtgccatctgctttagtgatca
gcggaacggtcaggccaaacacctgattctgatgcagacgacgggtcaggtcgataccagaagtgatgttaccccactggtcagaac
caccaatttgcagcaccacaccgtactgtttgttCAAacaggccatacTataaccctgCagcaggttgtaggaaaactcagtgaac
gaaatcccctgaTcttcacggttgagacgctgcttaaccgcttctttgttgatcatctggttaacggagaagtgtttgccaatatcgcgca
ggaaggtcagcacattcatattgccgaaccagtcataattattggccgcgatagcagagttttctccacagtcgaaatcgaggaacggg
gcaacctgcttacggattttgtccacccactcctgaacagtttcttcggtgttcagcttacgctcggcagctttgaagctcgggtcgccaat
cagacccgtcgcgccgcctaccagcgcaaccggcttgtggcccgcctgctggaagcgtttcaggcataacaatggaacaagatgcc
ccaaatgcaagctgtcagcggtaggatcgaagccacaCACgagtgcgatcgggccttgcgccagtcgctctgctaacgcttcctcg
tccgtcacctgggctaccagcccccgctcttgcaattgtttaatcaagttactgcttgccatGGTGGCgctagccagcttgggtctcc
ctatagtgagtcgtattaatttcgataagccagtaagcagtgggttctctagttagccagagagctCtagaccaagtgacgatcacagc
gatccacaaacaagaaccgcgacccaaatcccggctgcgacggaactagctgtgccacaccggcgcgtccttatataatcatcggc
gttcaccgccccacggagatccctccgcagaatcgccgagaagggactacttttcctcgcctgttccgctctctggaaagaaaaccag
tgccctagagtcacccaagtcccgtcctaaaatgtccttctgctgatactggggttctaaggccgagtcttatgagcagcgggccgctgt
cctgagcgtccgggcggaaggatcaggacgctcgctgcgcccttcgtctgacgtggcagcgctcgccgtgaggagggggcgcc
cgcgggaggcgccaaaacccggcgcggaggccttcgaacggCCACTAGCAAAAAATGGAGGGGGACG
GATTCGAACCGCCGAACCCAAAGGGAGCGGATTTAGAGTCCGCCGCGTTTAGCC
ACTTCGCTACCCCTCCGGTGTCTCTATCACTGATAGGGAACTTATAAGTCTCTATC
ACTGATAGGGATTTCACGTTTATGGTGATTTCCCAGAACACATAGCGACATGCAA
ATATTAAAAAATGGTGGGGGAAGGATTCGAACCTTCGAAGTCTGTGACGGCAGA
TTTAGAGTCTGCTCCCTTTGGCCGCTCGGGAACCCCACCGGTGTTTCGTCCTTTCC
ACAAGATATATAAAGCCAAGAAATCGAAATACTTTCAAGTTACGGTAAGCATAT
GATAGTCCATTTTAAAACATAATTTTAAAACTGCAAACTACCCAAGAAATTATTA
CTTTCTACGTCACGTATTTTGTACTAATATCTTTGTGTTTACAGTCAAATTAATTCT
AATTATCTCTCTAACAGCCTTGTATCGTATATGCAAATATGAAGGAATCATGGGA
AATAGGCCCTCTTCCTGCCCGAcCTAGCAAAAAATGGAGGGGGACGGATTCGAA
CCGCCGAACCCAAAGGGAGCGGATTTAGAGTCCGCCGCGTTTAGCCACTTCGCT Figure 13 (continued)

ACCCCTCCGGTGTCTCTATCACTGATAGGGAACTTATAAGTCTCTATCACTGATA
GGGATTTCACGTTTATGGTGATTTCCCAGAACACATAGCGACATGCAAATATTAA
AAAATGGTGGGGGAAGGATTCGAACCTTCGAAGTCTGTGACGGCAGATTTAGAG
TCTGCTCCCTTTGGCCGCTCGGGAACCCCACCGGTGTTTCGTCCTTTCCACAAGAT
ATATAAAGCCAAGAAATCGAAATACTTTCAAGTTACGGTAAGCATATGATAGTC
CATTTTAAAACATAATTTTAAAACTGCAAACTACCCAAGAAATTATTACTTTCTA
CGTCACGTATTTTGTACTAATATCTTTGTGTTTACAGTCAAATTAATTCTAATTAT
CTCTCTAACAGCCTTGTATCGTATATGCAAATATGAAGGAATCATGGGAAATAGG
CCCTCTTCCTGCCCGACCTAGCAAAAAATGGAGGGGGACGGATTCGAACCGCCG
AACCCAAAGGGAGCGGATTTAGAGTCCGCCGCGTTTAGCCACTTCGCTACCCCTC
CGGTGTCTCTATCACTGATAGGGAACTTATAAGTCTCTATCACTGATAGGGATTT
CACGTTTATGGTGATTTCCCAGAACACATAGCGACATGCAAATATTAAAAAATGG
TGGGGGAAGGATTCGAACCTTCGAAGTCTGTGACGGCAGATTTAGAGTCTGCTCC
CTTTGGCCGCTCGGGAACCCCACCGGTGTTTCGTCCTTTCCACAAGATATATAAA
GCCAAGAAATCGAAATACTTTCAAGTTACGGTAAGCATATGATAGTCCATTTTAA
AACATAATTTTAAAACTGCAAACTACCCAAGAAATTATTACTTTCTACGTCACGT
ATTTTGTACTAATATCTTTGTGTTTACAGTCAAATTAATTCTAATTATCTCTCTAA
CAGCCTTGTATCGTATATGCAAATATGAAGGAATCATGGGAAATAGGCCCTCTTC
CTGCCCGAcCTAGCAAAAAATGGAGGGGGACGGATTCGAACCGCCGAACCCAAA
GGGAGCGGATTTAGAGTCCGCCGCGTTTAGCCACTTCGCTACCCCTCCGGTGTCT
CTATCACTGATAGGGAACTTATAAGTCTCTATCACTGATAGGGATTTCACGTTTA
TGGTGATTTCCCAGAACACATAGCGACATGCAAATATTAAAAAATGGTGGGGGA
AGGATTCGAACCTTCGAAGTCTGTGACGGCAGATTTAGAGTCTGCTCCCTTTGGC
CGCTCGGGAACCCCACCGGTGTTTCGTCCTTTCCACAAGATATATAAAGCCAAGA
AATCGAAATACTTTCAAGTTACGGTAAGCATATGATAGTCCATTTTAAAACATAA
TTTTAAAACTGCAAACTACCCAAGAAATTATTACTTTCTACGTCACGTATTTTGTA
CTAATATCTTTGTGTTTACAGTCAAATTAATTCTAATTATCTCTCTAACAGCCTTG
TATCGTATATGCAAATATGAAGGAATCATGGGAAATAGGCCCTCTTCCTGCCCGA
CCTAGCAAAAAATGGAGGGGGACGGATTCGAACCGCCGAACCCAAAGGGAGCG
GATTTAGAGTCCGCCGCGTTTAGCCACTTCGCTACCCCTCCGGTGTCTCTATCACT
GATAGGGAACTTATAAGTCTCTATCACTGATAGGGATTTCACGTTTATGGTGATT
TCCCAGAACACATAGCGACATGCAAATATTAAAAAATGGTGGGGAAGGATTCG
AACCTTCGAAGTCTGTGACGGCAGATTTAGAGTCTGCTCCCTTTGGCCGCTCGGG
AACCCCACCGGTGTTTCGTCCTTTCCACAAGATATATAAAGCCAAGAAATCGAAA
TACTTTCAAGTTACGGTAAGCATATGATAGTCCATTTTAAAACATAATTTTAAAA
CTGCAAACTACCCAAGAAATTATTACTTTCTACGTCACGTATTTTGTACTAATATC
TTTGTGTTTACAGTCAAATTAATTCTAATTATCTCTCTAACAGCCTTGTATCGTAT
ATGCAAATATGAAGGAATCATGGGAAATAGGCCCTCTTCCTGCCCGAcCTAGCAA
AAAATGGAGGGGGACGGATTCGAACCGCCGAACCCAAAGGGAGCGGATTTAGA
GTCCGCCGCGTTTAGCCACTTCGCTACCCCTCCGGTGTCTCTATCACTGATAGGG

Figure 13 (continued)

AACTTATAAGTCTCTATCACTGATAGGGATTTCACGTTTATGGTGATTTCCCAGA
ACACATAGCGACATGCAAATATTAAAAAATGGTGGGGGAAGGATTCGAACCTTC
GAAGTCTGTGACGGCAGATTTAGAGTCTGCTCCCTTTGGCCGCTCGGGAACCCCA
CCGGTGTTTCGTCCTTTCCACAAGATATATAAAGCCAAGAAATCGAAATACTTTC
AAGTTACGGTAAGCATATGATAGTCCATTTTAAAACATAATTTTAAAACTGCAAA
CTACCCAAGAAATTATTACTTTCTACGTCACGTATTTTGTACTAATATCTTTGTGT
TTACAGTCAAATTAATTCTAATTATCTCTCTAACAGCCTTGTATCGTATATGCAAA
TATGAAGGAATCATGGGAAATAGGCCCTCTTCCTGCCCGACCTAGCAAAAAATG
GAGGGGGACGGATTCGAACCGCCGAACCCAAAGGGAGCGGATTTAGAGTCCGCC
GCGTTTAGCCACTTCGCTACCCCTCCGGTGTCTCTATCACTGATAGGGAACTTATA
AGTCTCTATCACTGATAGGGATTTCACGTTTATGGTGATTTCCCAGAACACATAG
CGACATGCAAATATTAAAAAATGGTGGGGGAAGGATTCGAACCTTCGAAGTCTG
TGACGGCAGATTTAGAGTCTGCTCCCTTTGGCCGCTCGGGAACCCCACCGGTGTT
TCGTCCTTTCCACAAGATATATAAAGCCAAGAAATCGAAATACTTTCAAGTTACG
GTAAGCATATGATAGTCCATTTTAAAACATAATTTTAAAACTGCAAACTACCCAA
GAAATTATTACTTTCTACGTCACGTATTTTGTACTAATATCTTTGTGTTTACAGTC
AAATTAATTCTAATTATCTCTCTAACAGCCTTGTATCGTATATGCAAATATGAAG
GAATCATGGGAAATAGGCCCTCTTCCTGCCCGAcCTAGCAAAAAATGGAGGGGG
ACGGATTCGAACCGCCGAACCCAAAGGGAGCGGATTTAGAGTCCGCCGCGTTTA
GCCACTTCGCTACCCCTCCGGTGTCTCTATCACTGATAGGGAACTTATAAGTCTCT
ATCACTGATAGGGATTTCACGTTTATGGTGATTTCCCAGAACACATAGCGACATG
CAAATATTAAAAAATGGTGGGGGAAGGATTCGAACCTTCGAAGTCTGTGACGGC
AGATTTAGAGTCTGCTCCCTTTGGCCGCTCGGGAACCCCACCGGTGTTTCGTCCTT
TCCACAAGATATATAAAGCCAAGAAATCGAAATACTTTCAAGTTACGGTAAGCA
TATGATAGTCCATTTTAAAACATAATTTTAAAACTGCAAACTACCCAAGAAATTA
TTACTTTCTACGTCACGTATTTTGTACTAATATCTTTGTGTTTACAGTCAAATTAA
TTCTAATTATCTCTCTAACAGCCTTGTATCGTATATGCAAATATGAAGGAATCAT
GGGAAATAGGCCCTCTTCCTGCCCGACctagtcaataatcaatgtcaacgcgtatatctggcccgtacatcgc
gaagcagcgcaaaacGGATCCtgcaggtatttGCGGCCGCggtccgtatactccggaatattaatagatcatggagataat
taaaatgataaccatctcgcaaataaataagtatttactgttttcgtaacagttttgtaataaaaaaacctataaatattccggattattcatac
cgtcccaccatcgggcgcgAACTCCTAAAAACCGCCACCatgaagtgccttttgtacttagccttttattcattgg
ggtgaattgcaagttcaccatagtttttccacacaaccaaaaaggaaactggaaaaatgttccttctaattaccattattgcccgtcaagct
cagatttaaattggcataatgacttaataggcacagccttacaagtcaaaatgcccaagagtcacaaggctattcaagcagacggttgg
atgtgtcatgcttccaaatgggtcactacttgtgatttccgctggtatggaccgaagtatataacacattccatccgatccttcactccatct
gtagaacaatgcaaggaaagcattgaacaaacgaaacaaggaacttggctgaatccaggcttccctcctcaaagttgtggatatgcaa
ctgtgacggatgccgaagcagtgattgtccaggtgactcctcaccatgtgctggttgatgaatacacaggagaatgggttgattcacag
ttcatcaacggaaaatgcagcaattacatatgccccactgtccataactctacaacctggcattctgactataaggtcaaagggctatgtg
attctaacctcatttccatggacatcaccttcttctcagaggacggagagctatcatccctgggaaaggagggcacagggttcagaagt
aactactttgcttatgaaactggaggcaaggcctgcaaaatgcaatactgcaagcattggggagtcagactcccatcaggtgtctggttc

```
gagatggctgataaggatctctttgctgcagccagattccctgaatgcccagaagggtcaagtatctctgctccatctcagacctcagtg
gatgtaagtctaattcaggacgttgagaggatcttggattattccctctgccaagaaacctggagcaaaatcagagcgggtcttccaatc
tctccagtggatctcagctatcttgctcctaaaaacccaggaaccggtcctgctttcaccataatcaatggtaccctaaaatactttgagac
cagatacatcagagtcgatattgctgctccaatcctctcaagaatggtcggaatgatcagtggaactaccacagaaagggaactgtgg
gatgactgggcaccatatgaagacgtggaaattggacccaatggagttctgaggaccagttcaggatataagtttcctttatacatgattg
gacatggtatgttggactccgatcttcatcttagctcaaaggctcaggtgttcgaacatcctcacattcaagacgctgcttcgcaacttcct
gatgatgagagtttatttttggtgatactgggctatccaaaaatccaatcgagcttgtagaaggttggttcagtagttggaaaagctctatt
gcctctttttctttatcatagggttaatcattggactattcttggttctccgagttggtatccatctttgcattaaattaaagcacaccaagaaa
agacagatttatacagacatagagatgaaccgacttggaaagtgataaggccaggccggccaagcttgtcgagaagtactagaggat
cataatcagccataccacatttgtagaggttttacttgctttaaaaaacctcccacacctcccctgaacctgaaacataaaatgaatgcaa
ttgttgttgttaacttgtttattgcagcttataatggttacaaataaagcaatagcatcacaaatttcacaaataaagcatttttttcactgcattc
tagttgtggtttgtccaaactcatcaatgtatcttatcatgtctggatctgatcactgcttgagcctaggagatccgaaccagataagtgaaa
tctagttccaaactattttgtcattttaatttcgtattagcttacgacgctacacccagttcccatctattttgtcactcttccctaaataatcctt
aaaaactccatttccaccccctcccagttcccaactattttgtccgcccacagcggggcattttcttcctgttatgttttaatcaaacatcctg
                ccaactccatgtgacaaaccgtcatcttcggctacttt
```

Figure 13 (continued)

cctgttatgttttaatcaaacatcctgccaactccatgtgacaaaccgtcatcttcggctactttttctctgtcacagaatgaaaattttctgt
catctcttcgttattaatgtttgtaattgactgaatatcaacgcttatttgcagcctgaatggcgaatgggacgcgccctgtagcggcgcatt
aagcgcggcgggtgtggtggttacgcgcagcgtgaccgctacacttgccagcgccctagcgcccgctccttcgctttcttccttcctt
tctcgccacgttcgccggctttccccgtcaagctctaaatcgggggctcccttaggggttccgatttagtgctttacggcacctcgacccc
aaaaaacttgattaggggtgatggttcacgtagtgggccatcgccctgatagacggttttcgcccttgacgttggagtccacgttctttaa
tagtggactcttgttccaaactggaacaacactcaaccctatctcggtctattcttttgatttataagggattttgccgatttcggcctattggt
taaaaaatgagctgatttaacaaaaatttaacgcgaattttaacaaaatattaacgtttacaatttcaggtggcacttttcggggaaatgtgc
gcggaaccccttattgtttattttttctaaatacattcaaatatgtatccgctcatgagacaataaccctgataaatgcttcaataatattgaaaa
aggaagagtatgagtattcaacatttccgtgtcgcccttattcccttttttgcggcattttgccttcctgttttttgctcacccagaaacgctggt
gaaagtaaaagatgctgaagatcagttgggtgcacgagtgggttacatcgaactggatctcaacagcggtaagatccttgagagttttc
gccccgaagaacgttttccaatgatgagcacttttaaagttctgctatgtggcgcggtattatcccgtattgacgccgggcaagagcaac
tcggtcgccgcatacactattctcagaatgacttggttgagtactcaccagtcacagaaaagcatcttacggatggcatgacagtaaga
gaattatgcagtgctgccataaccatgagtgataacactgcggccaacttacttctgacaacgatcggaggaccgaaggagctaaccg
cttttttgcacaacatgggggatcatgtaactcgccttgatcgttgggaaccggagctgaatgaagccataccaaacgacgagcgtgac
accacgatgcctgtagcaatggcaacaacgttgcgcaaactattaactggcgaactacttactctagcttcccggcaacaattaatagac
tggatggaggcggataaagttgcaggaccacttctgcgctcggcccttccggctggctggtttattgctgataaatctggagccggtga
gcgtgggtctcgcggtatcattgcagcactggggccagatggtaagccctcccgtatcgtagttatctacacgacggggagtcaggca
actatggatgaacgaaatagacagatcgctgagataggtgcctcactgattaagcattggtaactgtcagaccaagtttactcatatatac
tttagattgatttaaaacttcattttaatttaaaaggatctaggtgaagatcctttttgataatctcatgaccaaaatcccttaacgtgagttttc
gttccactgagcgtcagaccccgtagaaaagatcaaaggatcttcttgagatccttttttctgcgcgtaatctgctgcttgcaaacaaaaa
aaccaccgctaccagcggtggtttgtttgccggatcaagagctaccaactctttttccgaaggtaactggcttcagcagagcgcagata
ccaaatactgtccttctagtgtagccgtagttaggccaccacttcaagaactctgtagcaccgcctacatacctcgctctgctaatcctgtt
accagtggctgctgccagtggcgataagtcgtgtcttaccgggttggactcaagacgatagttaccggataaggcgcagcggtcggg
ctgaacggggggttcgtgcacacagcccagcttggagcgaacgacctacaccgaactgagatacctacagcgtgagcattgagaaa
gcgccacgcttcccgaagggagaaaggcggacaggtatccggtaagcggcagggtcggaacaggagagcgcacgagggagctt
ccaggggggaaacgcctggtatctttatagtcctgtcgggtttcgccacctctgacttgagcgtcgatttttgtgatgctcgtcaggggggc
ggagcctatggaaaaacgccagcaacgcggcctttttacggttcctggccttttgctggccttttgctcacatgttctttcctgcgttatccc
ctgattctgtggataaccgtattaccgcctttgagtgagctgataccgctcgccgcagccgaacgaccgagcgcagcgagtcagtgag
cgaggaagcggaagagcgcctgatgcggtattttctccttacgcatctgtgcggtatttcacaccgcagaccagccgcgtaacctggc
aaaatcggttacggttgagtaataaatgatgcctgcgtaagcgggtgtgggcggacaataaagtcttaaactgaacaaaatagatct
aaactatgacaataaagtcttaaactagacagaatagttgtaaactgaaatcagtccagttatgctgtgaaaaagcatactggacttttgtt
atggctaaagcaaactcttcattttctgaagtgcaaattgcccgtcgtattaaagaggggcgtggccaagggcatggtaaagactatatt
cgcggcgttgtgacaatttaccgaacaactccgcggccgggaagccgatctcggcttgaacgaattgttaggtggcggtacttgggtc
gatatcaaagtgcatcacttcttcccgtatgcccaactttgtatagagagccactgcgggatcgtcaccgtaatctgcttgcacgtagatc
acataagcaccaagcgcgttggcctcatgcttgaggagattgatgagcgcggtggcaatgccctgcctccggtgctcgccggagact
gcgagatcatagatatagatctcactacgcggctgctcaaacctgggcagaacgtaagccgcgagagcgccaacaaccgcttcttgg
tcgaaggcagcaagcgcgatgaatgtcttactacggagcaagttcccgaggtaatcggagtccggctgatgttgggagtaggtggct
acgtctccgaactcacgaccgaaaagatcaagagcagcccgcatggatttgacttggtcagggccgagcctacatgtgcgaatgatg
cccatacttgagccacctaactttgttttagggcgactgccctgctgcgtaacatcgttgctgctgcgtaacatcgttgctgctccataaca
tcaaacatcgacccacggcgtaacgcgcttgctgcttggatgcccgaggcatagactgtacaaaaaaacagtcataacaagccatga

Figure 15 aaaccgccactgcgccgttaccaccgctgcgttcggtcaaggttctggaccagttgcgtgagcgcatacgctacttgcattacagttac
gaaccgaacaggcttatgtcaactgggttcgtgccttcatccgtttccacggtgtgcgtcacccggcaaccttgggcagcagcgaagtc
gaggcatttctgtcctggctggcgaacgagcgcaaggtttcggtctccacgcatcgtcaggcattggcggccttgctgttcttctacggc
aaggtgctgtgcacggatctgccctggcttcaggagatcggtagacctcggccgtcgcggcgcttgccggtggtgctgaccccggat
gaagtggttcgcatcctcggttttctggaaggcgagcatcgtttgttcgcccaggactctagctatagttctagtggttggctacgtaccc
gtagtggctatggcagggcttgcgcttaatgcgccgctacagggcgcgtggggataccccctagagcccagctgAAAAAAT
GGAGGGGGACGGATTCGAACCGCCGAACCCAAAGGGAGCGGATTTAGAGTCCGC
CGCGTTTAGCCACTTCGCTACCCCTCCGGTGTCTCTATCACTGATAGGGAACTTAT
AAGTCTCTATCACTGATAGGGATTTCACGTTTATGGTGATTTCCCAGAACACATA
GCGACATGCAAATATTAAAAAATGGTGGGGGAAGGATTCGAACCTTCGAAGTCT
GTGACGGCAGATTTAGAGTCTGCTCCCTTTGGCCGCTCGGGAACCCCACCGGTGT
TTCGTCCTTTCCACAAGATATATAAAGCCAAGAAATCGAAATACTTTCAAGTTAC
GGTAAGCATATGATAGTCCATTTTAAAACATAATTTTAAAACTGCAAACTACCCA
AGAAATTATTACTTTCTACGTCACGTATTTTGTACTAATATCTTTGTGTTTACAGT
CAAATTAATTCTAATTATCTCTCTAACAGCCTTGTATCGTATATGCAAATATGAA
GGAATCATGGGAAATAGGCCCTCTTCCTGCCCGAGATCTGgttctttccgcctcagaagccatag
agcccaccgcatccccagcatgcctgctattgtcttcccaatcctcccccttgctgtcctgcccaccccacccccagaatagaatga
cacctactcagacaatgcgatgcaatttcctcatttattaggaaaggacagtgggagtggcaccttccagggtcaaggaaggcacgg
gggaggggcaaacaacagatggctggcaactagaaggcacagtcgaggctgatcagcgggtttaaacgggccctctagactcgag
ttaaagtcgacttaacgcgttgaattcttaaacgggcccttttccagcaaatcagacagtaattcttttaccgcgacgcagtaaggtaaaa
cgaccaaacagacgatcttcttctttaaagaagtattcaggatcggactgtttttcaccgttaatggtgatggcattggaggcgatagttta
cgtgcctgaccacgggaaggttgcagttcagaatcgaccagtgcctgcatcaggtctgcgccctttccatctcaaccatcggtacgcc
gtcctgcgccagctgttcgaagtccgcttcactcagcgcactcaaagaaccgctgaacaggcattcggtaatacgttttgccgcctgta
aaccttcttcaccgtgaaccagacgagtcacctgctccgccagtacatactgggcgcgcggtgctttaccgctgtttttatcttcttcttcc
agggcgttgatctcttcaatgctcataaaggtgaagaacttcaggaagcggtaaacgtcggcatccgcagtgttgatccagaactggta
gaatttgtacgggctggttttcttcgggtccaaccagactgcgccgccttcagttttaccaaatttggtgccatctgctttagtgatcagcg
gaacggtcaggccaaacacctgattctgatgcagacgacgggtcaggtcgataccagaagtgatgttacccattggtcagaaccac
caatttgcagcaccacaccgtactgtttgttagcacaggccataccataaccctggagcaggttgtaggaaaactcagtgaacgaaatc
ccctgaccttcacggttgagacgctgcttaaccgcttctttgttgatcatctggttaacggagaagtgtttgccaatatcgcgcaggaagg
tcagcacattcatattgccgaaccagtcataattattggccgcgatagcagagttttctccacagtcgaaatcgaggaacggggcaacct
gcttacggattttgtccacccactcctgaacagtttcttcggtgttcagcttacgctcggcagctttgaagctcgggtcgccaatcagacc
cgtcgcgccgcctaccagcgcaaccggcttgtggcccgcctgctggaagcgtttcaggcataacaatggaacaagatgccccaaat
gcaagctgtcagcggtaggatcgaagccacaaatgagtgcgatcgggccttgcgccagtcgctctgctaacgcttcctcgtccgtcac
ctgggctaccagcccccgctcttgcaattgtttaatcaagttactgcttgccatGGTGGCgctagccagcttgggtctccctatagtg
agtcgtattaatttcgataagccagtaagcagtgggttctctagttagccagagagctCtagaccaagtgacgatcacagcgatccaca
aacaagaaccgcgacccaaatcccggctgcgacggaactagctgtgccacacccggcgcgtcctatataatcatcggcgttcaccg
ccccacggagatccctccgcagaatcgccgagaagggactacttttcctcgccgtccgctctctggaaagaaaaccagtgccctag
agtcacccaagtcccgtcctaaaatgtccttctgctgatactggggttctaaggccgagtcttatgagcagcgggccgctgtcctgagc
gtccgggcggaaggatcaggacgctcgctgcgcccttcgtctgacgtggcagcgctcgccgtgaggaggggggcgcccgcggga
ggcgccaaaacccggcgcggaggccttcgaacggCCACTAGCAAAAAATGGAGGGGGACGGATTC
GAACCGCCGAACCCAAAGGGAGCGGATTTAGAGTCCGCCGCGTTTAGCCACTTC
GCTACCCCTCCGGTGTCTCTATCACTGATAGGGAACTTATAAGTCTCTATCACTG Figure 15 (continued)

```
ATAGGGATTTCACGTTTATGGTGATTTCCCAGAACACATAGCGACATGCAAATAT
TAAAAAATGGTGGGGGAAGGATTCGAACCTTCGAAGTCTGTGACGGCAGATTTA
GAGTCTGCTCCCTTTGGCCGCTCGGGAACCCCACCGGTGTTTCGTCCTTTCCACA
AGATATATAAAGCCAAGAAATCGAAATACTTTCAAGTTACGGTAAGCATATGAT
AGTCCATTTTAAAACATAATTTTAAAACTGCAAACTACCCAAGAAATTATTACTT
TCTACGTCACGTATTTTGTACTAATATCTTTGTGTTTACAGTCAAATTAATTCTAA
TTATCTCTCTAACAGCCTTGTATCGTATATGCAAATATGAAGGAATCATGGGAAA
TAGGCCCTCTTCCTGCCCGAcCTAGCAAAAAATGGAGGGGGACGGATTCGAACCG
CCGAACCCAAAGGGAGCGGATTTAGAGTCCGCCGCGTTTAGCCACTTCGCTACCC
CTCCGGTGTCTCTATCACTGATAGGGAACTTATAAGTCTCTATCACTGATAGGGA
TTTCACGTTTATGGTGATTTCCCAGAACACATAGCGACATGCAAATATTAAAAAA
TGGTGGGGGAAGGATTCGAACCTTCGAAGTCTGTGACGGCAGATTTAGAGTCTG
CTCCCTTTGGCCGCTCGGGAACCCCACCGGTGTTTCGTCCTTTCCACAAGATATAT
AAAGCCAAGAAATCGAAATACTTTCAAGTTACGGTAAGCATATGATAGTCCATTT
TAAAACATAATTTTAAAACTGCAAACTACCCAAGAAATTATTACTTTCTACGTCA
CGTATTTTGTACTAATATCTTTGTGTTTACAGTCAAATTAATTCTAATTATCTCTCT
AACAGCCTTGTATCGTATATGCAAATATGAAGGAATCATGGGAAATAGGCCCTCT
TCCTGCCCGACCTAGCAAAAAATGGAGGGGGACGGATTCGAACCGCCGAACCCA
AAGGGAGCGGATTTAGAGTCCGCCGCGTTTAGCCACTTCGCTACCCCTCCGGTGT
CTCTATCACTGATAGGGAACTTATAAGTCTCTATCACTGATAGGGATTTCACGTTT
ATGGTGATTTCCCAGAACACATAGCGACATGCAAATATTAAAAAATGGTGGGGG
AAGGATTCGAACCTTCGAAGTCTGTGACGGCAGATTTAGAGTCTGCTCCCTTTGG
CCGCTCGGGAACCCCACCGGTGTTTCGTCCTTTCCACAAGATATATAAAGCCAAG
AAATCGAAATACTTTCAAGTTACGGTAAGCATATGATAGTCCATTTTAAAACATA
ATTTTAAAACTGCAAACTACCCAAGAAATTATTACTTTCTACGTCACGTATTTTGT
ACTAATATCTTTGTGTTTACAGTCAAATTAATTCTAATTATCTCTCTAACAGCCTT
GTATCGTATATGCAAATATGAAGGAATCATGGGAAATAGGCCCTCTTCCTGCCCG
AcCTAGCAAAAAATGGAGGGGGACGGATTCGAACCGCCGAACCCAAAGGGAGCG
GATTTAGAGTCCGCCGCGTTTAGCCACTTCGCTACCCCTCCGGTGTCTCTATCACT
GATAGGGAACTTATAAGTCTCTATCACTGATAGGGATTTCACGTTTATGGTGATT
TCCCAGAACACATAGCGACATGCAAATATTAAAAAATGGTGGGGGAAGGATTCG
AACCTTCGAAGTCTGTGACGGCAGATTTAGAGTCTGCTCCCTTTGGCCGCTCGGG
AACCCCACCGGTGTTTCGTCCTTTCCACAAGATATATAAAGCCAAGAAATCGAAA
TACTTTCAAGTTACGGTAAGCATATGATAGTCCATTTTAAAACATAATTTTAAAA
CTGCAAACTACCCAAGAAATTATTACTTTCTACGTCACGTATTTTGTACTAATATC
TTTGTGTTTACAGTCAAATTAATTCTAATTATCTCTCTAACAGCCTTGTATCGTAT
ATGCAAATATGAAGGAATCATGGGAAATAGGCCCTCTTCCTGCCCGACCTAGCA
AAAAATGGAGGGGGACGGATTCGAACCGCCGAACCCAAAGGGAGCGGATTTAG
AGTCCGCCGCGTTTAGCCACTTCGCTACCCCTCCGGTGTCTCTATCACTGATAGG
GAACTTATAAGTCTCTATCACTGATAGGGATTTCACGTTTATGGTGATTTCCCAG
AACACATAGCGACATGCAAATATTAAAAAATGGTGGGGGAAGGATTCGAACCTT
CGAAGTCTGTGACGGCAGATTTAGAGTCTGCTCCCTTTGGCCGCTCGGGAACCCC
```

Figure 15 (continued)

ACCGGTGTTTCGTCCTTTCCACAAGATATATAAAGCCAAGAAATCGAAATACTTT
CAAGTTACGGTAAGCATATGATAGTCCATTTTAAAACATAATTTTAAAACTGCAA
ACTACCCAAGAAATTATTACTTTCTACGTCACGTATTTTGTACTAATATCTTTGTG
TTTACAGTCAAATTAATTCTAATTATCTCTCTAACAGCCTTGTATCGTATATGCAA
ATATGAAGGAATCATGGGAAATAGGCCCTCTTCCTGCCCGAcCTAGCAAAAAATG
GAGGGGGACGGATTCGAACCGCCGAACCCAAAGGGAGCGGATTTAGAGTCCGCC
GCGTTTAGCCACTTCGCTACCCCTCCGGTGTCTCTATCACTGATAGGGAACTTATA
AGTCTCTATCACTGATAGGGATTTCACGTTTATGGTGATTTCCCAGAACACATAG
CGACATGCAAATATTAAAAAATGGTGGGGGAAGGATTCGAACCTTCGAAGTCTG
TGACGGCAGATTTAGAGTCTGCTCCCTTTGGCCGCTCGGGAACCCCACCGGTGTT
TCGTCCTTTCCACAAGATATATAAAGCCAAGAAATCGAAATACTTTCAAGTTACG
GTAAGCATATGATAGTCCATTTTAAAACATAATTTTAAAACTGCAAACTACCCAA
GAAATTATTACTTTCTACGTCACGTATTTTGTACTAATATCTTTGTGTTTACAGTC
AAATTAATTCTAATTATCTCTCTAACAGCCTTGTATCGTATATGCAAATATGAAG
GAATCATGGGAAATAGGCCCTCTTCCTGCCCGACCTAGCAAAAAATGGAGGGGG
ACGGATTCGAACCGCCGAACCCAAAGGGAGCGGATTTAGAGTCCGCCGCGTTTA
GCCACTTCGCTACCCCTCCGGTGTCTCTATCACTGATAGGGAACTTATAAGTCTCT
ATCACTGATAGGGATTTCACGTTTATGGTGATTTCCCAGAACACATAGCGACATG
CAAATATTAAAAAATGGTGGGGGAAGGATTCGAACCTTCGAAGTCTGTGACGGC
AGATTTAGAGTCTGCTCCCTTTGGCCGCTCGGGAACCCCACCGGTGTTTCGTCCTT
TCCACAAGATATATAAAGCCAAGAAATCGAAATACTTTCAAGTTACGGTAAGCA
TATGATAGTCCATTTTAAAACATAATTTTAAAACTGCAAACTACCCAAGAAATTA
TTACTTTCTACGTCACGTATTTTGTACTAATATCTTTGTGTTTACAGTCAAATTAA
TTCTAATTATCTCTCTAACAGCCTTGTATCGTATATGCAAATATGAAGGAATCAT
GGGAAATAGGCCCTCTTCCTGCCCGAcCTAGCAAAAAATGGAGGGGGACGGATT
CGAACCGCCGAACCCAAAGGGAGCGGATTTAGAGTCCGCCGCGTTTAGCCACTT
CGCTACCCCTCCGGTGTCTCTATCACTGATAGGGAACTTATAAGTCTCTATCACTG
ATAGGGATTTCACGTTTATGGTGATTTCCCAGAACACATAGCGACATGCAAATAT
TAAAAAATGGTGGGGGAAGGATTCGAACCTTCGAAGTCTGTGACGGCAGATTTA
GAGTCTGCTCCCTTTGGCCGCTCGGGAACCCCACCGGTGTTTCGTCCTTTCCACA
AGATATATAAAGCCAAGAAATCGAAATACTTTCAAGTTACGGTAAGCATATGAT
AGTCCATTTTAAAACATAATTTTAAAACTGCAAACTACCCAAGAAATTATTACTT
TCTACGTCACGTATTTTGTACTAATATCTTTGTGTTTACAGTCAAATTAATTCTAA
TTATCTCTCTAACAGCCTTGTATCGTATATGCAAATATGAAGGAATCATGGGAAA
TAGGCCCTCTTCCTGCCCGACctagtcaataatcaatgtcaacgcgtatatctggcccgtacatcgcgaagcagcgc
aaaacGGATCCtgcaggtatttGCGGCCGCggtccgtatactccggaatattaatagatcatggagataattaaaatgataa
ccatctcgcaaataaataagtatttactgttttcgtaacagtttttgtaataaaaaaacctataaatattccggattattcataccgtcccacca
tcgggcgcgAACTCCTAAAAAACCGCCACCatgaagtgccttttgtacttagccttttattcattggggtgaattgca
agtcaccatagtttttccacacaaccaaaaaggaaactggaaaaatgttccttctaattaccattattgcccgtcaagctcagatttaaatt
ggcataatgacttaataggcacagccttacaagtcaaaatgcccaagagtcacaaggctattcaagcagacggttggatgtgtcatgct Figure 15 (continued)

tccaaatgggtcactacttgtgatttccgctggtatggaccgaagtatataacacattccatccgatccttcactccatctgtagaacaatg
caaggaaagcattgaacaaacgaaacaaggaacttggctgaatccaggcttccctcctcaaagttgtggatatgcaactgtgacggat
gccgaagcagtgattgtccaggtgactcctcaccatgtgctggttgatgaatacacaggagaatgggttgattcacagttcatcaacgg
aaaatgcagcaattacatatgccccactgtccataactctacaacctggcattctgactataaggtcaaagggctatgtgattctaacctc
atttccatggacatcaccttcttctcagaggacggagagctatcatccctgggaaaggagggcacagggttcagaagtaactactttgct
tatgaaactggaggcaaggcctgcaaaatgcaatactgcaagcattggggagtcagactcccatcaggtgtctggttcgagatggctg
ataaggatctctttgctgcagccagattccctgaatgcccagaagggtcaagtatctctgctccatctcagacctcagtggatgtaagtct
aattcaggacgttgagaggatcttggattattccctctgccaagaaacctggagcaaaatcagagcgggtcttccaatctctccagtgga
tctcagctatcttgctcctaaaaacccaggaaccggtcctgctttcaccataatcaatggtaccctaaaatactttgagaccagatacatca
gagtcgatattgctgctccaatcctctcaagaatggtcggaatgatcagtggaactaccacagaaagggaactgtgggatgactgggc
accatatgaagacgtggaaattggacccaatggagttctgaggaccagttcaggatataagtttcctttatacatgattggacatggtatg
ttggactccgatcttcatcttagctcaaaggctcaggtgttcgaacatcctcacattcaagacgctgcttcgcaacttcctgatgatgagag
tttatttttggtgatactgggctatccaaaaatccaatcgagcttgtagaaggttggttcagtagttggaaaagctctattgcctcttttttcttt
atcatagggttaatcattggactattcttggttctccgagttggtatccatctttgcattaaattaaagcacaccaagaaaagacagatttata
cagacatagagatgaaccgacttggaaagtgataagtcgagaagtactagaggatcataatcagccataccacatttgtagaggtttta
cttgctttaaaaaacctcccacacctcccccctgaacctgaaacataaaatgaatgcaattgttgttgttaacttgtttattgcagcttataatg
gttacaaataaagcaatagcatcacaaatttcacaaataaagcattttttcactgcattctagttgtggtttgtccaaactcatcaatgtatctt
atcatgtctggatctgatcactgcttgagcCTAGTTATTAATAGTAATCAATTACGGGGTCATTAGTT
CATAGCCCATATATGGAGTTCCGCGTTACATAACTTACGGTAAATGGCCCGCCTG
GCTGACCGCCCAACGACCCCCGCCCATTGACGTCAATAATGACGTATGTTCCCAT
AGTAACGCCAATAGGGACTTTCCATTGACGTCAATGGGTGGAgTATTTACGGTAA
ACTGCCCACTTGGCAGTACATCAAGTGTATCATATGCCAAGTACGCCCCCTATTG
ACGTCAATGACGGTAAATGGCCCGCCTGGCATTATGCCCAGTACATGACCTTATG
GGACTTTCCTACTTGGCAGTACATCTACGTATTAGTCATCGCTATTACCATGGTCG
AGGTGAGCCCCACGTTCTGCTTCACTCTCCCCATCTCCCCCCCCTCCCCACCCCCA
ATTTTGTATTTATTTATTTTTTAATTATTTTGTGCAGCGATGGGGGCGGGGGGGGG
GGGGGCGCGCGCCAGGCGGGGCGGGGCGGGGCGAGGGGCGGGGCGGGGCGAG
GCGGAGAGGTGCGGCGGCAGCCAATCAGAGCGGCGCGCTCCGAAAGTTTCCTTT
TATGGCGAGGCGGCGGCGGCGGCGGCCCTATAAAAGCGAAGCGCGCGGCGGG
CGGGAGTCGCTGCGTTGCCTTCGCCCCGTGCCCCGCTCCGCGCCGCCTCGCGCCG
CCCGCCCCGGCTCTGACTGACCGCGTTACTCCCACAGGTGAGCGGGCGGGACGG
CCCTTCTCCTCCGGGCTGTAATTAGCGCTTGGTTTAATGACGGCTCGTTTCTTTTC
TGTGGCTGCGTGAAAGCCTTAAAGGGCTCCGGGAGGGCCCTTTGTGCGGGGGGG
AGCGGCTCGGGGGGTGCGTGCGTGTGTGTGCGTGGGGAGCGCCGCGTGCGGC
CCGCGCTGCCCGGCGGCTGTGAGCGCTGCGGGCGCGGCGCGGGCTTTGTGCGC
TCCGCGTGTGCGCGAGGGGAGCGCGGCCGGGGCGGTGCCCCGCGGTGCGGGGG
GGCTGCGAGGGGAACAAAGGCTGCGTGCGGGGTGTGTGCGTGGGGGGTGAGC
AGGGGGTGTGGGCGCGGCGGTCGGGCTGTAACCCCCCCCTGCACCCCCCTCCCC
GAGTTGCTGAGCACGGCCCGGCTTCGGGTGCGGGGCTCCGTGCGGGCGTGGCG
CGGGGCTCGCCGTGCCGGGCGGGGGGTGGCGGCAGGTGGGGGTGCCGGGCGGG Figure 15 (continued)

GCGGGGCCGCCTCGGGCCGGGGAGGGCTCGGGGGAGGGGCGCGGCGGCCCCGG
AGCGCCGGCGGCTGTCGAGGCGCGGCGAGCCGCAGCCATTGCCTTTTATGGTAAT
CGTGCGAGAGGGCGCAGGGACTTCCTTTGTCCCAAATCTGGCGGAGCCGAAATC
TGGGAGGCGCCGCCGCACCCCTCTAGCGGGCGCGGGCGAAGCGGTGCGGCGCC
GGCAGGAAGGAAATGGGCGGGGAGGGCCTTCGTGCGTCGCCGCGCCGCCGTCCC
CTTCTCCATCTCCAGCCTCGGGGCTGCCGCAGGGGGACGGCTGCCTTCGGGGGGG
ACGGGGCAGGGCGGGGTTCGGCTTCTGGCGTGTGACCGGCGGCTCTAGAGCCTC
TGCTAACCATGTTCATGCCTTCTTCTTTTCCTACAGCTCCTGGGCAACGTGCTGG
TTaTTGTGCTGTCTCATCATTTTGGCAAAGAATTGGCCAAGGAGGCCACCatgaaacac
tcattaaacgcacttctcattttcctcatcataacatctgcgtgggtgggagcaaaggcccgctggatcagctagagaaaggaggggga
aactgctcagtctgcagatcccagtggagcagttaaataacaaaaacctgagcatgcctcttctccctgccgacttccacaaggaaa
acaccgtcaccaacgactggattccagagggggaggaggacgacgactatctggacctggagaagatattcagtgaagacgacga
ctacatcgacatcgtcgacagtctgtcagtttccccgacagactctgatgtgagtgctgggaacatcctccagcttttcatggcaagagc
cggatccagcgtcttaacatcctcaacgccaagttcgctttcaacctctaccgagtgctgaaagaccaggtcaacactttcgataacatct tcatagcacccgttggcatttctactgcgatgggtatgatttccttaggtctgaagggagagacccatgaacaagtgcactcgatttgca
ttttaaagactttgttaatgccagcagcaagtatgaaatcacgaccattcataatctcttccgtaagctgactcatcgcctcttcaggagga
atttttgggtacacactgcggtcagtcaatgaccttatatccagaagcagtttccaatcctgcttgacttcaaaactaaagtaagagagtatt
actttgctgaggcccagatagctgacttctcagaccctgccttcatatcaaaaaccaacaaccacatcatgaagctcaccaagggcctc
ataaaagatgctctggagaatatagacccctgctacccagatgatgattctcaactgcatctacttcaaaggatcctgggtgaataaattcc
cagtggaaaatgacacacaaccacaacttccggctgaatgagagagagaggtagttaaggtttccatgatgcagaccaaggggaacttcct
cgcagcaaatgaccaggagctggactgcgacatcctccagctggaatacgtgggggcatcagcatgctaattgtggtcccacacaa
gatgtctgggatgaagaccctcgaagcgcaactgacaccccgggtggtggagagatggcaaaaaagcatgacaaacagaactcga
gaagtgcttctgccgaaattcaagctggagaagaactacaatctagtggagtccctgaagttgatggggatcaggatgctgtttgacaa
aaatggcaacatggcaggcatctcagaccaaaggatcgccatcgacctgttcaagcaccaaggcacgatcacagtgaacgaggaag
gcacccaagccaccactgtgaccacggtggggttcatgccgctgtccacccaagtccgcttcactgtcgaccgcccctttcttttcctca
tctacgagcaCcgcaccagctgcctgctcttcatggaagagtggccaacccagcaggtccCATCATCACCATCAT
CATCACCACCATCATtGAggcctggccggccgccagcacagtggtcgatcgaCCAATGCCCTGGCTC
ACAAATACCACTGAGATCTTTTTCCCTCTGCCAAAAATTATGGGGACATCATGAA
GCCCCTTGAGCATCTGACTTCTGGCTAATAAAGGAAATTTATTTTCATTGCAATA
GTGTGTTGGAATTTTTTGTGTCTCTCACTCGGAAGGACATATGGGAGGGCAAATC
ATTTAAAACATCAGAATGAGTATTTGGTTTAGAGTTTGGCAACATATGCCcATAT
GCTGGCTGCCATGAACAAAGGTtGGCTATAAAGAGGTCATCAGTATATGAAACAG
CCCCCTGCTGTCCATTCCTTATTCCATAGAAAAGCCTTGACTTGAGGTTAGATTTT
TTTTATATTTGTTTTGTGTTATTTTTTCTTTAACATCCCTAAAATTTTCCTTACAT
GTTTACTAGCCAGATTTTCCTCCTCTCCTGACTACTCCCAGTCATAGCTGTCCC
TCTTCTCTTATGgAGATCCCTCGACCTGCcctaggTCGGGCAGGAAGAGGGCCTATTT
CCCATGATTCCTTCATATTTGCATATACGATACAAGGCTGTTAGAGAGATAATTA
GAATTAATTTGACTGTAAACACAAAGATATTAGTACAAAATACGTGACGTAGAA
AGTAATAATTTCTTGGGTAGTTTGCAGTTTTAAAATTATGTTTTAAAATGGACTAT Figure 15 (continued)

CATATGCTTACCGTAACTTGAAAGTATTTCGATTTCTTGGCTTTATATATCTTGTG
GAAAGGACGAAACACCGGTGGGGTTCCCGAGCGGCCAAAGGGAGCAGACTCTA
AATCTGCCGTCACAGACTTCGAAGGTTCGAATCCTTCCCCCACCATTTTTAATAT
TTGCATGTCGCTATGTGTTCTGGGAAATCACCATAAACGTGAAATCCCTATCAGT
GATAGAGACTTATAAGTTCCCTATCAGTGATAGAGACACCGGAGGGGTAGCGAA
GTGGCTAAACGCGGCGGACTCTAAATCCGCTCCCTTTGGGTTCGGCGGTCGAAT
CCGTCCCCcTCCATTTTTTgctaggagatccgaaccagataagtgaaatctagttccaaactattttgtcatttttaattttc
gtattagcttacgacgctacacccagttcccatctattttgtcactcttccctaaataatccttaaaaactccatttccacccctcccagttccc
aactattttgtccgcccacagcggggcattttct Figure 15 (continued)

SEQ ID NO: 1

EcTyr-RS (wild-type):

MASSNLIKQLQERGLVAQVTDEEALAERLAQGPIALYCGFDPTADSLHLGHLVPLLCLKRFQQAGHKPVA

LVGGATGLIGDPSFKAAERKLNTEETVQEWVDKIRKQVAPFLDFDCGENSAIAANNYDWFGNMNVLTFLR

DIGKHFSVNQMINKEAVKQRLNREDQGISFTEFSYNLLQGYDFACLNKQYGVVLQIGGSDQWGNITSGID

LTRRLHQNQVFGLTVPLITKADGTKFGKTEGGAVWLDPKKTSPYKFYQFWINTADADVYRFLKFFTFMSI

EEINALEEEDKNSGKAPRAQYVLAEQVTRLVHGEEGLQAAKRITECLFSGSLSALSEADFEQLAQDGVPM

VEMEKGADLMQALVDSELQPSRGQARKTIASNAITINGEKQSDPEYFFKEEDRLFGRFTLLRRGKKNYCL

ICWK

Figure 16A

SEQ ID NO: 4

EcTyr-RS (VGL):

MASSNLIKQLQERGLVAQVTDEEALAERLAQGPIALYCGFDPTADSLHLGHLVPLLCLKRFQQAGHKPVA

VVGGATGLIGDPSFKAAERKLNTEETVQEWVDKIRKQVAPFLDFDCGENSAIAANNYDWFGNMNVLTFLR

DIGKHFSVNQMINKEAVKQRLNREDQGISFTEFSYNLLQGYGFACLNKQYGVVLQIGGSDQWGNITSGID

LTRRLHQNQVFGLTVPLITKADGTKFGKTEGGAVWLDPKKTSPYKFYQFWINTADADVYRFLKFFTFMSI

EEINALEEEDKNSGKAPRAQYVLAEQVTRLVHGEEGLQAAKRITECLFSGSLSALSEADFEQLAQDGVPM

VEMEKGADLMQALVDSELQPSRGQARKTIASNAITINGEKQSDPEYFFKEEDRLFGRFTLLRRGKKNYCL

ICWK

Figure 16B

SEQ ID NO: 5

EcTyr-RS (VGM):

MASSNLIKQLQERGLVAQVTDEEALAERLAQGPIALYCGFDPTADSLHLGHLVPLLCLKRFQQAGHKPVA
VVGGATGLIGDPSFKAAERKLNTEETVQEWVDKIRKQVAPFLDFDCGENSAIAANNYDWFGNMNVLTFLR
DIGKHFSVNQMINKEAVKQRLNREDQGISFTEFSYNLLQGYGFACMNKQYGVVLQIGGSDQWGNITSGID
LTRRLHQNQVFGLTVPLITKADGTKFGKTEGGAVWLDPKKTSPYKFYQFWINTADADVYRFLKFFTFMSI
EEINALEEEDKNSGKAPRAQYVLAEQVTRLVHGEEGLQAAKRITECLFSGSLSALSEADFEQLAQDGVPM
VEMEKGADLMQALVDSELQPSRGQARKTIASNAITINGEKQSDPEYFFKEEDRLFGRFTLLRRGKKNYCL
ICWK

Figure 16C

SEQ ID NO: 6

EcTyr-RS (VGYI):

MASSNLIKQLQERGLVAQVTDEEALAERLAQGPIALYCGFDPTADSLHLGHLVPLLCLKRFQQAGHKPVA
VVGGATGLIGDPSFKAAERKLNTEETVQEWVDKIRKQVAPFLDFDCGENSAIAANNYDWFGNMNVLTFLR
DIGKHFSVNQMINKEAVKQRLNREDQGISFTEFSYNLLQGYGYACINKQYGVVLQIGGSDQWGNITSGID
LTRRLHQNQVFGLTVPLITKADGTKFGKTEGGAVWLDPKKTSPYKFYQFWINTADADVYRFLKFFTFMSI
EEINALEEEDKNSGKAPRAQYVLAEQVTRLVHGEEGLQAAKRITECLFSGSLSALSEADFEQLAQDGVPM
VEMEKGADLMQALVDSELQPSRGQARKTIASNAITINGEKQSDPEYFFKEEDRLFGRFTLLRRGKKNYCL
ICWK

Figure 16D

SEQ ID NO: 7

EcTyr-RS (VGYL):

MASSNLIKQLQERGLVAQVTDEEALAERLAQGPIAL Y CGFDPTADSLHLGHLVPLLCLKRFQQAGHKPVA
V VGGATGLIGDPSFKAAERKLNTEETVQEWVDKIRKQVAPFLDFDCGENSAIAAN N YDWFGNMNVLTFLR
DIGKHFSVNQMINKEAVKQRLNREDQGISFTEFSYNLLQGY GY AC L NKQYGVVLQIGGSDQWGNITSGID
LTRRLHQNQVFGLTVPLITKADGTKFGKTEGGAVWLDPKKTSPYKFYQFWINTA D ADVYRFLKFFTFMSI
EEINALEEEDKNSGKAPRAQYVLAEQVTRLVHGEEGLQAAKRITECLFSGSLSALSEADFEQLAQDGVPM
VEMEKGADLMQALVDSELQPSRGQARKTIASNAITINGEKQSDPEYFFKEEDRLFGRFTLLRRGKKNYCL
ICWK

Figure 16E

SEQ ID NO: 8

EcTyr-RS (VGYLR):

MASSNLIKQLQERGLVAQVTDEEALAERLAQGPIAL Y CGFDPTADSLHLGHLVPLLCLKRFQQAGHKPVA
V VGGATGLIGDPSFKAAERKLNTEETVQEWVDKIRKQVAPFLDFDCGENSAIAAN N YDWFGNMNVLTFLR
DIGKHFSVNQMINKEAVKQRLNREDQGISFTEFSYNLLQGY GY AC L NKQYGVVLQIGGSDQWGNITSGID
LTRRLHQNQVFGLTVPLITKADGTKFGKTEGGAVWLDPKKTSPYKFYQFWINTA R ADVYRFLKFFTFMSI
EEINALEEEDKNSGKAPRAQYVLAEQVTRLVHGEEGLQAAKRITECLFSGSLSALSEADFEQLAQDGVPM
VEMEKGADLMQALVDSELQPSRGQARKTIASNAITINGEKQSDPEYFFKEEDRLFGRFTLLRRGKKNYCL
ICWK

Figure 16F

SEQ ID NO: 9

EcTyr-RS (VGV):

MASSNLIKQLQERGLVAQVTDEEALAERLAQGPIALYCGFDPTADSLHLGHLVPLLCLKRFQQAGHKPVA
VVGGATGLIGDPSFKAAERKLNTEETVQEWVDKIRKQVAPFLDFDCGENSAIAANNYDWFGNMNVLTFLR
DIGKHFSVNQMINKEAVKQRLNREDQGISFTEFSYNLLQGYGFACVNKQYGVVLQIGGSDQWGNITSGID
LTRRLHQNQVFGLTVPLITKADGTKFGKTEGGAVWLDPKKTSPYKFYQFWINTADADVYRFLKFFTFMSI
EEINALEEEDKNSGKAPRAQYVLAEQVTRLVHGEEGLQAAKRITECLFSGSLSALSEADFEQLAQDGVPM
VEMEKGADLMQALVDSELQPSRGQARKTIASNAITINGEKQSDPEYFFKEEDRLFGRFTLLRRGKKNYCL
ICWK

Figure 16G

SEQ ID NO: 10

E. coli tyrosyl tRNA:

GGTGGGGTTCCCGAGCGGCCAAAGGGAGCAGACTCTAAATCTGCCGTCACAGACTTCGAAGGTTCGAATCCT
TCCCCCACCA

SEQUENCE LISTING

```
<160> NUMBER OF SEQ ID NOS: 34

<210> SEQ ID NO 1
<211> LENGTH: 424
<212> TYPE: PRT
<213> ORGANISM: Escherichia coli

<400> SEQUENCE: 1

Met Ala Ser Ser Asn Leu Ile Lys Gln Leu Gln Glu Arg Gly Leu Val
1               5                   10                  15

Ala Gln Val Thr Asp Glu Glu Ala Leu Ala Glu Arg Leu Ala Gln Gly
                20                  25                  30

Pro Ile Ala Leu Tyr Cys Gly Phe Asp Pro Thr Ala Asp Ser Leu His
            35                  40                  45

Leu Gly His Leu Val Pro Leu Leu Cys Leu Lys Arg Phe Gln Gln Ala
        50                  55                  60

Gly His Lys Pro Val Ala Leu Val Gly Gly Ala Thr Gly Leu Ile Gly
65                  70                  75                  80

Asp Pro Ser Phe Lys Ala Ala Glu Arg Lys Leu Asn Thr Glu Glu Thr
                85                  90                  95

Val Gln Glu Trp Val Asp Lys Ile Arg Lys Gln Val Ala Pro Phe Leu
            100                 105                 110

Asp Phe Asp Cys Gly Glu Asn Ser Ala Ile Ala Ala Asn Asn Tyr Asp
        115                 120                 125

Trp Phe Gly Asn Met Asn Val Leu Thr Phe Leu Arg Asp Ile Gly Lys
    130                 135                 140

His Phe Ser Val Asn Gln Met Ile Asn Lys Glu Ala Val Lys Gln Arg
145                 150                 155                 160

Leu Asn Arg Glu Asp Gln Gly Ile Ser Phe Thr Glu Phe Ser Tyr Asn
                165                 170                 175

Leu Leu Gln Gly Tyr Asp Phe Ala Cys Leu Asn Lys Gln Tyr Gly Val
            180                 185                 190

Val Leu Gln Ile Gly Gly Ser Asp Gln Trp Gly Asn Ile Thr Ser Gly
        195                 200                 205
```

-continued

```
Ile Asp Leu Thr Arg Arg Leu His Gln Asn Gln Val Phe Gly Leu Thr
        210                 215                 220

Val Pro Leu Ile Thr Lys Ala Asp Gly Thr Lys Phe Gly Lys Thr Glu
225                 230                 235                 240

Gly Gly Ala Val Trp Leu Asp Pro Lys Lys Thr Ser Pro Tyr Lys Phe
                245                 250                 255

Tyr Gln Phe Trp Ile Asn Thr Ala Asp Ala Asp Val Tyr Arg Phe Leu
            260                 265                 270

Lys Phe Phe Thr Phe Met Ser Ile Glu Glu Ile Asn Ala Leu Glu Glu
        275                 280                 285

Glu Asp Lys Asn Ser Gly Lys Ala Pro Arg Ala Gln Tyr Val Leu Ala
    290                 295                 300

Glu Gln Val Thr Arg Leu Val His Gly Glu Glu Gly Leu Gln Ala Ala
305                 310                 315                 320

Lys Arg Ile Thr Glu Cys Leu Phe Ser Gly Ser Leu Ser Ala Leu Ser
                325                 330                 335

Glu Ala Asp Phe Glu Gln Leu Ala Gln Asp Gly Val Pro Met Val Glu
            340                 345                 350

Met Glu Lys Gly Ala Asp Leu Met Gln Ala Leu Val Asp Ser Glu Leu
        355                 360                 365

Gln Pro Ser Arg Gly Gln Ala Arg Lys Thr Ile Ala Ser Asn Ala Ile
370                 375                 380

Thr Ile Asn Gly Glu Lys Gln Ser Asp Pro Glu Tyr Phe Phe Lys Glu
385                 390                 395                 400

Glu Asp Arg Leu Phe Gly Arg Phe Thr Leu Leu Arg Arg Gly Lys Lys
                405                 410                 415

Asn Tyr Cys Leu Ile Cys Trp Lys
            420

<210> SEQ ID NO 2
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 2

Phe Leu Ile Met Val Ser Thr Ala Tyr His Cys Gly
1               5                   10

<210> SEQ ID NO 3
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 3

Asn Ser Pro Thr Ala Cys Gly Asp His
1               5

<210> SEQ ID NO 4
<211> LENGTH: 424
<212> TYPE: PRT
<213> ORGANISM: Artificial Sequence
<220> FEATURE:
```

<221> NAME/KEY: source
<223> OTHER INFORMATION: /note="Description of Artificial Sequence: Synthetic polypeptide"

<400> SEQUENCE: 4

```
Met Ala Ser Ser Asn Leu Ile Lys Gln Leu Gln Glu Arg Gly Leu Val
1               5                   10                  15

Ala Gln Val Thr Asp Glu Glu Ala Leu Ala Glu Arg Leu Ala Gln Gly
            20                  25                  30

Pro Ile Ala Leu Tyr Cys Gly Phe Asp Pro Thr Ala Asp Ser Leu His
        35                  40                  45

Leu Gly His Leu Val Pro Leu Leu Cys Leu Lys Arg Phe Gln Gln Ala
    50                  55                  60

Gly His Lys Pro Val Ala Val Gly Gly Ala Thr Gly Leu Ile Gly
65                  70                  75                  80

Asp Pro Ser Phe Lys Ala Ala Glu Arg Lys Leu Asn Thr Glu Glu Thr
                85                  90                  95

Val Gln Glu Trp Val Asp Lys Ile Arg Lys Gln Val Ala Pro Phe Leu
            100                 105                 110

Asp Phe Asp Cys Gly Glu Asn Ser Ala Ile Ala Ala Asn Asn Tyr Asp
        115                 120                 125

Trp Phe Gly Asn Met Asn Val Leu Thr Phe Leu Arg Asp Ile Gly Lys
    130                 135                 140

His Phe Ser Val Asn Gln Met Ile Asn Lys Glu Ala Val Lys Gln Arg
145                 150                 155                 160

Leu Asn Arg Glu Asp Gln Gly Ile Ser Phe Thr Glu Phe Ser Tyr Asn
                165                 170                 175

Leu Leu Gln Gly Tyr Gly Phe Ala Cys Leu Asn Lys Gln Tyr Gly Val
            180                 185                 190

Val Leu Gln Ile Gly Gly Ser Asp Gln Trp Gly Asn Ile Thr Ser Gly
        195                 200                 205

Ile Asp Leu Thr Arg Arg Leu His Gln Asn Gln Val Phe Gly Leu Thr
    210                 215                 220

Val Pro Leu Ile Thr Lys Ala Asp Gly Thr Lys Phe Gly Lys Thr Glu
225                 230                 235                 240

Gly Gly Ala Val Trp Leu Asp Pro Lys Lys Thr Ser Pro Tyr Lys Phe
                245                 250                 255

Tyr Gln Phe Trp Ile Asn Thr Ala Asp Ala Asp Val Tyr Arg Phe Leu
            260                 265                 270

Lys Phe Phe Thr Phe Met Ser Ile Glu Glu Ile Asn Ala Leu Glu Glu
        275                 280                 285

Glu Asp Lys Asn Ser Gly Lys Ala Pro Arg Ala Gln Tyr Val Leu Ala
    290                 295                 300

Glu Gln Val Thr Arg Leu Val His Gly Glu Glu Gly Leu Gln Ala Ala
305                 310                 315                 320

Lys Arg Ile Thr Glu Cys Leu Phe Ser Gly Ser Leu Ser Ala Leu Ser
                325                 330                 335

Glu Ala Asp Phe Glu Gln Leu Ala Gln Asp Gly Val Pro Met Val Glu
            340                 345                 350

Met Glu Lys Gly Ala Asp Leu Met Gln Ala Leu Val Asp Ser Glu Leu
        355                 360                 365

Gln Pro Ser Arg Gly Gln Ala Arg Lys Thr Ile Ala Ser Asn Ala Ile
    370                 375                 380

Thr Ile Asn Gly Glu Lys Gln Ser Asp Pro Glu Tyr Phe Phe Lys Glu
```

```
                385                 390                 395                 400
Glu Asp Arg Leu Phe Gly Arg Phe Thr Leu Leu Arg Arg Gly Lys Lys
                    405                 410                 415

Asn Tyr Cys Leu Ile Cys Trp Lys
            420

<210> SEQ ID NO 5
<211> LENGTH: 424
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Met Ala Ser Ser Asn Leu Ile Lys Gln Leu Gln Glu Arg Gly Leu Val
1               5                   10                  15

Ala Gln Val Thr Asp Glu Glu Ala Leu Ala Glu Arg Leu Ala Gln Gly
                20                  25                  30

Pro Ile Ala Leu Tyr Cys Gly Phe Asp Pro Thr Ala Asp Ser Leu His
            35                  40                  45

Leu Gly His Leu Val Pro Leu Leu Cys Leu Lys Arg Phe Gln Gln Ala
    50                  55                  60

Gly His Lys Pro Val Ala Val Val Gly Ala Thr Gly Leu Ile Gly
65                  70                  75                  80

Asp Pro Ser Phe Lys Ala Ala Glu Arg Lys Leu Asn Thr Glu Thr
                85                  90                  95

Val Gln Glu Trp Val Asp Lys Ile Arg Lys Gln Val Ala Pro Phe Leu
                100                 105                 110

Asp Phe Asp Cys Gly Glu Asn Ser Ala Ile Ala Ala Asn Asn Tyr Asp
                115                 120                 125

Trp Phe Gly Asn Met Asn Val Leu Thr Phe Leu Arg Asp Ile Gly Lys
            130                 135                 140

His Phe Ser Val Asn Gln Met Ile Asn Lys Glu Ala Val Lys Gln Arg
145                 150                 155                 160

Leu Asn Arg Glu Asp Gln Gly Ile Ser Phe Thr Glu Phe Ser Tyr Asn
                165                 170                 175

Leu Leu Gln Gly Tyr Gly Phe Ala Cys Met Asn Lys Gln Tyr Gly Val
                180                 185                 190

Val Leu Gln Ile Gly Gly Ser Asp Gln Trp Gly Asn Ile Thr Ser Gly
                195                 200                 205

Ile Asp Leu Thr Arg Arg Leu His Gln Asn Gln Val Phe Gly Leu Thr
            210                 215                 220

Val Pro Leu Ile Thr Lys Ala Asp Gly Thr Lys Phe Gly Lys Thr Glu
225                 230                 235                 240

Gly Gly Ala Val Trp Leu Asp Pro Lys Lys Thr Ser Pro Tyr Lys Phe
                245                 250                 255

Tyr Gln Phe Trp Ile Asn Thr Ala Asp Ala Asp Val Tyr Arg Phe Leu
            260                 265                 270

Lys Phe Phe Thr Phe Met Ser Ile Glu Glu Ile Asn Ala Leu Glu Glu
                275                 280                 285

Glu Asp Lys Asn Ser Gly Lys Ala Pro Arg Ala Gln Tyr Val Leu Ala
            290                 295                 300

Glu Gln Val Thr Arg Leu Val His Gly Glu Glu Gly Leu Gln Ala Ala
305                 310                 315                 320
```

```
Lys Arg Ile Thr Glu Cys Leu Phe Ser Gly Ser Leu Ser Ala Leu Ser
                325                 330                 335

Glu Ala Asp Phe Glu Gln Leu Ala Gln Asp Gly Val Pro Met Val Glu
            340                 345                 350

Met Glu Lys Gly Ala Asp Leu Met Gln Ala Leu Val Asp Ser Glu Leu
        355                 360                 365

Gln Pro Ser Arg Gly Gln Ala Arg Lys Thr Ile Ala Ser Asn Ala Ile
    370                 375                 380

Thr Ile Asn Gly Glu Lys Gln Ser Asp Pro Glu Tyr Phe Phe Lys Glu
385                 390                 395                 400

Glu Asp Arg Leu Phe Gly Arg Phe Thr Leu Leu Arg Arg Gly Lys Lys
                405                 410                 415

Asn Tyr Cys Leu Ile Cys Trp Lys
            420
```

<210> SEQ ID NO 6
<211> LENGTH: 424
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 6

```
Met Ala Ser Ser Asn Leu Ile Lys Gln Leu Gln Glu Arg Gly Leu Val
1               5                   10                  15

Ala Gln Val Thr Asp Glu Glu Ala Leu Ala Glu Arg Leu Ala Gln Gly
            20                  25                  30

Pro Ile Ala Leu Tyr Cys Gly Phe Asp Pro Thr Ala Asp Ser Leu His
        35                  40                  45

Leu Gly His Leu Val Pro Leu Leu Cys Leu Lys Arg Phe Gln Gln Ala
    50                  55                  60

Gly His Lys Pro Val Ala Val Val Gly Gly Ala Thr Gly Leu Ile Gly
65                  70                  75                  80

Asp Pro Ser Phe Lys Ala Ala Glu Arg Lys Leu Asn Thr Glu Glu Thr
                85                  90                  95

Val Gln Glu Trp Val Asp Lys Ile Arg Lys Gln Val Ala Pro Phe Leu
            100                 105                 110

Asp Phe Asp Cys Gly Glu Asn Ser Ala Ile Ala Ala Asn Asn Tyr Asp
        115                 120                 125

Trp Phe Gly Asn Met Asn Val Leu Thr Phe Leu Arg Asp Ile Gly Lys
    130                 135                 140

His Phe Ser Val Asn Gln Met Ile Asn Lys Glu Ala Val Lys Gln Arg
145                 150                 155                 160

Leu Asn Arg Glu Asp Gln Gly Ile Ser Phe Thr Glu Phe Ser Tyr Asn
                165                 170                 175

Leu Leu Gln Gly Tyr Gly Tyr Ala Cys Ile Asn Lys Gln Tyr Gly Val
            180                 185                 190

Val Leu Gln Ile Gly Gly Ser Asp Gln Trp Gly Asn Ile Thr Ser Gly
        195                 200                 205

Ile Asp Leu Thr Arg Arg Leu His Gln Asn Gln Val Phe Gly Leu Thr
    210                 215                 220

Val Pro Leu Ile Thr Lys Ala Asp Gly Thr Lys Phe Gly Lys Thr Glu
225                 230                 235                 240
```

```
Gly Gly Ala Val Trp Leu Asp Pro Lys Lys Thr Ser Pro Tyr Lys Phe
            245                 250                 255

Tyr Gln Phe Trp Ile Asn Thr Ala Asp Ala Asp Val Tyr Arg Phe Leu
        260                 265                 270

Lys Phe Phe Thr Phe Met Ser Ile Glu Glu Ile Asn Ala Leu Glu Glu
        275                 280                 285

Glu Asp Lys Asn Ser Gly Lys Ala Pro Arg Ala Gln Tyr Val Leu Ala
        290                 295                 300

Glu Gln Val Thr Arg Leu Val His Gly Glu Gly Leu Gln Ala Ala
305                 310                 315                 320

Lys Arg Ile Thr Glu Cys Leu Phe Ser Gly Ser Leu Ser Ala Leu Ser
                325                 330                 335

Glu Ala Asp Phe Glu Gln Leu Ala Gln Asp Gly Val Pro Met Val Glu
                340                 345                 350

Met Glu Lys Gly Ala Asp Leu Met Gln Ala Leu Val Asp Ser Glu Leu
            355                 360                 365

Gln Pro Ser Arg Gly Gln Ala Arg Lys Thr Ile Ala Ser Asn Ala Ile
        370                 375                 380

Thr Ile Asn Gly Glu Lys Gln Ser Asp Pro Glu Tyr Phe Phe Lys Glu
385                 390                 395                 400

Glu Asp Arg Leu Phe Gly Arg Phe Thr Leu Leu Arg Arg Gly Lys Lys
                405                 410                 415

Asn Tyr Cys Leu Ile Cys Trp Lys
                420

<210> SEQ ID NO 7
<211> LENGTH: 424
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 7

Met Ala Ser Ser Asn Leu Ile Lys Gln Leu Gln Glu Arg Gly Leu Val
1               5                   10                  15

Ala Gln Val Thr Asp Glu Glu Ala Leu Ala Glu Arg Leu Ala Gln Gly
            20                  25                  30

Pro Ile Ala Leu Tyr Cys Gly Phe Asp Pro Thr Ala Asp Ser Leu His
        35                  40                  45

Leu Gly His Leu Val Pro Leu Leu Cys Leu Lys Arg Phe Gln Gln Ala
    50                  55                  60

Gly His Lys Pro Val Ala Val Gly Gly Ala Thr Gly Leu Ile Gly
65                  70                  75                  80

Asp Pro Ser Phe Lys Ala Ala Glu Arg Lys Leu Asn Thr Glu Glu Thr
                85                  90                  95

Val Gln Glu Trp Val Asp Lys Ile Arg Lys Gln Val Ala Pro Phe Leu
            100                 105                 110

Asp Phe Asp Cys Gly Glu Asn Ser Ala Ile Ala Ala Asn Asn Tyr Asp
        115                 120                 125

Trp Phe Gly Asn Met Asn Val Leu Thr Phe Leu Arg Asp Ile Gly Lys
    130                 135                 140

His Phe Ser Val Asn Gln Met Ile Asn Lys Glu Ala Val Lys Gln Arg
145                 150                 155                 160

Leu Asn Arg Glu Asp Gln Gly Ile Ser Phe Thr Glu Phe Ser Tyr Asn
```

```
                         165                 170                 175
Leu Leu Gln Gly Tyr Gly Tyr Ala Cys Leu Asn Lys Gln Tyr Gly Val
            180                 185                 190

Val Leu Gln Ile Gly Gly Ser Asp Gln Trp Gly Asn Ile Thr Ser Gly
            195                 200                 205

Ile Asp Leu Thr Arg Arg Leu His Gln Asn Gln Val Phe Gly Leu Thr
    210                 215                 220

Val Pro Leu Ile Thr Lys Ala Asp Gly Thr Lys Phe Gly Lys Thr Glu
225                 230                 235                 240

Gly Gly Ala Val Trp Leu Asp Pro Lys Lys Thr Ser Pro Tyr Lys Phe
                245                 250                 255

Tyr Gln Phe Trp Ile Asn Thr Ala Asp Ala Asp Val Tyr Arg Phe Leu
                260                 265                 270

Lys Phe Phe Thr Phe Met Ser Ile Glu Glu Ile Asn Ala Leu Glu Glu
                275                 280                 285

Glu Asp Lys Asn Ser Gly Lys Ala Pro Arg Ala Gln Tyr Val Leu Ala
            290                 295                 300

Glu Gln Val Thr Arg Leu Val His Gly Glu Glu Gly Leu Gln Ala Ala
305                 310                 315                 320

Lys Arg Ile Thr Glu Cys Leu Phe Ser Gly Ser Leu Ser Ala Leu Ser
                325                 330                 335

Glu Ala Asp Phe Glu Gln Leu Ala Gln Asp Gly Val Pro Met Val Glu
                340                 345                 350

Met Glu Lys Gly Ala Asp Leu Met Gln Ala Leu Val Asp Ser Glu Leu
            355                 360                 365

Gln Pro Ser Arg Gly Gln Ala Arg Lys Thr Ile Ala Ser Asn Ala Ile
    370                 375                 380

Thr Ile Asn Gly Glu Lys Gln Ser Asp Pro Glu Tyr Phe Phe Lys Glu
385                 390                 395                 400

Glu Asp Arg Leu Phe Gly Arg Phe Thr Leu Leu Arg Arg Gly Lys Lys
                405                 410                 415

Asn Tyr Cys Leu Ile Cys Trp Lys
                420

<210> SEQ ID NO 8
<211> LENGTH: 424
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 8

Met Ala Ser Ser Asn Leu Ile Lys Gln Leu Gln Glu Arg Gly Leu Val
1               5                  10                  15

Ala Gln Val Thr Asp Glu Glu Ala Leu Ala Glu Arg Leu Ala Gln Gly
            20                  25                  30

Pro Ile Ala Leu Tyr Cys Gly Phe Asp Pro Thr Ala Asp Ser Leu His
        35                  40                  45

Leu Gly His Leu Val Pro Leu Leu Cys Leu Lys Arg Phe Gln Gln Ala
    50                  55                  60

Gly His Lys Pro Val Ala Val Val Gly Gly Ala Thr Gly Leu Ile Gly
65                  70                  75                  80

Asp Pro Ser Phe Lys Ala Ala Glu Arg Lys Leu Asn Thr Glu Glu Thr
                85                  90                  95
```

Val Gln Glu Trp Val Asp Lys Ile Arg Lys Gln Val Ala Pro Phe Leu
            100                 105                 110

Asp Phe Asp Cys Gly Glu Asn Ser Ala Ile Ala Ala Asn Asn Tyr Asp
            115                 120                 125

Trp Phe Gly Asn Met Asn Val Leu Thr Phe Leu Arg Asp Ile Gly Lys
            130                 135                 140

His Phe Ser Val Asn Gln Met Ile Asn Lys Glu Ala Val Lys Gln Arg
145                 150                 155                 160

Leu Asn Arg Glu Asp Gln Gly Ile Ser Phe Thr Glu Phe Ser Tyr Asn
                165                 170                 175

Leu Leu Gln Gly Tyr Gly Tyr Ala Cys Leu Asn Lys Gln Tyr Gly Val
            180                 185                 190

Val Leu Gln Ile Gly Gly Ser Asp Gln Trp Gly Asn Ile Thr Ser Gly
            195                 200                 205

Ile Asp Leu Thr Arg Arg Leu His Gln Asn Gln Val Phe Gly Leu Thr
210                 215                 220

Val Pro Leu Ile Thr Lys Ala Asp Gly Thr Lys Phe Gly Lys Thr Glu
225                 230                 235                 240

Gly Gly Ala Val Trp Leu Asp Pro Lys Lys Thr Ser Pro Tyr Lys Phe
                245                 250                 255

Tyr Gln Phe Trp Ile Asn Thr Ala Arg Ala Asp Val Tyr Arg Phe Leu
            260                 265                 270

Lys Phe Phe Thr Phe Met Ser Ile Glu Glu Ile Asn Ala Leu Glu Glu
            275                 280                 285

Glu Asp Lys Asn Ser Gly Lys Ala Pro Arg Ala Gln Tyr Val Leu Ala
            290                 295                 300

Glu Gln Val Thr Arg Leu Val His Gly Glu Glu Gly Leu Gln Ala Ala
305                 310                 315                 320

Lys Arg Ile Thr Glu Cys Leu Phe Ser Gly Ser Leu Ser Ala Leu Ser
                325                 330                 335

Glu Ala Asp Phe Glu Gln Leu Ala Gln Asp Gly Val Pro Met Val Glu
            340                 345                 350

Met Glu Lys Gly Ala Asp Leu Met Gln Ala Leu Val Asp Ser Glu Leu
            355                 360                 365

Gln Pro Ser Arg Gly Gln Ala Arg Lys Thr Ile Ala Ser Asn Ala Ile
370                 375                 380

Thr Ile Asn Gly Glu Lys Gln Ser Asp Pro Glu Tyr Phe Phe Lys Glu
385                 390                 395                 400

Glu Asp Arg Leu Phe Gly Arg Phe Thr Leu Leu Arg Arg Gly Lys Lys
                405                 410                 415

Asn Tyr Cys Leu Ile Cys Trp Lys
            420

<210> SEQ ID NO 9
<211> LENGTH: 424
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 9

Met Ala Ser Ser Asn Leu Ile Lys Gln Leu Gln Glu Arg Gly Leu Val
1               5                   10                  15

```
Ala Gln Val Thr Asp Glu Glu Ala Leu Ala Glu Arg Leu Ala Gln Gly
             20                  25                  30

Pro Ile Ala Leu Tyr Cys Gly Phe Asp Pro Thr Ala Asp Ser Leu His
         35                  40                  45

Leu Gly His Leu Val Pro Leu Leu Cys Leu Lys Arg Phe Gln Gln Ala
     50                  55                  60

Gly His Lys Pro Val Ala Val Val Gly Gly Ala Thr Gly Leu Ile Gly
65                  70                  75                  80

Asp Pro Ser Phe Lys Ala Ala Glu Arg Lys Leu Asn Thr Glu Glu Thr
                 85                  90                  95

Val Gln Glu Trp Val Asp Lys Ile Arg Lys Gln Val Ala Pro Phe Leu
            100                 105                 110

Asp Phe Asp Cys Gly Glu Asn Ser Ala Ile Ala Ala Asn Asn Tyr Asp
        115                 120                 125

Trp Phe Gly Asn Met Asn Val Leu Thr Phe Leu Arg Asp Ile Gly Lys
    130                 135                 140

His Phe Ser Val Asn Gln Met Ile Asn Lys Glu Ala Val Lys Gln Arg
145                 150                 155                 160

Leu Asn Arg Glu Asp Gln Gly Ile Ser Phe Thr Glu Phe Ser Tyr Asn
                165                 170                 175

Leu Leu Gln Gly Tyr Gly Phe Ala Cys Val Asn Lys Gln Tyr Gly Val
            180                 185                 190

Val Leu Gln Ile Gly Gly Ser Asp Gln Trp Gly Asn Ile Thr Ser Gly
        195                 200                 205

Ile Asp Leu Thr Arg Arg Leu His Gln Asn Gln Val Phe Gly Leu Thr
    210                 215                 220

Val Pro Leu Ile Thr Lys Ala Asp Gly Thr Lys Phe Gly Lys Thr Glu
225                 230                 235                 240

Gly Gly Ala Val Trp Leu Asp Pro Lys Lys Thr Ser Pro Tyr Lys Phe
                245                 250                 255

Tyr Gln Phe Trp Ile Asn Thr Ala Asp Ala Asp Val Tyr Arg Phe Leu
            260                 265                 270

Lys Phe Phe Thr Phe Met Ser Ile Glu Glu Ile Asn Ala Leu Glu Glu
        275                 280                 285

Glu Asp Lys Asn Ser Gly Lys Ala Pro Arg Ala Gln Tyr Val Leu Ala
290                 295                 300

Glu Gln Val Thr Arg Leu Val His Gly Glu Glu Gly Leu Gln Ala Ala
305                 310                 315                 320

Lys Arg Ile Thr Glu Cys Leu Phe Ser Gly Ser Leu Ser Ala Leu Ser
                325                 330                 335

Glu Ala Asp Phe Glu Gln Leu Ala Gln Asp Gly Val Pro Met Val Glu
            340                 345                 350

Met Glu Lys Gly Ala Asp Leu Met Gln Ala Leu Val Asp Ser Glu Leu
        355                 360                 365

Gln Pro Ser Arg Gly Gln Ala Arg Lys Thr Ile Ala Ser Asn Ala Ile
370                 375                 380

Thr Ile Asn Gly Glu Lys Gln Ser Asp Pro Glu Tyr Phe Phe Lys Glu
385                 390                 395                 400

Glu Asp Arg Leu Phe Gly Arg Phe Thr Leu Leu Arg Arg Gly Lys Lys
                405                 410                 415

Asn Tyr Cys Leu Ile Cys Trp Lys
                420
```

<210> SEQ ID NO 10
<211> LENGTH: 82
<212> TYPE: DNA
<213> ORGANISM: Escherichia coli

<400> SEQUENCE: 10
ggtggggttc ccgagcggcc aaagggagca gactctaaat ctgccgtcac agacttcgaa    60
ggttcgaatc cttcccccac ca                                             82

<210> SEQ ID NO 11
<211> LENGTH: 23
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 11

Glu Asn Thr Val Thr Asn Asp Trp Ile Pro Glu Gly Glu Glu Asp Asp
1               5                   10                  15

Asp Tyr Leu Asp Leu Glu Lys
            20

<210> SEQ ID NO 12
<400> SEQUENCE: 12

000

<210> SEQ ID NO 13
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 13

Phe Ser Glu Asp Asp Tyr Ile Asp Ile Val
1               5                   10

<210> SEQ ID NO 14
<400> SEQUENCE: 14

000

<210> SEQ ID NO 15
<211> LENGTH: 12823
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 15
ttctctgtca cagaatgaaa atttttctgt catctcttcg ttattaatgt ttgtaattga    60
ctgaatatca acgcttattt gcagcctgaa tggcgaatgg gacgcgccct gtagcggcgc   120
attaagcgcg gcgggtgtgg tggttacgcg cagcgtgacc gctacacttg ccagcgccct   180
agcgcccgct cctttcgctt tcttcccttc ctttctcgcc acgttcgccg gctttccccg   240
tcaagctcta aatcggggc tcccttagg gttccgattt agtgctttac ggcacctcga   300

```
ccccaaaaaa cttgattagg gtgatggttc acgtagtggg ccatcgccct gatagacggt      360 tttctcgccct ttgacgttgg agtccacgtt ctttaatagt ggactcttgt tccaaactgg     420
aacaacactc aaccctatct cggtctattc ttttgattta taagggattt tgccgatttc     480
ggcctattgg ttaaaaaatg agctgattta acaaaaattt aacgcgaatt ttaacaaaat     540
attaacgttt acaatttcag gtggcacttt tcggggaaat gtgcgcggaa ccctatttg      600 tttatttttc taaatacatt caaatatgta tccgctcatg agacaataac cctgataaat     660
gcttcaataa tattgaaaaa ggaagagtat gagtattcaa catttccgtg tcgcccttat     720
tccctttttt gcggcatttt gccttcctgt ttttgctcac ccagaaacgc tggtgaaagt     780
aaaagatgct gaagatcagt tgggtgcacg agtgggttac atcgaactgg atctcaacag     840
cggtaagatc cttgagagtt ttcgccccga agaacgtttt ccaatgatga gcacttttaa     900
agttctgcta tgtggcgcgg tattatcccg tattgacgcc gggcaagagc aactcggtcg     960
ccgcatacac tattctcaga atgacttggt tgagtactca ccagtcacag aaaagcatct    1020
tacggatggc atgacagtaa gagaattatg cagtgctgcc ataaccatga gtgataacac    1080
tgcggccaac ttacttctga caacgatcgg aggaccgaag gagctaaccg cttttttgca    1140
caacatgggg gatcatgtaa ctcgccttga tcgttgggaa ccggagctga atgaagccat    1200
accaaacgac gagcgtgaca ccacgatgcc tgtagcaatg gcaacaacgt tgcgcaaact    1260
attaactggc gaactactta ctctagcttc ccggcaacaa ttaatagact ggatggaggc    1320
ggataaagtt gcaggaccac ttctgcgctc ggcccttccg gctggctggt ttattgctga    1380
taaatctgga gccggtgagc gtgggtctcg cggtatcatt gcagcactgg ggccagatgg    1440
taagccctcc cgtatcgtag ttatctacac gacgggagt caggcaacta tggatgaacg    1500
aaatagacag atcgctgaga taggtgcctc actgattaag cattggtaac tgtcagacca    1560
agtttactca tatatacttt agattgattt aaaacttcat ttttaattta aaaggatcta    1620
ggtgaagatc cttttttgata atctcatgac caaaatccct taacgtgagt tttcgttcca    1680
ctgagcgtca gaccccgtag aaaagatcaa aggatcttct tgagatcctt ttttttctgcg    1740 cgtaatctgc tgcttgcaaa caaaaaaacc accgctacca gcggtggttt gtttgccgga    1800
tcaagagcta ccaactcttt ttccgaaggt aactggcttc agcagagcgc agataccaaa    1860
tactgtcctt ctagtgtagc cgtagttagg ccaccacttc aagaactctg tagcaccgcc    1920 tacataccctc gctctgctaa tcctgttacc agtggctgct gccagtggcg ataagtcgtg    1980
tcttaccggg ttggactcaa gacgatagtt accggataag gcgcagcggt cgggctgaac    2040
ggggggttcg tgcacacagc ccagcttgga gcgaacgacc tacaccgaac tgagatacct    2100
acagcgtgag cattgagaaa gcgccacgct tcccgaaggg agaaaggcgg acaggtatcc    2160
ggtaagcggc agggtcggaa caggagagcg cacgagggag cttccagggg gaaacgcctg    2220
gtatctttat agtcctgtcg ggtttcgcca cctctgactt gagcgtcgat ttttgtgatg    2280
ctcgtcaggg gggcggagcc tatggaaaaa cgccagcaac gcggcctttt tacggttcct    2340
ggccttttgc tggccttttg ctcacatgtt ctttcctgcg ttatccctg attctgtgga    2400 taaccgtatt accgcctttg agtgagctga taccgctcgc cgcagccgaa cgaccgagcg    2460
cagcgagtca gtgagcgagg aagcggaaga gcgcctgatg cggtattttc tccttacgca    2520
tctgtgcggt atttcacacc gcagaccagc cgcgtaacct ggcaaaatcg gttacgttg     2580 agtaataaat ggatgccctg cgtaagcggg tgtgggcgga caataaagtc ttaaactgaa    2640
```

-continued

| | | | | |
|---|---|---|---|---|
| caaaatagat | ctaaactatg | acaataaagt | cttaaactag | acagaatagt | tgtaaactga | 2700 |
| aatcagtcca | gttatgctgt | gaaaaagcat | actggacttt | tgttatggct | aaagcaaact | 2760 |
| cttcattttc | tgaagtgcaa | attgcccgtc | gtattaaaga | ggggcgtggc | caagggcatg | 2820 |
| gtaaagacta | tattcgcggc | gttgtgacaa | tttaccgaac | aactccgcgg | ccgggaagcc | 2880 |
| gatctcggct | tgaacgaatt | gttaggtggc | ggtacttggg | tcgatatcaa | agtgcatcac | 2940 |
| ttcttcccgt | atgcccaact | tgtatagag | agccactgcg | ggatcgtcac | cgtaatctgc | 3000 |
| ttgcacgtag | atcacataag | caccaagcgc | gttggcctca | tgcttgagga | gattgatgag | 3060 |
| cgcggtggca | atgccctgcc | tccggtgctc | gccggagact | gcgagatcat | agatatagat | 3120 |
| ctcactacgc | ggctgctcaa | acctgggcag | aacgtaagcc | gcgagagcgc | caacaaccgc | 3180 |
| ttcttggtcg | aaggcagcaa | gcgcgatgaa | tgtcttacta | cggagcaagt | tcccgaggta | 3240 |
| atcggagtcc | ggctgatgtt | gggagtaggt | ggctacgtct | ccgaactcac | gaccgaaaag | 3300 |
| atcaagagca | gcccgcatgg | atttgacttg | gtcagggccg | agcctacatg | tgcgaatgat | 3360 |
| gcccatactt | gagccaccta | actttgtttt | agggcgactg | ccctgctgcg | taacatcgtt | 3420 |
| gctgctgcgt | aacatcgttg | ctgctccata | acatcaaaca | tcgacccacg | gcgtaacgcg | 3480 |
| cttgctgctt | ggatgcccga | ggcatagact | gtacaaaaaa | acagtcataa | caagccatga | 3540 |
| aaaccgccac | tgcgccgtta | ccaccgctgc | gttcggtcaa | ggttctggac | cagttgcgtg | 3600 |
| agcgcatacg | ctacttgcat | tacagtttac | gaaccgaaca | ggcttatgtc | aactgggttc | 3660 |
| gtgccttcat | ccgtttccac | ggtgtgcgtc | acccggcaac | cttgggcagc | agcgaagtcg | 3720 |
| aggcatttct | gtcctggctg | gcgaacgagc | gcaaggtttc | ggtctccacg | catcgtcagg | 3780 |
| cattggcggc | cttgctgttc | ttctacggca | aggtgctgtg | cacggatctg | ccctggcttc | 3840 |
| aggagatcgg | tagacctcgg | ccgtcgcggc | gcttgccggt | ggtgctgacc | ccggatgaag | 3900 |
| tggttcgcat | cctcggtttt | ctggaaggcg | agcatcgttt | gttcgcccag | gactctagct | 3960 |
| atagttctag | tggttggcta | cgtacccgta | gtggctatgg | cagggcttgc | gcttaatgcg | 4020 |
| ccgctacagg | gcgcgtgggg | ataccccta | gagccccagc | tggttctttc | cgcctcagaa | 4080 |
| gccatagagc | ccaccgcatc | cccagcatgc | ctgctattgt | cttcccaatc | ctcccccttg | 4140 |
| ctgtcctgcc | ccaccccacc | cccagaata | gaatgacacc | tactcagaca | atgcgatgca | 4200 |
| atttcctcat | tttattagga | aaggacagtg | ggagtggcac | cttccagggt | caaggaaggc | 4260 |
| acggggagg | ggcaaacaac | agatggctgg | caactagaag | gcacagtcga | ggctgatcag | 4320 |
| cgggtttaaa | cgggccctct | agactcgagt | tatttccagc | aaatcagaca | gtaattcttt | 4380 |
| ttaccgcgac | gcagtaaggt | aaaacgacca | aacagacgat | cttcttcttt | aaagaagtat | 4440 |
| tcaggatcgg | actgttttc | accgttaatg | gtgatggcat | tggaggcgat | agttttacgt | 4500 |
| gcctgaccac | gggaaggttg | cagttcagaa | tcgaccagtg | cctgcatcag | gtctgcgccc | 4560 |
| ttttccatct | caaccatcgg | tacgccgtcc | tgcgccagct | gttcgaagtc | cgcttcactc | 4620 |
| agcgcactca | agaaccgct | gaacaggcat | tcggtaatac | gttttgccgc | ctgtaaacct | 4680 |
| tcttcaccgt | gaaccagacg | agtcacctgc | tccgccagta | catactgggc | gcgcggtgct | 4740 |
| ttaccgctgt | ttttatcttc | ttcttccagg | gcgttgatct | cttcaatgct | cataaaggtg | 4800 |
| aagaacttca | ggaagcggta | aacgtcggca | tccgcagtgt | tgatccagaa | ctggtagaat | 4860 |
| ttgtacgggc | tggttttctt | cggatccaac | cagactgcgc | cgccttcagt | tttaccaaat | 4920 |
| ttggtgccat | ctgctttagt | gatcagcgga | acgtcaggc | caaacacctg | attctgatgc | 4980 |
| agacgacggg | tcaggtcgat | accagaagtg | atgttacccc | actggtcaga | accaccaatt | 5040 |

```
tgcagcacca caccgtactg tttgttcaaa caggccatac tataaccctg cagcaggttg    5100
taggaaaact cagtgaacga aatcccctga tcttcacggt tgagacgctg cttaaccgct    5160
tctttgttga tcatctggtt aacggagaag tgtttgccaa tatcgcgcag gaaggtcagc    5220
acattcatat tgccgaacca gtcataatta ttggccgcga tagcagagtt ttctccacag    5280
tcgaaatcga ggaacggggc aacctgctta cggattttgt ccacccactc ctgaacagtt    5340
tcttcggtgt tcagcttacg ctcggcagct ttgaagctcg ggtcgccaat cagacccgtc    5400
gcgccgccta ccagcgcaac cggcttgtgg cccgcctgct ggaagcgttt caggcataac    5460 aatgaacaa gatgccccaa atgcaagctg tcagcggtag gatcgaagcc acacacgagt    5520
gcgatcgggc cttgcgccag tcgctctgct aacgcttcct cgtccgtcac ctgggctacc    5580
agcccccgct cttgcaattg tttaatcaag ttactgcttg ccatggtggc gctagccagc    5640
ttgggtctcc ctatagtgag tcgtattaat tcgataagc cagtaagcag tgggttctct    5700
agttagccag agagctctag accaagtgac gatcacagcg atccacaaac aagaaccgcg    5760
acccaaatcc cggctgcgac ggaactagct gtgccacacc cggcgcgtcc ttatataatc    5820
atcggcgttc accgccccac ggagatccct ccgcagaatc gccgagaagg gactactttt    5880
cctcgcctgt tccgctctct ggaaagaaaa ccagtgccct agagtcaccc aagtcccgtc    5940
ctaaaatgtc cttctgctga tactgggggt taaggccga gtcttatgag cagcgggccg    6000
ctgtcctgag cgtccgggcg gaaggatcag gacgctcgct gcgcccttcg tctgacgtgg    6060
cagcgctcgc cgtgaggagg ggggcgcccg cgggaggcgc caaaacccgg cgcggaggcc    6120
ttcgaacggc cactagcaaa aaatggaggg ggacggattc gaaccgccga acccaagggg    6180
agcggattta gagtccgccg cgtttagcca cttcgctacc cctccggtgt ctctatcact    6240
gatagggaac ttataagtct ctatcactga tagggatttc acgtttatgg tgatttccca    6300
gaacacatag cgacatgcaa atattaaaaa atggtgggg aaggattcga accttcgaag    6360
tctgtgacgg cagatttaga gtctgctccc tttggccgct cgggaacccc accggtgttt    6420 cgtccttttcc acaagatata taaagccaag aaatcgaaat actttcaagt tacggtaagc    6480
atatgatagt ccatttaaa acataatttt aaaactgcaa actacccaag aaattattac    6540
tttctacgtc acgtattttg tactaatatc tttgtgttta cagtcaaatt aattctaatt    6600
atctctctaa cagccttgta tcgtatatgc aaatatgaag gaatcatggg aaataggccc    6660
tcttcctgcc cgacctagca aaaatggag ggggacggat tcgaaccgcc gaacccaaag    6720
ggagcggatt tagagtccgc cgcgtttagc cacttcgcta cccctccggt gtctctatca    6780 ctgatatggga acttataagt ctctatcact gataggatt tcacgtttat ggtgatttcc    6840
cagaacacat agcgacatgc aaatattaaa aatggtggg ggaaggattc gaaccttcga    6900
agtctgtgac ggcagattta gagtctgctc cctttggccg ctcgggaacc ccaccggtgt    6960
ttcgtccttt ccacaagata tataaagcca agaaatcgaa atactttcaa gttacggtaa    7020
gcatatgata gtccatttta aaacataatt ttaaaactgc aaactaccca agaaattatt    7080
actttctacg tcacgtattt tgtactaata tctttgtgtt tacagtcaaa ttaattctaa    7140
ttatctctct aacagccttg tatcgtatat gcaaatatga aggaatcatg ggaaataggc    7200
cctcttcctg cccgacctag caaaaaatgg aggggacgg attcgaaccg ccgaacccaa    7260
agggagcgga tttagagtcc gccgcgttta gccacttcgc tacccctccg gtgtctctat    7320
cactgatagg gaacttataa gtctctatca ctgatagga tttcacgttt atggtgattt    7380
```

```
cccagaacac atagcgacat gcaaatatta aaaaatggtg ggggaaggat tcgaaccttc  7440
gaagtctgtg acggcagatt tagagtctgc tcccctttggc cgctcgggaa ccccaccggt  7500
gtttcgtcct ttccacaaga tatataaagc caagaaatcg aaatactttc aagttacggt  7560
aagcatatga tagtccattt taaaacataa ttttaaaact gcaaactacc caagaaatta  7620
ttactttcta cgtcacgtat tttgtactaa tatctttgtg tttacagtca aattaattct  7680
aattatctct ctaacagcct tgtatcgtat atgcaaatat gaaggaatca tgggaaatag  7740
gccctcttcc tgcccgacct agcaaaaaat ggaggggac ggattcgaac cgccgaaccc  7800
aaagggagcg gatttagagt ccgccgcgtt tagccacttc gctacccctc cggtgtctct  7860
atcactgata gggaacttat aagtctctat cactgatagg gatttcacgt ttatggtgat  7920
ttcccagaac acatagcgac atgcaaatat taaaaaatgg tgggggaagg attcgaacct  7980
tcgaagtctg tgacggcaga tttagagtct gctcccttg gccgctcggg aaccccaccg  8040
gtgtttcgtc ctttccacaa gatatataaa gccaagaaat cgaaatactt tcaagttacg  8100
gtaagcatat gatagtccat ttttaaaacat aattttaaaa ctgcaaacta cccaagaaat  8160
tattactttc tacgtcacgt attttgtact aatatctttg tgtttacagt caaattaatt  8220
ctaattatct ctctaacagc cttgtatcgt atatgcaaat atgaaggaat catgggaaat  8280
aggccctctt cctgcccgac ctagcaaaaa atggagggg acggattcga accgccgaac  8340
ccaaagggag cggatttaga gtccgccgcg tttagccact tcgctacccc tccggtgtct  8400
ctatcactga tagggaactt ataagtctct atcactgata gggatttcac gtttatggtg  8460
atttcccaga acacatagcg acatgcaaat attaaaaaat ggtgggggaa ggattcgaac  8520
cttcgaagtc tgtgacggca gatttagagt ctgctccctt tggccgctcg gaaccccac  8580 cggtgtttcg tcctttccac aagatatata aagccaagaa atcgaaatac tttcaagtta  8640
cggtaagcat atgatagtcc atttttaaaac ataattttaa aactgcaaac tacccaagaa  8700
attattactt tctacgtcac gtattttgta ctaatatctt tgtgtttaca gtcaaattaa  8760
ttctaattat ctctctaaca gccttgtatc gtatatgcaa atatgaagga atcatgggaa  8820
ataggccctc ttcctgcccg acctagcaaa aaatggaggg gacggattc gaaccgccga  8880 acccaaaggg agcggattta gagtccgccg cgtttagcca cttcgctacc cctccggtgt  8940
ctctatcact gatagggaac ttataagtct ctatcactga tagggatttc acgtttatgg  9000
tgatttccca gaacacatag cgacatgcaa atattaaaaa atggtggggg aaggattcga  9060
accttcgaag tctgtgacgg cagatttaga gtctgctccc tttggccgct cgggaacccc  9120
accggtgttt cgtcctttcc acaagatata aaagccaag aaatcgaaat actttcaagt  9180
tacggtaagc atatgatagt ccattttaaa acataatttt aaaactgcaa actacccaag  9240
aaattattac tttctacgtc acgtattttg tactaatatc tttgtgttta cagtcaaatt  9300
aattctaatt atctctctaa cagccttgta tcgtatatgc aaatatgaag gaatcatggg  9360
aaataggccc tcttcctgcc cgacctagca aaaaatggag gggacggat tcgaaccgcc  9420 gaacccaaag ggagcggatt tagagtccgc cgcgtttagc cacttcgcta cccctccggt  9480
gtctctatca ctgatagga acttataagt ctctatcact gataggat tcacgtttat  9540 ggtgatttcc cagaacacat agcgacatgc aaatattaaa aaatggtggg ggaaggattc  9600
gaaccttcga agtctgtgac ggcagattta gagtctgctc cctttggccg ctcgggaacc  9660
ccaccggtgt ttcgtccttt ccacaagata tataaagcca agaaatcgaa atactttcaa  9720
gttacggtaa gcatatgata gtccatttta aaacataatt ttaaaactgc aaactaccca  9780
```

```
agaaattatt actttctacg tcacgtattt tgtactaata tctttgtgtt tacagtcaaa    9840
ttaattctaa ttatctctct aacagccttg tatcgtatat gcaaatatga aggaatcatg    9900
ggaaataggc cctcttcctg cccgacctag caaaaaatgg aggggacgg attcgaaccg     9960 ccgaacccaa agggagcgga tttagagtcc gccgcgttta gccacttcgc taccctccg    10020 gtgtctctat cactgatagg gaacttataa gtctctatca ctgataggga tttcacgttt   10080
atggtgattt cccagaacac atagcgacat gcaaatatta aaaatggtg ggggaaggat    10140 tcgaaccttc gaagtctgtg acggcagatt tagagtctgc tccctttggc cgctcgggaa   10200
ccccaccggt gtttcgtcct ttccacaaga tatataaagc caagaaatcg aaatactttc   10260
aagttacggt aagcatatga tagtccattt taaaacataa ttttaaaact gcaaactacc   10320
caagaaatta ttactttcta cgtcacgtat tttgtactaa tatctttgtg tttacagtca   10380
aattaattct aattatctct ctaacagcct tgtatcgtat atgcaaatat gaaggaatca   10440
tgggaaatag gccctcttcc tgcccgacct agtcaataat caatgtcaac gcgtatatct   10500
ggcccgtaca tcgcgaagca gcgcaaaacg atcctgcag gtatttgcgg ccgcggtccg    10560
tatactccgg aatattaata gatcatggag ataattaaaa tgataaccat ctcgcaaata   10620
aataagtatt ttactgtttt cgtaacagtt ttgtaataaa aaacctata aatattccgg    10680 attattcata ccgtcccacc atcgggcgcg aactcctaaa aaaccgccac catgaagtgc   10740
cttttgtact tagccttttt attcattggg gtgaattgca agttcaccat agtttttcca   10800
cacaaccaaa aaggaaactg gaaaaatgtt ccttctaatt accattattg cccgtcaagc   10860
tcagatttaa attggcataa tgacttaata ggcacagcct tacaagtcaa aatgcccaag   10920
agtcacaagg ctattcaagc agacggttgg atgtgtcatg cttccaaatg ggtcactact   10980
tgtgatttcc gctggtatgg accgaagtat ataacacatt ccatccgatc cttcactcca   11040
tctgtagaac aatgcaagga aagcattgaa caaacgaaac aaggaacttg gctgaatcca   11100
ggcttccctc ctcaaagttg tggatatgca actgtgacgg atgccgaagc agtgattgtc   11160
caggtgactc ctcaccatgt gctggttgat gaatacacag gagaatgggt tgattcacag   11220
ttcatcaacg gaaaatgcag caattacata tgccccactg tccataactc tacaacctgg   11280
cattctgact ataaggtcaa agggctatgt gattctaacc tcatttccat ggacatcacc   11340
ttcttctcag aggacggaga gctatcatcc ctgggaaagg agggcacagg gttcagaagt   11400
aactactttg cttatgaaac tggaggcaag gcctgcaaaa tgcaatactg caagcattgg   11460
ggagtcagac tccatcagg tgtctggttc gagatggctg ataaggatct ctttgctgca   11520
gccagattcc ctgaatgccc agaagggtca agtatctctg ctccatctca gacctcagtg   11580
gatgtaagtc taattcagga cgttgagagg atcttggatt attccctctg ccaagaaacc   11640
tggagcaaaa tcagagcggg tcttccaatc tctccagtgg atctcagcta tcttgctcct   11700
aaaaacccag gaaccggtcc tgctttcacc ataatcaatg gtaccctaaa atactttgag   11760
accagataca tcagagtcga tattgctgct ccaatcctct caagaatggt cggaatgatc   11820
agtggaacta ccacagaaag ggaactgtgg gatgactggg caccatatga agacgtggaa   11880
attggaccca atggagttct gaggaccagt tcaggatata agtttccttt atacatgatt   11940
ggacatggta tgttggactc cgatcttcat cttagctcaa aggctcaggt gttcgaacat   12000
cctcacattc aagacgctgc ttcgcaactt cctgatgatg agagtttatt ttttggtgat   12060
actgggctat ccaaaaatcc aatcgagctt gtagaaggtt ggttcagtag ttggaaaagc   12120
```

| tctattgcct cttttttctt tatcataggg ttaatcattg gactattctt ggttctccga | 12180 |
| gttggtatcc atctttgcat taaattaaag cacaccaaga aaagacagat ttatacagac | 12240 |
| atagagatga accgacttgg aaagtgataa ggccaggccg gccaagcttg tcgagaagta | 12300 |
| ctagaggatc ataatcagcc ataccacatt tgtagaggtt ttacttgctt taaaaaacct | 12360 |
| cccacacctc cccctgaacc tgaaacataa aatgaatgca attgttgttg ttaacttgtt | 12420 |
| tattgcagct tataatggtt acaaataaag caatagcatc acaaatttca caaataaagc | 12480 |
| atttttttca ctgcattcta gttgtggttt gtccaaactc atcaatgtat cttatcatgt | 12540 |
| ctggatctga tcactgcttg agcctaggag atccgaacca gataagtgaa atctagttcc | 12600 |
| aaactatttt gtcatttta attttcgtat tagcttacga cgctacaccc agttcccatc | 12660 |
| tattttgtca ctcttcccta aataatcctt aaaaactcca tttccacccc tcccagttcc | 12720 |
| caactatttt gtccgcccac agcggggcat ttttcttcct gttatgtttt taatcaaaca | 12780 |
| tcctgccaac tccatgtgac aaaccgtcat cttcggctac ttt | 12823 |

<210> SEQ ID NO 16
<211> LENGTH: 17697
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 16

| cctgttatgt ttttaatcaa acatcctgcc aactccatgt gacaaaccgt catcttcggc | 60 |
| tactttttct ctgtcacaga atgaaaattt ttctgtcatc tcttcgttat taatgtttgt | 120 |
| aattgactga atatcaacgc ttatttgcag cctgaatggc gaatgggacg cgccctgtag | 180 |
| cggcgcatta agcgcggcgg gtgtggtggt tacgcgcagc gtgaccgcta cacttgccag | 240 |
| cgccctagcg cccgctcctt tcgctttctt cccttccttt ctcgccacgt tcgccggctt | 300 |
| tccccgtcaa gctctaaatc gggggctccc tttagggttc cgatttagtg ctttacggca | 360 |
| cctcgacccc aaaaaacttg attagggtga tggttcacgt agtgggccat cgccctgata | 420 |
| gacggttttt cgccctttga cgttggagtc cacgttcttt aatagtggac tcttgttcca | 480 |
| aactggaaca cactcaacc ctatctcggt ctattctttt gatttataag ggattttgcc | 540 |
| gatttcggcc tattggttaa aaaatgagct gatttaacaa aaatttaacg cgaattttaa | 600 |
| caaaatatta acgttacaa tttcaggtgg cacttttcgg ggaaatgtgc gcggaacccc | 660 |
| tatttgttta ttttttctaaa tacattcaaa tatgtatccg ctcatgagac aataaccctg | 720 |
| ataaatgctt caataatatt gaaaaaggaa gagtatgagt attcaacatt tccgtgtcgc | 780 |
| ccttattccc ttttttgcgg cattttgcct tcctgttttt gctcacccag aaacgctggt | 840 |
| gaaagtaaaa gatgctgaag atcagttggg tgcacgagtg ggttacatcg aactggatct | 900 |
| caacagcggt aagatccttg agagttttcg ccccgaagaa cgttttccaa tgatgagcac | 960 |
| ttttaaagtt ctgctatgtg gcgcggtatt atcccgtatt gacgccgggc aagagcaact | 1020 |
| cggtcgccgc atacactatt ctcagaatga cttggttgag tactcaccag tcacagaaaa | 1080 |
| gcatcttacg gatggcatga cagtaagaga attatgcagt gctgccataa ccatgagtga | 1140 |
| taacactgcg gccaacttac ttctgacaac gatcggagga ccgaaggagc taaccgcttt | 1200 |
| tttgcacaac atgggggatc atgtaactcg ccttgatcgt tgggaaccgg agctgaatga | 1260 |
| agccatacca aacgacgagc gtgacaccac gatgcctgta gcaatggcaa caacgttgcg | 1320 |

```
caaactatta actggcgaac tacttactct agcttcccgg caacaattaa tagactggat    1380
ggaggcggat aaagttgcag gaccacttct gcgctcggcc cttccggctg ctggtttat     1440 tgctgataaa tctggagccg gtgagcgtgg gtctcgcggt atcattgcag cactggggcc    1500
agatggtaag ccctcccgta tcgtagttat ctacacgacg gggagtcagg caactatgga    1560
tgaacgaaat agacagatcg ctgagatagg tgcctcactg attaagcatt ggtaactgtc    1620
agaccaagtt tactcatata tactttagat tgatttaaaa cttcattttt aatttaaaag    1680
gatctaggtg aagatccttt ttgataatct catgaccaaa atcccttaac gtgagttttc    1740
gttccactga gcgtcagacc ccgtagaaaa gatcaaagga tcttcttgag atcctttttt    1800
tctgcgcgta atctgctgct tgcaaacaaa aaaaccaccg ctaccagcgg tggtttgttt    1860
gccggatcaa gagctaccaa ctcttttttcc gaaggtaact ggcttcagca gagcgcagat    1920
accaaatact gtccttctag tgtagccgta gttaggccac cacttcaaga actctgtagc    1980
accgcctaca tacctcgctc tgctaatcct gttaccagtg gctgctgcca gtggcgataa    2040
gtcgtgtctt accgggttgg actcaagacg atagttaccg gataaggcgc agcggtcggg    2100
ctgaacgggg ggttcgtgca cacagcccag cttggagcga acgacctaca ccgaactgag    2160
atacctacag cgtgagcatt gagaaagcgc cacgcttccc gaagggagaa aggcggacag    2220
gtatccggta agcggcaggg tcggaacagg agagcgcacg agggagcttc caggggggaaa   2280 cgcctggtat ctttatagtc ctgtcgggtt tcgccacctc tgacttgagc gtcgattttt    2340
gtgatgctcg tcaggggggc ggagcctatg gaaaaacgcc agcaacgcgg ccttttttacg   2400 gttcctggcc ttttgctggc cttttgctca catgttcttt cctgcgttat cccctgattc    2460
tgtggataac cgtattaccg cctttgagtg agctgatacc gctcgccgca gccgaacgac    2520
cgagcgcagc gagtcagtga gcgaggaagc ggaagagcgc ctgatgcggt attttctcct    2580
tacgcatctg tgcggtattt cacaccgcag accagccgcg taacctggca aaatcggtta    2640
cggttgagta ataaatggat gccctgcgta agcgggtgtg ggcggacaat aaagtcttaa    2700
actgaacaaa atagatctaa actatgacaa taaagtctta aactagacag aatagttgta    2760
aactgaaatc agtccagtta tgctgtgaaa aagcatactg gacttttgtt atggctaaag    2820
caaactcttc attttctgaa gtgcaaattg cccgtcgtat taaagagggg cgtggccaag    2880
ggcatggtaa agactatatt cgcggcgttg tgacaattta ccgaacaact ccgcggccgg    2940
gaagccgatc tcggcttgaa cgaattgtta ggtggcggta cttgggtcga tatcaaagtg    3000
catcacttct tcccgtatgc ccaactttgt atagagagcc actgcgggat cgtcaccgta    3060
atctgcttgc acgtagatca cataagcacc aagcgcgttg gcctcatgct tgaggagatt    3120
gatgagcgcg gtggcaatgc cctgcctccg gtgctcgccg gagactgcga gatcatagat    3180
atagatctca ctacgcggct gctcaaacct gggcagaacg taagccgcga gagcgccaac    3240
aaccgcttct tggtcgaagg cagcaagcgc gatgaatgtc ttactacgga gcaagttccc    3300
gaggtaatcg gagtccggct gatgttggga gtaggtggct acgtctccga actcacgacc    3360
gaaaagatca agagcagccc gcatggattt gacttggtca gggccgagcc tacatgtgcg    3420
aatgatgccc atacttgagc cacctaactt tgttttaggg cgactgccct gctgcgtaac    3480
atcgttgctg ctgcgtaaca tcgttgctgc tccataacat caaacatcga cccacggcgt    3540
aacgcgcttg ctgcttggat gcccgaggca tagactgtac aaaaaaacag tcataacaag    3600
ccatgaaaac cgccactgcg ccgttaccac cgctgcgttc ggtcaaggtt ctggaccagt    3660
```

-continued

```
tgcgtgagcg catacgctac ttgcattaca gtttacgaac cgaacaggct tatgtcaact      3720
gggttcgtgc cttcatccgt ttccacggtg tgcgtcaccc ggcaaccttg ggcagcagcg      3780
aagtcgaggc atttctgtcc tggctggcga acgagcgcaa ggtttcggtc tccacgcatc      3840
gtcaggcatt ggcggccttg ctgttcttct acggcaaggt gctgtgcacg gatctgccct      3900
ggcttcagga gatcggtaga cctcggccgt cgcggcgctt gccggtggtg ctgaccccgg      3960
atgaagtggt tcgcatcctc ggttttctgg aaggcgagca tcgtttgttc gcccaggact      4020
ctagctatag ttctagtggt tggctacgta cccgtagtgg ctatggcagg gcttgcgctt      4080
aatgcgccgc tacagggcgc gtggggatac cccctagagc cccagctgaa aaaatggagg      4140
gggacggatt cgaaccgccg aacccaaagg gagcggattt agagtccgcc gcgtttagcc      4200
acttcgctac ccctccggtg tctctatcac tgatagggaa cttataagtc tctatcactg      4260
atagggattt cacgtttatg gtgatttccc agaacacata gcgacatgca aatattaaaa      4320
aatggtgggg gaaggattcg aaccttcgaa gtctgtgacg gcagatttag agtctgctcc      4380
cttttggccgc tcgggaaccc caccggtgtt tcgtcctttc cacaagatat ataaagccaa      4440
gaaatcgaaa tactttcaag ttacggtaag catatgatag tccattttaa aacataattt      4500
taaaactgca aactacccaa gaaattatta cttttctacgt cacgtatttt gtactaatat      4560
ctttgtgttt acagtcaaat taattctaat tatctctcta acagccttgt atcgtatatg      4620
caaatatgaa ggaatcatgg gaaataggcc ctcttcctgc ccgagatctg gttctttccg      4680
cctcagaagc catagagccc accgcatccc cagcatgcct gctattgtct tcccaatcct      4740
cccccttgct gtcctgcccc accccacccc ccagaataga atgacaccta ctcagacaat      4800
gcgatgcaat ttcctcattt tattaggaaa ggacagtggg agtggcacct tccagggtca      4860
aggaaggcac gggggagggg caaacaacag atggctggca actagaaggc acagtcgagg      4920
ctgatcagcg ggtttaaacg ggccctctag actcgagtta aagtcgactt aacgcgttga      4980
attcttaaac gggccctttc cagcaaatca gacagtaatt cttttttaccg cgacgcagta      5040
aggtaaaacg accaaacaga cgatcttctt ctttaaagaa gtattcagga tcggactgtt      5100
tttcaccgtt aatggtgatg gcattggagg cgatagtttt acgtgcctga ccacgggaag      5160
gttgcagttc agaatcgacc agtgcctgca tcaggtctgc gcccttttcc atctcaacca      5220
tcggtacgcc gtcctgcgcc agctgttcga agtccgcttc actcagcgca ctcaaagaac      5280
cgctgaacag gcattcggta atacgttttg ccgcctgtaa accttcttca ccgtgaacca      5340
gacgagtcac ctgctccgcc agtacatact gggcgcgcgg tgctttaccg ctgttttat       5400
cttcttcttc cagggcgttg atctcttcaa tgctcataaa ggtgaagaac ttcaggaagc      5460
ggtaaacgtc ggcatccgca gtgttgatcc agaactggta gaatttgtac gggctggttt      5520
tcttcgggtc caaccagact gcgccgcctt cagttttacc aaatttggtg ccatctgctt      5580
tagtgatcag cggaacggtc aggccaaaca cctgattctg atgcagacga cgggtcaggt      5640
cgataccaga agtgatgtta ccccattggt cagaaccacc aatttgcagc accacaccgt      5700
actgtttgtt agcacaggcc ataccataac cctggagcag gttgtaggaa aactcagtga      5760
acgaaatccc ctgaccttca cggttgagac gctgcttaac cgcttctttg ttgatcatct      5820
ggttaacgga gaagtgtttg ccaatatcgc gcaggaaggt cagcacattc atattgccga      5880
accagtcata attattggcc gcgatagcag agttttctcc acagtcgaaa tcgaggaacg      5940
gggcaacctg cttacggatt ttgtccaccc actcctgaac agtttcttcg gtgttcagct      6000
tacgctcggc agctttgaag ctcgggtcgc caatcagacc cgtcgcgccg cctaccagcg      6060
```

```
caaccggctt gtggcccgcc tgctggaagc gtttcaggca taacaatgga acaagatgcc      6120
ccaaatgcaa gctgtcagcg gtaggatcga agccacaaat gagtgcgatc gggccttgcg      6180
ccagtcgctc tgctaacgct tcctcgtccg tcacctgggc taccagcccc cgctcttgca      6240
attgtttaat caagttactg cttgccatgg tggcgctagc cagcttgggt ctccctatag      6300
tgagtcgtat taatttcgat aagccagtaa gcagtgggtt ctctagttag ccagagagct      6360
ctagaccaag tgacgatcac agcgatccac aaacaagaac cgcgacccaa atcccggctg      6420
cgacggaact agctgtgcca cacccggcgc gtccttatat aatcatcggc gttcaccgcc      6480
ccacggagat ccctccgcag aatcgccgag aagggactac ttttcctcgc ctgttccgct      6540
ctctggaaag aaaaccagtg ccctagagtc acccaagtcc cgtcctaaaa tgtccttctg      6600
ctgatactgg ggttctaagg ccgagtctta tgagcagcgg gccgctgtcc tgagcgtccg      6660
ggcggaagga tcaggacgct cgctgcgccc ttcgtctgac gtggcagcgc tcgccgtgag      6720 gagggggggcg cccgcgggag cgccaaaaac cggcgcgga ggccttcgaa cggccactag       6780
caaaaaatgg aggggacgg attcgaaccg ccgaacccaa agggagcgga tttagagtcc       6840
gccgcgttta gccacttcgc taccccctccg gtgtctctat cactgatagg gaacttataa      6900
gtctctatca ctgataggga tttcacgttt atggtgattt cccagaacac atagcgacat      6960
gcaaatatta aaaatggtg ggggaaggat tcgaaccttc gaagtctgtg acggcagatt       7020
tagagtctgc tccctttggc cgctcgggaa ccccaccggt gtttcgtcct ttccacaaga      7080
tatataaagc caagaaatcg aaatactttc aagttacggt aagcatatga tagtccattt      7140
taaaacataa ttttaaaact gcaaactacc caagaaatta ttactttcta cgtcacgtat      7200
tttgtactaa tatctttgtg tttacagtca aattaattct aattatctct ctaacagcct      7260
tgtatcgtat atgcaaatat gaaggaatca tgggaaatag ccctcttcc tgcccgacct       7320 agcaaaaaat ggaggggggac ggattcgaac cgccgaaccc aaagggagcg gatttagagt      7380
ccgccgcgtt tagccacttc gctacccctc cggtgtctct atcactgata gggaacttat      7440
aagtctctat cactgatagg gatttcacgt ttatggtgat tcccagaac acatagcgac       7500 atgcaaatat taaaaatggt gggggaaggg attcgaacct tcgaagtctg tgacggcaga      7560
tttagagtct gctccctttg gccgctcggg aaccccaccg tgtttcgtc cttccacaa       7620 gatatataaa gccaagaaat cgaaatactt tcaagttacg gtaagcatat gatagtccat      7680
tttaaaacat aattttaaaa ctgcaaacta cccaagaaat tattactttc tacgtcacgt      7740
attttgtact aatatctttg tgtttacagt caaattaatt ctaattatct ctctaacagc      7800
cttgtatcgt atatgcaaat atgaaggaat catgggaaat aggccctctt cctgcccgac      7860
ctagcaaaaa atgagggggg acggattcga accgccgaac ccaaagggag cggatttaga      7920
gtccgccgcg tttagccact tcgctacccc tccggtgtct ctatcactga tagggaactt      7980
ataagtctct atcactgata gggatttcac gtttatggtg atttcccaga acacatagcg      8040
acatgcaaat attaaaaaat ggtgggggaa ggattcgaac cttcgaagtc tgtgacggca      8100
gatttagagt ctgctccctt tggccgctcg ggaaccccac cggtgtttcg tccttttccac      8160 aagatatata aagccaagaa atcgaaatac tttcaagtta cggtaagcat atgatagtcc      8220
attttaaaac ataattttaa aactgcaaac tacccaagaa attattactt tctacgtcac      8280
gtattttgta ctaatatctt tgtgtttaca gtcaaattaa ttctaattat ctctctaaca      8340
gccttgtatc gtatatgcaa atatgaagga atcatgggaa ataggccctc ttcctgcccg      8400
```

```
acctagcaaa aaatggaggg ggacggattc gaaccgccga acccaaaggg agcggattta    8460
gagtccgccg cgtttagcca cttcgctacc cctccggtgt ctctatcact gatagggaac    8520
ttataagtct ctatcactga tagggatttc acgtttatgg tgatttccca gaacacatag    8580
cgacatgcaa atattaaaaa atggtggggg aaggattcga accttcgaag tctgtgacgg    8640
cagatttaga gtctgctccc tttggccgct cgggaacccc accggtgttt cgtcctttcc    8700
acaagatata taaagccaag aaatcgaaat actttcaagt tacggtaagc atatgatagt    8760
ccattttaaa acataatttt aaaactgcaa actacccaag aaattattac tttctacgtc    8820
acgtattttg tactaatatc tttgtgttta cagtcaaatt aattctaatt atctctctaa    8880
cagccttgta tcgtatatgc aaatatgaag gaatcatggg aaataggccc tcttcctgcc    8940
cgacctagca aaaatggag ggggacggat tcgaaccgcc gaacccaaag ggagcggatt    9000
tagagtccgc cgcgtttagc cacttcgcta cccctccggt gtctctatca ctgataggga    9060
acttataagt ctctatcact gatagggatt tcacgtttat ggtgatttcc cagaacacat    9120
agcgacatgc aaatattaaa aatggtgggg gaaggattc gaaccttcga agtctgtgac    9180
ggcagattta gagtctgctc cctttggccg ctcgggaacc ccaccggtgt ttcgtccttt    9240
ccacaagata tataaagcca agaaatcgaa atactttcaa gttacggtaa gcatatgata    9300
gtccatttta aacataatt ttaaaactgc aaactaccca agaaattatt actttctacg    9360
tcacgtattt tgtactaata tctttgtgtt tacagtcaaa ttaattctaa ttatctctct    9420
aacagccttg tatcgtatat gcaaatatga aggaatcatg ggaataggc cctcttcctg    9480
cccgacctag caaaaatgg aggggacgg attcgaaccg ccgaacccaa agggagcgga    9540
tttagagtcc gccgcgttta gccacttcgc taccctccg gtgtctctat cactgatagg    9600
gaacttataa gtctctatca ctgatagga tttcacgttt atggtgattt cccagaacac    9660
atagcgacat gcaaatatta aaaatggtg ggggaaggat tcgaaccttc gaagtctgtg    9720
acggcagatt tagagtctgc tcccttggc cgctcgggaa ccccaccggt gtttcgtcct    9780
ttccacaaga tatataaagc caagaaatcg aaatactttc aagttacggt aagcatatga    9840
tagtccattt taaaacataa ttttaaaact gcaaactacc caagaaatta ttactttcta    9900
cgtcacgtat tttgtactaa tatctttgtg tttacagtca aattaattct aattatctct    9960
ctaacagcct tgtatcgtat atgcaaatat gaaggaatca tgggaaatag gccctcttcc    10020
tgcccgacct agcaaaaat ggaggggac ggattcgaac cgccgaaccc aaagggagcg    10080
gatttagagt ccgccgcgtt tagccacttc gctacccctc cggtgtctct atcactgata    10140
gggaacttat aagtctctat cactgatagg gatttcacgt ttatggtgat ttcccagaac    10200
acatagcgac atgcaaatat taaaaatgg tggggaagg attcgaacct tcgaagtctg    10260
tgacggcaga tttagagtct gctccctttg gccgctcggg aaccccaccg tgtttcgtc    10320
ctttccacaa gatatataaa gccaagaaat cgaaatactt tcaagttacg gtaagcatat    10380
gatagtccat tttaaaacat aattttaaaa ctgcaaacta cccaagaaat tattactttc    10440
tacgtcacgt attttgtact aatatctttg tgtttacagt caaattaatt ctaattatct    10500
ctctaacagc cttgtatcgt atatgcaaat atgaaggaat catgggaaat aggccctctt    10560
cctgcccgac ctagcaaaaa atggagggg acggattcga accgccgaac ccaaagggag    10620
cggatttaga gtccgccgcg tttagccact tcgctacccc tccggtgtct ctatcactga    10680
tagggaactt ataagtctct atcactgata gggatttcac gtttatggtg atttcccaga    10740
acacatagcg acatgcaaat attaaaaaat ggtggggaa ggattcgaac cttcgaagtc    10800
```

```
tgtgacggca gatttagagt ctgctccctt tggccgctcg ggaacccac  cggtgtttcg   10860 tcctttccac aagatatata aagccaagaa atcgaaatac tttcaagtta cggtaagcat   10920
atgatagtcc attttaaaac ataattttaa aactgcaaac tacccaagaa attattactt   10980
tctacgtcac gtattttgta ctaatatctt tgtgtttaca gtcaaattaa ttctaattat   11040
ctctctaaca gccttgtatc gtatatgcaa atatgaagga atcatgggaa ataggccctc   11100
ttcctgcccg acctagtcaa taatcaatgt caacgcgtat atctggcccg tacatcgcga   11160
agcagcgcaa aacggatcct gcaggtattt gcggccgcgg tccgtatact ccggaatatt   11220
aatagatcat ggagataatt aaaatgataa ccatctcgca aataaataag tattttactg   11280
ttttcgtaac agttttgtaa taaaaaaacc tataaatatt ccggattatt cataccgtcc   11340
caccatcggg cgcgaactcc taaaaaaccg ccaccatgaa gtgccttttg tacttagcct   11400
ttttattcat tggggtgaat tgcaagttca ccatagtttt tccacacaac caaaaaggaa   11460
actggaaaaa tgttccttct aattaccatt attgcccgtc aagctcagat ttaaattggc   11520
ataatgactt aataggcaca gccttacaag tcaaaatgcc caagagtcac aaggctattc   11580
aagcagacgt ttgatgtgt  catgcttcca aatgggtcac tacttgtgat ttccgctggt   11640
atggaccgaa gtatataaca cattccatcc gatccttcac tccatctgta gaacaatgca   11700
aggaaagcat tgaacaaacg aaacaaggaa cttggctgaa tccaggcttc cctcctcaaa   11760
gttgtggata tgcaactgtg acggatgccg aagcagtgat tgtccaggtg actcctcacc   11820
atgtgctggt tgatgaatac acaggagaat gggttgattc acagttcatc aacggaaaat   11880
gcagcaatta catatgcccc actgtccata actctacaac ctggcattct gactataagg   11940
tcaaagggct atgtgattct aacctcattt ccatggacat caccttcttc tcagaggacg   12000
gagagctatc atccctggga aaggagggca cagggttcag aagtaactac tttgcttatg   12060
aaactggagg caaggcctgc aaaatgcaat actgcaagca ttggggagtc agactcccat   12120
caggtgtctg gttcgagatg gctgataagg atctctttgc tgcagccaga ttccctgaat   12180
gcccagaagg gtcaagtatc tctgctccat ctcagacctc agtggatgta agtctaattc   12240
aggacgttga gaggatcttg gattattccc tctgccaaga aacctggagc aaaatcagag   12300
cgggtcttcc aatctctcca gtggatctca gctatcttgc tcctaaaaac ccaggaaccg   12360
gtcctgcttt caccataatc aatggtaccc taaaatactt tgagaccaga tacatcgag   12420 tcgatattgc tgctccaatc ctctcaagaa tggtcggaat gatcagtgga actaccacag   12480
aaagggaact gtgggatgac tgggcaccat atgaagacgt ggaaattgga cccaatggag   12540
ttctgaggac cagttcagga tataagtttc ctttatacat gattggacat ggtatgttgg   12600
actccgatct tcatcttagc tcaaaggctc aggtgttcga acatcctcac attcaagacg   12660
ctgcttcgca acttcctgat gatgagagtt tattttttgg tgatactggg ctatccaaaa   12720
atccaatcga gcttgtagaa ggttggttca gtagttggaa aagctctatt gcctcttttt   12780
tctttatcat agggttaatc attggactat tcttggttct ccgagttggt atccatcttt   12840
gcattaaatt aaagcacacc aagaaaagac agatttatac agacatagag atgaaccgac   12900
ttggaaagtg ataagtcgag aagtactaga ggatcataat cagccatacc acatttgtag   12960
aggttttact tgctttaaaa aacctcccac acctccccct gaacctgaaa cataaaatga   13020
atgcaattgt tgttgttaac ttgttttattg cagcttataa tggttacaaa taaagcaata   13080
gcatcacaaa tttcacaaat aaagcatttt tttcactgca ttctagttgt ggtttgtcca   13140
```

```
aactcatcaa tgtatcttat catgtctgga tctgatcact gcttgagcct agttattaat   13200
agtaatcaat tacggggtca ttagttcata gcccatatat ggagttccgc gttacataac   13260
ttacggtaaa tggcccgcct ggctgaccgc ccaacgaccc ccgcccattg acgtcaataa   13320
tgacgtatgt tcccatagta acgccaatag ggactttcca ttgacgtcaa tgggtggagt   13380
atttacggta aactgcccac ttggcagtac atcaagtgta tcatatgcca agtacgcccc   13440
ctattgacgt caatgacggt aaatggcccg cctggcatta tgcccagtac atgaccttat   13500
gggactttcc tacttggcag tacatctacg tattagtcat cgctattacc atggtcgagg   13560
tgagccccac gttctgcttc actctcccca tctcccccc ctcccaccc ccaattttgt   13620 atttatttat tttttaatta ttttgtgcag cgatggggc gggggggggg ggggcgcgcg   13680
ccaggcgggg cggggcgggg cgaggggcgg ggcggggcga ggcggagagg tgcggcggca   13740
gccaatcaga gcggcgcgct ccgaaagttt cctttttatgg cgaggcggcg gcggcggcgg   13800
ccctataaaa agcgaagcgc gcggcgggcg ggagtcgctg cgttgccttc gccccgtgcc   13860
ccgctccgcg ccgcctcgcg ccgcccgccc cggctctgac tgaccgcgtt actcccacag   13920
gtgagcgggc gggacggccc ttctcctccg ggctgtaatt agcgcttggt ttaatgacgg   13980
ctcgtttctt ttctgtggct gcgtgaaagc cttaaagggc tccggagggc ccctttgtgc   14040 ggggggggagc ggctcggggg gtgcgtgcgt gtgtgtgtgc gtggggagcg ccgcgtgcgg   14100
cccgcgctgc ccggcggctg tgagcgctgc gggcgcggcg cggggctttg tgcgctccgc   14160
gtgtgcgcga ggggagcgcg ccggggggcg gtgccccgcg gtgcggggg gctgcgaggg   14220 gaacaaaggc tgcgtgcggg gtgtgtgcgt gggggggtga gcaggggtg tgggcgcggc   14280 ggtcgggctg taacccccc ctgcacccc ctccccgagt tgctgagcac ggcccggctt   14340
cgggtgcggg gctccgtgcg gggcgtgcg cggggctcgc cgtgccgggc gggggtggc   14400 ggcaggtggg ggtgccgggc ggggcgggc cgcctcgggc cggggagggc tcggggagg   14460 ggcgcggcgc ccccggagcg ccggcggctg tcgaggcgcg gcgagccgca gccattgcct   14520
tttatggtaa tcgtgcgaga gggcgcaggg acttcctttg tcccaaatct ggcggagccg   14580
aaatctggga ggcgccgccg caccccctct agcgggcgcg ggcgaagcgg tgcggcgccg   14640
gcaggaagga aatgggcggg gagggccttc gtgcgtcgcc gcgccgccgt cccccttctcc   14700 atctccagcc tcgggctgc cgcaggggga cggctgcctt cgggggggac ggggcagggc   14760
ggggttcggc ttctggcgtg tgaccggcgg ctctagagcc tctgctaacc atgttcatgc   14820
cttcttcttt ttcctacagc tcctgggcaa cgtgctggtt attgtgctgt ctcatcattt   14880
tggcaaagaa ttggccaagg aggccaccat gaaacactca ttaaacgcac ttctcatttt   14940
cctcatcata acatctgcgt gggtgggag caaaggcccg ctggatcagc tagagaaagg   15000
aggggaaact gctcagtctg cagatcccca gtgggagcag ttaaataaca aaaacctgag   15060
catgcctctt ctccctgccg acttccacaa ggaaaacacc gtcaccaacg actggattcc   15120 agaggggggag gaggacgacg actatctgga cctgagaag atattcagtg aagacgacga   15180
ctacatcgac atcgtcgaca gtctgtcagt ttccccgaca gactctgatg tgagtgctgg   15240
gaacatcctc cagcttttttc atggcaagag ccggatccag cgtcttaaca tcctcaacgc   15300
caagttcgct ttcaacctct accgagtgct gaaagaccag gtcaacactt tcgataacat   15360
cttcatagca cccgttggca tttctactgc gatgggtatg atttccttag gtctgaaggg   15420
agagacccat gaacaagtgc actcgatttt gcatttaaaa gactttgtta atgccagcag   15480
caagtatgaa atcacgacca ttcataatct cttccgtaag ctgactcatc gcctcttcag   15540
```

-continued

```
gaggaattt  gggtacacac  tgcggtcagt  caatgacctt  tatatccaga  agcagtttcc    15600
aatcctgctt  gacttcaaaa  ctaaagtaag  agagtattac  tttgctgagg  cccagatagc    15660
tgacttctca  gaccctgcct  tcatatcaaa  aaccaacaac  cacatcatga  agctcaccaa    15720
gggcctcata  aaagatgctc  tggagaatat  agaccctgct  acccagatga  tgattctcaa    15780
ctgcatctac  ttcaaaggat  cctgggtgaa  taaattccca  gtggaaatga  cacacaacca    15840
caacttccgg  ctgaatgaga  gagaggtagt  taaggtttcc  atgatgcaga  ccaaggggaa    15900
cttcctcgca  gcaaatgacc  aggagctgga  ctgcgacatc  ctccagctgg  aatacgtggg    15960
gggcatcagc  atgctaattg  tggtcccaca  caagatgtct  gggatgaaga  ccctcgaagc    16020
gcaactgaca  ccccgggtgg  tggagagatg  gcaaaaaagc  atgacaaaca  gaactcgaga    16080
agtgcttctg  ccgaaattca  agctggagaa  gaactacaat  ctagtggagt  ccctgaagtt    16140
gatggggatc  aggatgctgt  ttgacaaaaa  tggcaacatg  gcaggcatct  cagaccaaag    16200
gatcgccatc  gacctgttca  agcaccaagg  cacgatcaca  gtgaacgagg  aaggcaccca    16260
agccaccact  gtgaccacgg  tggggttcat  gccgctgtcc  acccaagtcc  gcttcactgt    16320
cgaccgcccc  tttctttcc  tcatctacga  gcaccgcacc  agctgcctgc  tcttcatggg    16380
aagagtggcc  aaccccagca  ggtcccatca  tcaccatcat  catcaccacc  atcattgagg    16440
cctggccggc  cgccagcaca  gtggtcgatc  gaccaatgcc  ctggctcaca  ataccactg    16500
agatctttt   ccctctgcca  aaaattatgg  ggacatcatg  aagcccttg   agcatctgac    16560
ttctggctaa  taaaggaaat  ttattttcat  tgcaatagtg  tgttggaatt  ttttgtgtct    16620
ctcactcgga  aggacatatg  ggagggcaaa  tcatttaaaa  catcagaatg  agtatttggt    16680
ttagagtttg  gcaacatatg  cccatatgct  ggctgccatg  aacaaaggtt  ggctataaag    16740
aggtcatcag  tatatgaaac  agcccctgc   tgtccattcc  ttattccata  gaaaagcctt    16800
gacttgaggt  tagattttt   ttatattttg  ttttgtgtta  ttttttct    taacatccct    16860
aaaatttcc   ttacatgttt  tactagccag  attttcctc   ctctcctgac  tactcccagt    16920
catagctgtc  cctcttctct  tatggagatc  cctcgacctg  ccctaggtcg  ggcaggaaga    16980
gggcctattt  cccatgattc  cttcatattt  gcatatacga  tacaaggctg  ttagagagat    17040
aattagaatt  aatttgactg  taaacacaaa  gatattagta  caaaatacgt  gacgtagaaa    17100
gtaataattt  cttgggtagt  ttgcagtttt  aaaattatgt  tttaaaatgg  actatcatat    17160
gcttaccgta  acttgaaagt  atttcgattt  cttggctta   tatatcttgt  ggaaaggacg    17220
aaacaccgg   ggggttcccg  agcggccaaa  gggagcagac  tctaaatctg  ccgtcacaga    17280
cttcgaaggt  tcgaatcctt  cccccaccat  tttttaatat  ttgcatgtcg  ctatgtgttc    17340
tgggaaatca  ccataaacgt  gaaatcccta  tcagtgatag  agacttataa  gttccctatc    17400
agtgatagag  acaccggagg  ggtagcgaag  tggctaaacg  cggcggactc  taaatccgct    17460
ccctttgggt  tcggcggttc  gaatccgtcc  ccctccattt  tttgctagga  gatccgaacc    17520
agataagtga  aatctagttc  caaactattt  tgtcattttt  aattttcgta  ttagcttacg    17580
acgctacacc  cagttcccat  ctattttgtc  actcttccct  aaataatcct  taaaaactcc    17640
atttccaccc  ctcccagttc  ccaactattt  tgtccgccca  cagcggggca  ttttttct     17697
```

<210> SEQ ID NO 17
<211> LENGTH: 23
<212> TYPE: DNA
<213> ORGANISM: Artificial Sequence
<220> FEATURE:

<221> NAME/KEY: source
<223> OTHER INFORMATION: /note="Description of Artificial Sequence:
      Synthetic oligonucleotide"

<400> SEQUENCE: 17
attacgctga cttgacggga cgg                                          23

<210> SEQ ID NO 18
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 18
cgcaaccggc ttgtggcccg cctgc                                        25

<210> SEQ ID NO 19
<211> LENGTH: 53
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (26)..(26)
<223> OTHER INFORMATION: a, c, t, g, unknown or other

<400> SEQUENCE: 19
gcaggcgggc cacaagccgg ttgcgnbtgt aggcggcgcg acgggtctga ttg          53

<210> SEQ ID NO 20
<211> LENGTH: 24
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 20
gttcgccgcg atagcagagt tttc                                         24

<210> SEQ ID NO 21
<211> LENGTH: 59
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (25)..(27)
<223> OTHER INFORMATION: a, c, t, g, unknown or other

<400> SEQUENCE: 21
gaaaactctg ctatcgcggc gaacnnntat gactggttcg gcaatatgaa tgtgctgac    59

<210> SEQ ID NO 22
<211> LENGTH: 28
<212> TYPE: DNA
<213> ORGANISM: Artificial Sequence
<220> FEATURE:
<221> NAME/KEY: source -continued

```
<223> OTHER INFORMATION: /note="Description of Artificial Sequence:
      Synthetic oligonucleotide"

<400> SEQUENCE: 22
gagatcatgt aggcctgata agcgtagc                                           28

<210> SEQ ID NO 23
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 23
gctagcgcca ccatggcaag ca                                                 22

<210> SEQ ID NO 24
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 24
aataatctcg agttatttcc agcaaatcag acagtaattc tttttacc                     48

<210> SEQ ID NO 25
<211> LENGTH: 53
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 25
tggcaaagaa ttggccaagg aggccaccat gaaacactca ttaaacgcac ttc               53

<210> SEQ ID NO 26
<211> LENGTH: 50
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 26
tggcggccgg ccaggcctca atgatggtgg tgatgatgat ggtgatgatg                   50

<210> SEQ ID NO 27
<211> LENGTH: 58
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 27
gtcgtcgtct tcactgaata tcttctccag gtccagaaag tcgtcgtcct cctccccc          58

<210> SEQ ID NO 28
```

```
<211> LENGTH: 58
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 28
gtcgtcgtct tcactgaata tcttctccag gtccagctag tcgtcgtcct cctccccc          58

<210> SEQ ID NO 29
<211> LENGTH: 60
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 29
ctggacctgg agaagatatt cagtgaagac gacgacttta tcgacatcgt cgacagtctg        60

<210> SEQ ID NO 30
<211> LENGTH: 60
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 30
ctggacctgg agaagatatt cagtgaagac gacgactaga tcgacatcgt cgacagtctg        60

<210> SEQ ID NO 31
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 31
ctggacctgg agaagatatt cagtgaagac gacgac                                  36

<210> SEQ ID NO 32
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 32
gtcgtcgtct tcactgaata tcttctccag gtccag                                  36

<210> SEQ ID NO 33
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic 6xHis tag"

<400> SEQUENCE: 33
```

```
His His His His His His
1               5

<210> SEQ ID NO 34
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic 10xHis tag"

<400> SEQUENCE: 34

His His His His His His His His His His
1               5                   10
```

GENETICALLY ENCODED TYROSINE SULFATION OF PROTEINS IN EUKARYOTES

RELATED APPLICATIONS

This application claims the benefit under 35 U.S.C. § 119(e) of U.S. Provisional Application No. 62/837,217, filed on Apr. 23, 2019, which is incorporated herein by reference in its entirety.

GOVERNMENT SUPPORT

The current technology was developed in part using funds supplied by the National Institutes of Health (NIH) under grant Nos. R01GM124319 and R01GM126220. Accordingly, the U.S. Government has certain rights to this invention.

INCORPORATION BY REFERENCE OF MATERIAL IN ASCII TEXT FILE

This application incorporates by reference the Sequence Listing contained in the following ASCII text file:

File name: 0342_0007WO1_BC2019-012-cha_SL.txt; created Apr. 23, 2020, 72,910 bytes in size.

FIELD OF THE INVENTION

The present invention is directed to genetically encoded protein sulfation in eukaryotes.

BACKGROUND OF THE INVENTION

Sulfation of tyrosine residues is a post-translational modification (PTM) that occurs exclusively in multicellular eukaryotes. Golgi-resident tyrosylprotein sulfotransferases (TPST1 and TPST2) use 3'-phosphoadenosine-5'-phosphosulfate (PAPS) as the sulfate donor to install this PTM (FIG. 1a). Consequently, only secreted and membrane-associated proteins, which are processed through the trans-Golgi network, are subjected to this modification. Tyrosine sulfation is believed to be irreversible and it facilitates numerous protein-protein and protein-ligand interactions that are important in diverse physiological processes such as immunity, hormone function, and blood-coagulation. Additionally, pathogens such as HIV rely on tyrosine-sulfated cell-surface receptors to gain access to human cells. In turn, our immune system employs tyrosine-sulfated antibodies to target such pathogens, attesting to the importance of this PTM in our biology.

It is estimated that ~1% of all tyrosine residues in the eukaryotic proteome are sulfated, but the physiological roles for the most remain poorly understood. A major factor contributing to this knowledge gap is the difficulty of expressing target proteins in a homogeneously sulfated state. Recombinant expression in common eukaryotic hosts often leads to incomplete sulfation of native sites. Additionally, many proteins are sulfated at multiple tyrosine residues, and the difficulty of only modifying a chosen subset of these makes it challenging to evaluate the roles of individual sulfations. Consequently, the ability to express recombinant proteins, where a specific group of tyrosine residues are sulfated is important to both understand and take advantage of the biology of protein sulfation. However, when proteins are overexpressed, the endogenous sulfotransferases cannot keep up with the high expression levels, leading to heterogeneous modification of endogenous sulfation sites. Furthermore, if multiple, distinct sulfation sites are present in a protein, it is not possible to homogenously modify a subset.

SUMMARY OF THE INVENTION

Tyrosine sulfation is an important post-translational modification found in higher eukaryotes. The present invention is directed to genetically encoded protein sulfation in eukaryotes. Described herein are methods and compositions comprising an engineered tyrosyl RNA synthetase/tRNA pair that co-translationally incorporates tyrosine analogs, specifically O-sulfotyrosine, in response to UAG codons in *Escherichia coli* (*E. coli*) and mammalian cells. The methods and compositions described herein enable recombinant expression of eukaryotic proteins of interest that are homogeneously sulfated at selected sites (site-specific incorporation).

Compositions are described herein comprising a variant *E. coli* tyrosyl-tRNA synthetase (EcTyr-RS) wherein the EcTyr-RS preferentially aminoacylates an *E. coli* tyrosyl tRNA (Ec-tRNA$^{Tyr}$) with a tyrosine analog over the naturally-occurring tyrosine amino acid.

The tyrosine analog described herein (also referred to herein as a derivative) is sulfotyrosine, and more particularly O-sulfotyrosine. Other tyrosine analogs suitable for use as described herein can be synthesized by one of skill in the art using known methods.

In particular, the current invention encompasses a composition comprising a variant *E. coli* tyrosyl-tRNA synthetase (EcTyr-RS) wherein the variant EcTyr-RS comprises the 424 amino acid sequence of *E. coli* published in the NCBI database for the K-12 *E. coli* strain, substrain DH10B (ncbi.nhn.nih,gov/protein and Gen Bank accession number ACB02843) or *E. coli* strain MG1655 NCBI Reference Sequence NP_416154.1 (SEQ ID NO:1) which preferentially aminoacylates an *E. coli* tyrosyltRNA (EctRNA$^{tyr}$) with a tyrosine analog over the naturally-occurring tyrosine amino acid, wherein the variant EcTyr-RS comprises the amino acid sequence of SEQ ID NO:1, or a homologous EcTyr-RS comprising an amino acid sequence with at least about 80%, about 85%, about 90%, about 95% or up to about 99% sequence identity with the full-length SEQ ID NO:1 and comprising mutated amino acid positions. More specifically, engineered/mutated variants of the EcTyr-RS comprise the EcTyr-RS wherein the EcTyr-RS, or homologous EcTyr-RS, is mutated/modified at one, or more active site residues. EcTyr-RS mutants with the ability to selectively recognize O-sulfotyrosine were selected from a large mutant library, where the following actives site residues were randomized using the design as follows: the tyrosine (Y) is replaced with FLIMVSTAYHCG (SEQ ID NO: 2) at position 37; the leucine (L) is replaced with NBT at position 71; the asparagine (N) is replaced with NSPTACGDH (SEQ ID NO: 3) at position 126; the aspartic acid (D) is replaced with NST at position 182; the phenylalanine (F) is replaced with NNK at position 183; or the leucine (L) is replaced with NNK at position 186. Polynucleotide sequences encoding these proteins/polypeptides are also encompassed herein.

Specifically encompassed by the present inventions are the following EcTyr-RNA synthetase mutants, identified from the selection of a library of library of ~10$^7$ mutants described below, wherein the EcTyr-RS comprises the amino acid sequence SEQ ID NO: 1 wherein the tyrosine (Y) at position 37, and the asparagine (N) at position 126 are conserved, the leucine (L) at position 71 is replaced with valine (V), the aspartic acid (D) at position 182 is replaced with G, the phenylalanine at position 183 is either conserved or mutated to Y, and the L at position 186 is either conserved, or is replaced with M, I or V. The exact sequences of each EcTyr-RS mutants are provided herein as SEQ ID NOS; 4-9. The VGL clone (SEQ ID NO: 4) is also referred to herein as the EcTyr-RS mutant VGL and the VGM clone (SEQ ID NO: 5) is referred to herein as the EcTyr-R.S mutant VGM. Additional EcTyrRS variants are the EcTryRS mutant VGYI (SEQ ID NO:6); EcTyrRS mutant VGYL (SEQ ID NO:7); EcTryRS mutant VGYLR (SEQ ID NO: 8) and EcTyrRS mutant VGV (SEQ ID NO:9) as shown in FIGS. 16A-G.

The Tyr-RNA synthetases encompassed by the present invention further include homologous bacteria-derived Tyr-RNA synthetases with active-site residues substituted with mutations as described herein. Such homologous TyrRS genes can be identified by techniques known to those of skill in the art, for example by performing sequence identity/homology searches of TyrRS genetic sequence databases to identify TyrRS gene sequences with, for example, about 80% sequence identity; about 85% sequence identity; about 90% sequence identity; about 95% sequence identity or greater than about 95% sequence identity, which are substantially homologous, or highly homologous to the E. coli TyrRS described herein. Such homologous TyrRS genes suitable for use as described herein may contain sequence variation from the E. coli Tyr-RS wherein such sequence variations do not affect the functionality (aminoacyl activity) of the RNA synthetase. Such nucleotide variations can also be defined as conservative sequence variations or substitutions. Also encompassed by the present invention are complementary polynucleotide sequences and polynucleotide sequences that hybridize under highly stringent conditions over substantially the entire length of the nucleotide sequence, as well as the polypeptides encoded by the polynucleotides. The homologous bacteria-derived Tyr-RS can be mutated at its active-site residues corresponding to the mutations as described herein for the E. coli Tyr-RS.

The present invention further encompasses tRNA compositions wherein the tRNA anti-codon loop is modified (e.g., mutated) to specifically bind to (e.g., recognize) an amber (UAG/TAG) codon as described herein. tRNA compositions comprising the ochre codon (TAA/UAA) or the opal codon (UGA/TGA) are also encompassed by the present invention. In particular, the present invention encompasses compositions wherein the tRNA is the E. coli tyrosyl tRNA, or another homologous bacteria-derived tRNA, wherein the polynucleotide sequence comprises SEQ ID NO:10 of FIG. 16H (also see for example Cell Chem. Biol. 25, 13-4-1312 (2018) (or with about 80%; about 85%; about 90%, about 95% or greater than about 95% sequence identity) with an anti-codon loop comprising a sequence that specifically binds to a selector sequence of an mRNA selected from the group consisting of an amber codon. Importantly, the tRNA EcTyr UAG described herein is a novel amber suppressor suitable for use in both genetically-engineered bacteria and eukaryotes.

It is important to note that the modified tRNA of E. coli, or a homologous bacteria-derived tRNA, can be combined with an RNA synthetase of another homologous bacteria-derived RNA synthetase to produce novel combinations for unnatural amino acid, e.g., tyrosine analog, incorporation into proteins. Additionally, a combination of two distinct tRNA-RS/tRNA pairs can be combined. For example, the EcTyr-RS/tRNA pair described can also be combined with other suitable tRNA-RS/tRNA pairs which respond to other condons such as an opal suppressor, to site-specifically incorporate two distinct unnatural amino acids into polypeptide/proteins expressed in eukaryotic cells.

Also encompassed by the present invention are cells (either cultured in vitro or in vivo) comprising an orthogonal E. coli tyrosyl-tRNA synthetase (EcTyr-RS), wherein the EcTyr-RS preferentially aminoacylates an E. coli tyrosyl tRNA with a tyrosine analog, and an orthogonal E. coli tyrosyl tRNA (Ec-tRNA$^{Tyr}$) as a pair. Importantly, the orthogonal TyrRS/tRNA pair) does not cross-react the cell's endogenous TyrRS/tRNA pair. Such cells comprise not only the RS/tRNA pairs described herein, but also all cellular components required for translation of polynucleotides into proteins, including translation system components such as, for example, ribosomes, endogenous tRNAs, translation enzymes, mRNA and amino acids.

The cells of the present invention can be any bacterial cell or eukaryotic cell suitable for use with the tRNA, synthetase/tRNA pairs described herein. In particular, the cell can be a mammalian cell. In particular, the bacterial cell is a genetically-engineered E. coli cell, or a homologous/analogous bacterial cell. More specifically, the E. coli is the ATMY strain of E. coli cell.

A cell(s) of the present invention encompasses a cell comprising a variant E. coli tryrosyl tRNA synthetase (Ec-Tyr-RS), wherein the variant EcTyr-RS preferentially aminoacylates an E. coli tyrosyl tRNA with a tyrosine analog, and an orthogonal E. coli tyrosyl tRNA (Ec-tRNA$^{Tyr}$) as a pair, wherein the variant EcTyr-RS comprises the amino acid sequence of SEQ ID NO:1, or an amino acid sequence with at least 90% sequence identity with the full-length SEQ ID NO:1, wherein the variant E. coli EcTyr-RS is mutated, relative to SEQ ID NO:1, wherein the tyrosine (Y) at position 37, and the asparagine (N) at position 126 are conserved, the leucine (L) at position 71 is replaced with valine (V), the aspartic acid (D) at position 182 is replaced with G, the phenylalanine at position 183 is either conserved or mutated to Y, and the L at position 186 is either conserved, or is replaced with M, I or V. The exact sequences of each EcTyr-RS mutant are provided as SEQ ID NOS: 4-9 as shown in FIG. 16A-G. More particularly, the variant EcTry-RS is either the EcTyr-RS mutant VGL (SEQ ID NO: 4) or the EcTyr-RS mutant VGM (SEQ ID NO: 5).

The cell(s) of the present invention further comprise variant/mutant Ec-tRNA$^{Tyr}$ herein (for example, SEQ ID NOS: 10) or a homologous bacteria-derived tRNA comprising at least about 80% sequence identity with SEQ ID NO: 10 or wherein the tRNA has an anti-codon loop comprising a sequence that specifically binds to a selector sequence of an mRNA, wherein the selector is an amber codon UAG.

The cell of the invention can be a bacterial cell such as an E. coli cell (e.g., ATMY, and particularly ATMY4) or a eukaryotic cell. More specifically the eukaryotic cell is a mammalian cell.

Also encompassed by the present invention are methods of producing a polypeptide/protein in a cell with one, or more, unnatural amino acids incorporated into the polypeptide/protein in a site-specific manner by one, or more of the RS/tRNA pairs described herein. In particular encompassed herein are EcTyrRS as comprised in SEQ ID NOS: 4-9. Such proteins can be labeled or chemically modified for further post-translational site-specific modifications.

Specifically encompassed by the present invention is a method of incorporating tyrosine analogs, more specifically sulfotyrosine analogs, at specified positions in a protein of interest expressed in the cell, the method comprising culturing the cell in a culture medium under conditions suitable for growth, wherein the cell comprises a nucleic acid that encodes a protein with one, or more, selector codons (e.g., amber selector codons), wherein the cell further comprises an Ec-tRNA$^{Tyr}$ that recognizes the selector codon(s), and wherein the cell further comprises an EcTyr-RS that preferentially aminoacylates the Ec-tRNA$^{Tyr}$ with a tyrosine analog. The cell culture medium containing the growing cells is then contacted with one, or more, tyrosine analogs under conditions suitable for incorporation of the one, or more, tyrosine analogs into the protein in response to the selector codon(s), thereby producing the protein with one, or more tyrosine analogs. The method specifically encompasses the use of the EcTyr-RS and the Ec-tRNA$^{Tyr}$ pair described herein. Such tyrosine analogs can be sulfonated tyrosine analogs and more specifically O-sulfotyrosine, or other suitable tyrosine analogs.

Also encompassed by the present invention are methods of incorporating two, or more unnatural amino acids at specified positions in a polypeptide/protein expressed in a cell. In these methods the cell further comprises a second tRNA/RS pair that is orthogonal to the cell, wherein the second pair recognizes a selector codon in the protein but does not cross-react with the first RS/tRNA pair (e.g., EcTyr-RS/tRNA$^{tyr}$). The method is performed as above (or in a similar manner) wherein the protein expressed/produced contains one, or more tyrosine analogs and one, or more, distinct unnatural amino acid other than a tyrosine analog incorporated by the first RS/tRNA pair.

Also encompassed by the present invention are methods of producing a polypeptide/protein in a cell with one, or more, unnatural amino acids incorporated into the polypeptide/protein in a site-specific manner by one, or more of the RS/tRNA pairs described herein. Such proteins can be labeled or chemically modified for further post-translational site-specific modifications.

Specifically, encompassed herein are methods of producing a protein in a cell with one, or more, tyrosyl analogs at specified positions in the protein, the method comprising culturing the cell in a culture medium under conditions suitable for growth, wherein the cell comprises a nucleic acid that encodes a protein with one, or more, amber selector codons, and wherein the cell further comprises an Ec-tRNA$^{Tyr}$ that recognizes the amber selector codon(s), and contacting the cell culture medium with one, or more, tyrosyl analogs under conditions suitable for incorporation of the one, or more, tyrosyl analogs into the protein in response to the selector codon, thereby producing the protein with one, or more tyrosyl analogs.

Mores specifically encompassed herein is a method of site-specifically incorporating one, or more, suflotyrosine residues into a protein or peptide in a cell, the method comprising, culturing the cell in a culture medium under conditions suitable for growth, wherein the cell comprises a nucleic acid that encodes a protein or peptide of interest with one, or more, amber selector codons at specific sites in the protein or peptide, wherein the cell further comprises a variant E. coli tyrosyl-tRNA synthetase (EcTyr-RS), wherein the EcTry-RS preferentially aminoacylates an E. coli tyrosyl tRNA (Ec-tRNA$^{Try}$) that recognizes the amber selector codon, and contacting the cell culture medium with one, or more, sulfotyrosine residues under conditions suitable for incorporation of the one, or more, sulfotyrosine residues into the protein or peptide at the sites of the selector codon(s), hereby producing the protein or peptide of interest with one, or more site-specifically incorporated sulfotyrosine residues.

These methods described above comprise the variant E. coli tyrosyl-tRNA synthetase (EcTyr-RS) that comprises the amino acid sequence of SEQ ID NO:1, or an amino acid sequence with at least 90% sequence identity with the full-length SEQ ID NO:1, wherein the variant EcTyr-RS preferentially aminoacylates an E. coli tyrosyl tRNA with a tyrosine analog, and an orthogonal E. coli tyrosyl tRNA (Ec-tRNA$^{Tyr}$) as a pair, wherein the variant EcTyr-RS comprises the amino acid sequence of SEQ ID NO:1, or an amino acid sequence with at least 90% sequence identity with the full-length SEQ ID NO:1, wherein the variant E. coli EcTyr-RS is mutated, relative to SEQ ID NO:1, wherein the tyrosine (Y) at position 37, and the asparagine (N) at position 126 are conserved, the leucine (L) at position 71 is replaced with valine (V), the aspartic acid (D) at position 182 is replaced with G, the phenylalanine at position 183 is either conserved or mutated to Y, and the L at position 186 is either conserved, or is replaced with M, I or V. The exact sequences of each EcTyr-RS mutant are provided herein as SEQ ID NOS:4-9. More particularly, variant EcTry-RS is either the EcTyr-RS mutant VGL (SEQ ID NO: 4) or the EcTyr-RS mutant VGM (SEQ ID NO: 5).

The methods described above also comprise the Ec-tRNA$^{Tyr}$ polynucleotide sequence comprises SEQ ID NO: 10, or a homologous bacteria-derived tRNA comprising at least about 80% sequence identity with SEQ ID NO:10, wherein the tRNA has an anti-codon loop comprising a sequence that specifically binds to a selector sequence of an mRNA, wherein the selector sequence is an amber, ochre or opal codon (more specifically the amber codon). The cell(s) of the methods described herein can be bacterial cells such as an E. coli cell, or a eukaryotic cell, such as a mammalian cell. In particular the E. coli cell can be the ATMY4 strain of E. coli cell.

The methods described above encompass cells that further comprise a second tRNA/RS pair that is orthogonal to the cell, wherein the second pair does not cross-react with the EcTyr-RS/tRNA pair and that recognizes a selector codon in the protein, wherein the protein or peptide of interest produced contains one, or more sulfotyrosyl residues and one, or more, distinct unnatural amino acid residues other than a sulfotyrosyl residue.

Also encompassed by the present invention are kits for producing a protein or peptide of interest in a cell, wherein the protein or peptide comprises one, or more tyrosyl analogs, the kit comprising a container containing a polynucleotide sequence encoding an Ec-tRNA$^{Tyr}$) that recognizes an amber selector codon in a nucleic acid of interest in the cell and a container containing a variant E. coli tyrosyl tRNA synthetase that preferentially aminoacylates the Ec-tRNA$^{Tyr}$ with a tryrosyl analog, wherein the EcTry-RS comprises the amino acid sequence of SEQ ID NO:1, or an amino acid sequence with at least 90% sequence identity with the full-length SEQ ID NO:1, wherein the variant EcTyr-RS preferentially aminoacylates an E. coli tyrosyl tRNA with a tyrosine analog, and an orthogonal E. coli tyrosyl tRNA (Ec-tRNA$^{Tyr}$) as a pair, wherein the variant EcTyr-RS comprises the amino acid sequence of SEQ ID NO:1, or an amino acid sequence with at least 90% sequence identity with the full-length SEQ ID NO:1, wherein the variant E. coli EcTyr-RS is mutated, relative to SEQ ID NO:1, wherein the tyrosine (Y) at position 37, and the asparagine (N) at position 126 are conserved, the leucine (L) at position 71 is replaced with valine (V), the aspartic acid (D) at position 182 is replaced with G, the phenylalanine at position 183 is either conserved or mutated to Y, and the L at position 186 is either conserved, or is replaced with M, I or V. The exact sequences of each EcTyr-RS mutant are provided as SEQ ID NOS; 4-9. More particularly, variant EcTry-RS is either the EcTyr-RS mutant VGL (SEQ ID NO:4) or the EcTyr-RS mutant VGM (SEQ ID NO: 5).

The kit can further comprise one, or more, tyrosyl analogs, in particular wherein the tyrosyl analog is sulfotyrosine. The kit can also comprise instructions for producing the protein or peptide of interest.

The present invention, as described herein, enables the expression of eukaryotic proteins in eukaryotic cells with precisely installed sulfation, such that the consequences of protein sulfation can be studied. Sulfotyrosine is a nonhydrolyzable structural mimic of phosphotyrosine which is a ubiquitous post translational modification that regulates numerous signal transduction pathways. Normally, intracellular proteins are not sulfated. However, as a result of the compositions and methods described herein, sulfotyrosine can be incorporated at known tyrosine phosphorylation sites. Sulfotyrosine can mimic the consequences of tyrosine phosphorylation due to its structural similarity, but this modification cannot be removed by endogenous phosphatases, resulting in a powerful new way to uncover the role of distinct phosphorylations in eukaryotic biology.

Many therapeutically relevant proteins are sulfated, where the sulfation is functionally important such as, e.g., in IgG and Factor IX. As a result of the compositions and methods described herein, such expression of proteins homogeneously incorporating sulfotyrosine at the desired site is now possible. Many viruses and pathogens use sulfotyrosine or sulfated sugars (e.g., heparin sulfate proteoglycan) as receptors for cellular entry. Our immune system produces sulfated antibodies that take advantage of these sulfate-binding pockets for installing a sulfation that restricts what kind of sequences can be present in the variable region of a sulfated antibody, thus limiting the sequence space accessible to such antibodies. The compositions and methods described herein would enable sulfation of any sequence contexts, which would overcome this limitation and the development of sulfated antibodies with enhanced pathogen targeting. Additionally, the methods and compositions of the present invention enable the development of antibodies that target specific sulfation sites in specific peptide contexts.

The current invention demonstrates features and advantages that will become apparent to one of ordinary skill in the art upon reading the attached Detailed Description.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 13 shows the sequence of plasmid pB1U-Sulfo-16xtYR-TAG (SEQ ID NO:15.

FIG. 15 shows the sequence of plasmid pB3-sulfoRS-16xtR-R265-HCIIx (SEQ ID NO:16).

FIG. 16 depicts the sequences of the variant EcTryRS (FIGS. 16B-G, SEQ ID NOS: 4-9) and a tyrosyl tRNA (FIG. H, SEQ ID NO:10).

DETAILED DESCRIPTION OF THE PREFERRED EMBODIMENTS

Figure 1:
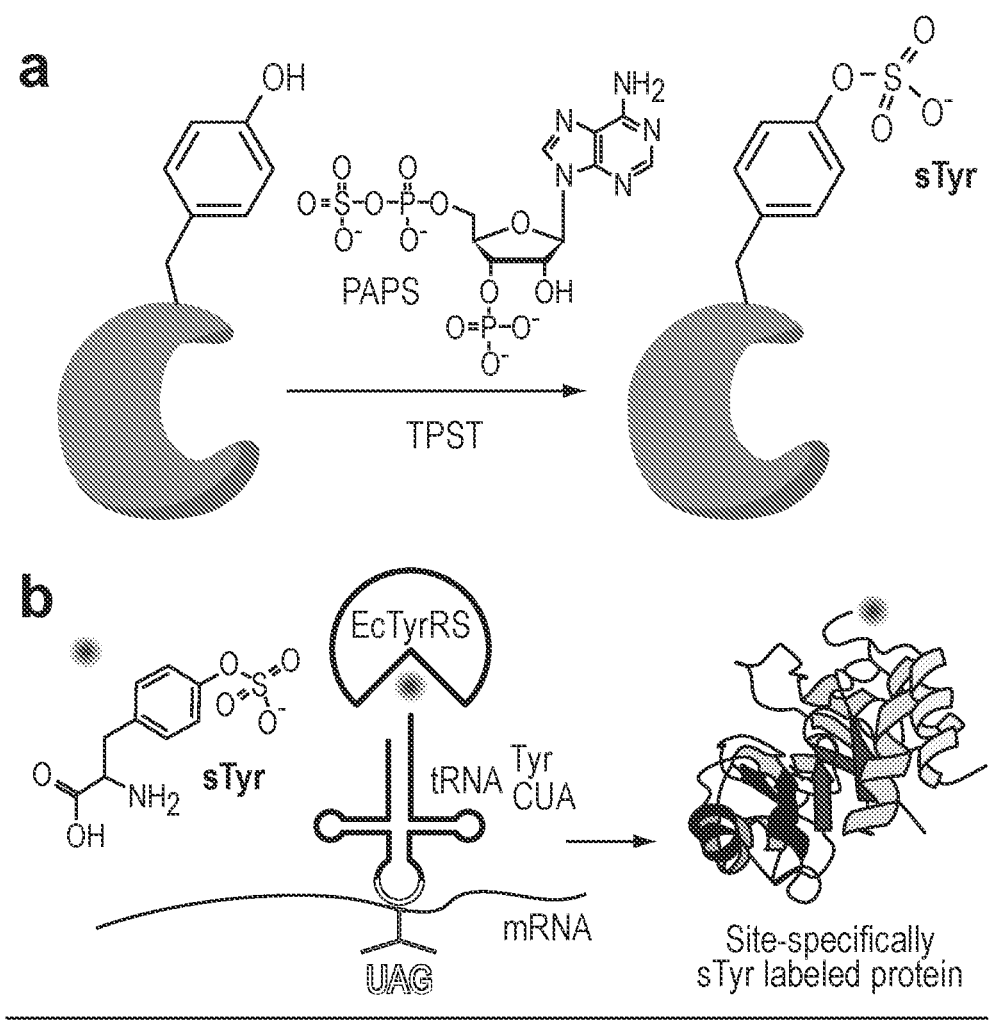
FIG. 1A-B shows tyrosine sulfation. 1a, Proteins processed through the trans-Golgi network in multicellular eukaryotes are subjected to tyrosine sulfation by TPST enzymes that use PAPS as a cofactor. 1b, A sulfotyrosine residue can be co-translationally incorporated into proteins expressed in living cells in response to a nonsense codon using an engineered TyrRS/tRNA pair.

The genetic code expansion technology offers an elegant solution to challenges of producing sulfonated proteins by enabling co-translation site-specific incorporation of modified amino acid residues such as O-sulfatyrosine (sTyr) in response to a repurposed nonsense codon (FIG. 1A-B). Indeed, the *M. jannaschii* tyrosyl-tRNA synthetase (Mj-TyrRS)/tRNA pair has been engineered to site-specifically incorporate sTyr into proteins expressed in *E. coli*, which has been useful for investigating the roles of tyrosine sulfation. However, the MjTyrRS/tRNA pair is cross-reactive with its eukaryotic counterparts and cannot be used for non-canonical amino acid (ncAA) mutagenesis in eukaryotic cells. This significantly limits the utility of this platform, given that tyrosine sulfation is only found in proteins from multicellular eukaryotes, and that the class of eukaryotic proteins that are subjected to sulfation (secreted and membrane-associated proteins) are frequently incompatible with recombinant expression in *E. coli*, as they require specialized processing through the ER-Golgi network. Furthermore, the ability to express a eukaryotic protein in its native host is indispensable for investigating how its sulfation affects the cellular pathways it participates in (e.g., how sulfation of GPCRs affect their signaling). Genetically encoding sTyr in eukaryotic cells would overcome these limitations.

Figure 4:
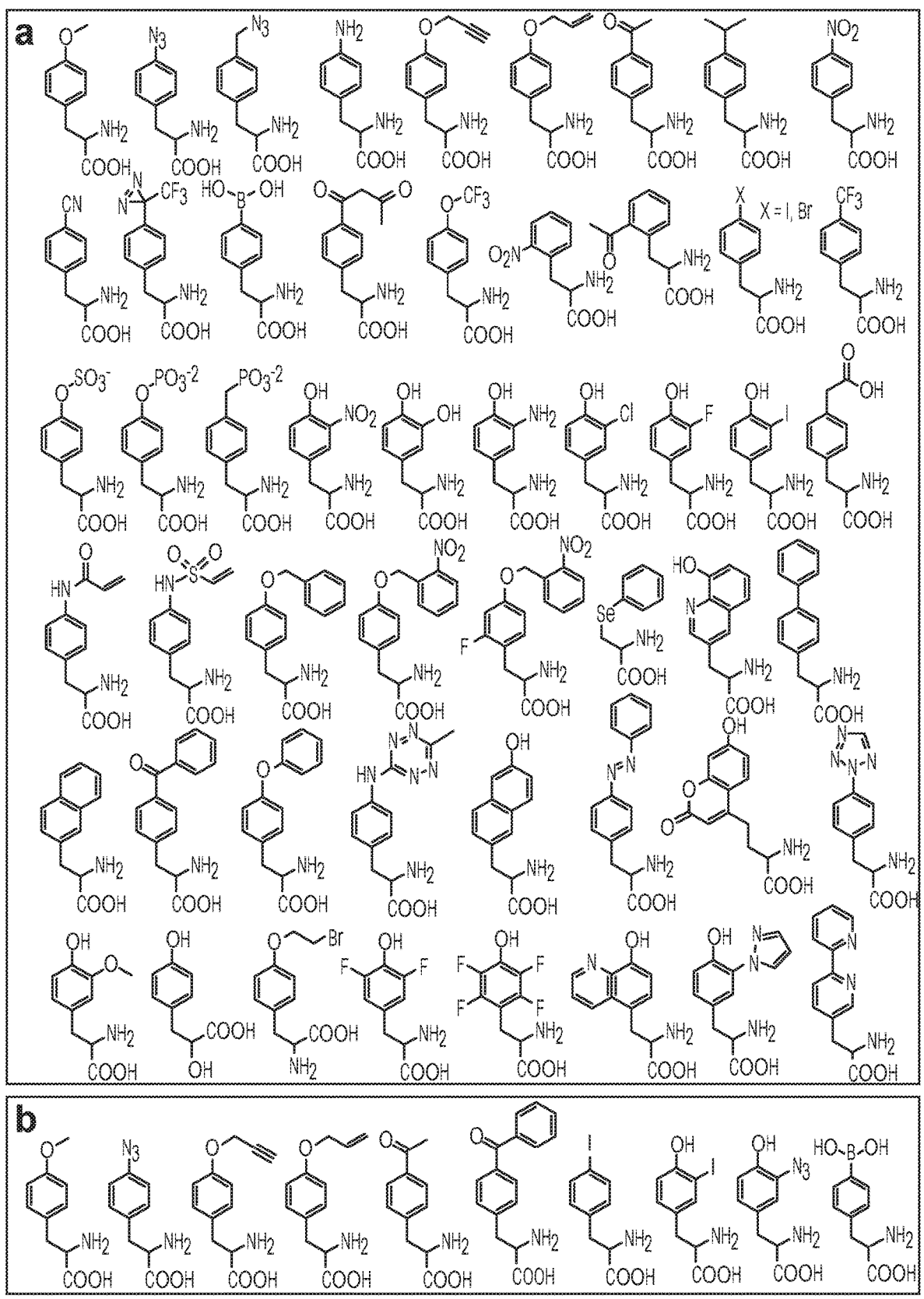
FIG. 4A-B shows examples of non-naturally occurring amino acids (ncAAs) that can be reasonably genetically encoded in E. coli using, for example, the MjTyrRS/tRNA pair (4a). 4b shows ncAAs that can be reasonably genetically encoded in eukaryotes using the EcTyrRS/tRNA pair s described herein.
Figure 5:
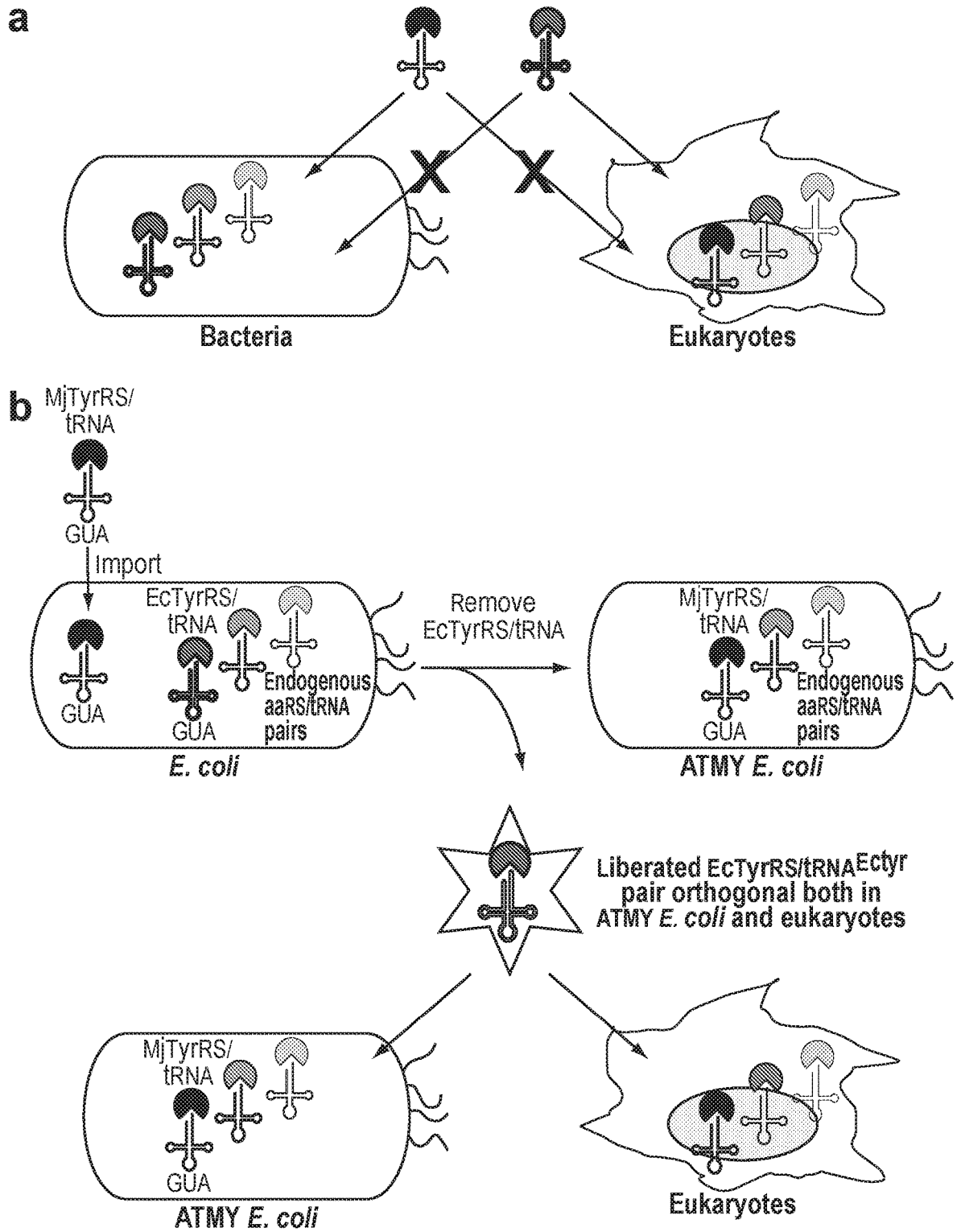
FIG. 5A-B show the bacteria-derived aaRS/tRNA pairs (color-coded red) are orthogonal in eukaryotes and can be used for eukaryotic genetic code expansion, while eukaryote or archaea derived pairs (color-coded blue) are orthogonal in bacteria and are useful for bacterial genetic code expansion. 5b, Functionally substituting the EcTyrRS/tRNA pair in E. coli with the archaea derived MjTyrRS/tRNA pair creates an engineered ATMY strain. The 'liberated' EcTyrRS/tRNA pair can be established as an orthogonal nonsense suppressor in ATMY E. coli and engineered in this strain for altering its substrate specificity.

The *E. coli* derived tyrosyl-tRNA synthetase (EcTyrRS)/tRNA pair represents a promising platform to this end, as it has already been established for ncAA mutagenesis in eukaryotes. However, the repertoire of ncAAs genetically encoded using this platform has been significantly limited relative to its *M. jannaschii* derived counterpart (FIG. 4). While the substrate specificity of MjTyrRS can be engineered using a facile *E. coli* based directed evolution system, the engineering of EcTyrRS relies on a cumbersome yeast-based system, which has experienced much less success. Recently, a novel approach has been established to facilitate the directed evolution of *E. coli* derived aminoacyl-tRNA synthetase (aaRS)/tRNA pairs in *E. coli* (FIG. 5). First, one of the endogenous aaRS/tRNA pairs of *E. coli* is functionally substituted by an orthogonal counterpart from archaea/eukaryote. Next, the liberated endogenous pair is reintroduced in the resulting 'altered translational machinery' (ATM) *E. coli* strain as an orthogonal nonsense suppressor, where it can be engineered using the *E. coli* based directed evolution platform. This strategy has been used to create ATMY strains of *E. coli*, in which the endogenous EcTyrRS/tRNA pair is functionally replaced by an archaea-derived TyrRS/tRNA pair (FIG. 5b). The feasibility of engineering the EcTyrRS/tRNA pair has been further demonstrated in such an ATMY *E. coli* strains to genetically encode ncAAs in both eukaryotes and ATMY *E. coli* strains. This platform provides an exciting opportunity to genetically encode sTyr in eukaryotic cells.

Figure 2:
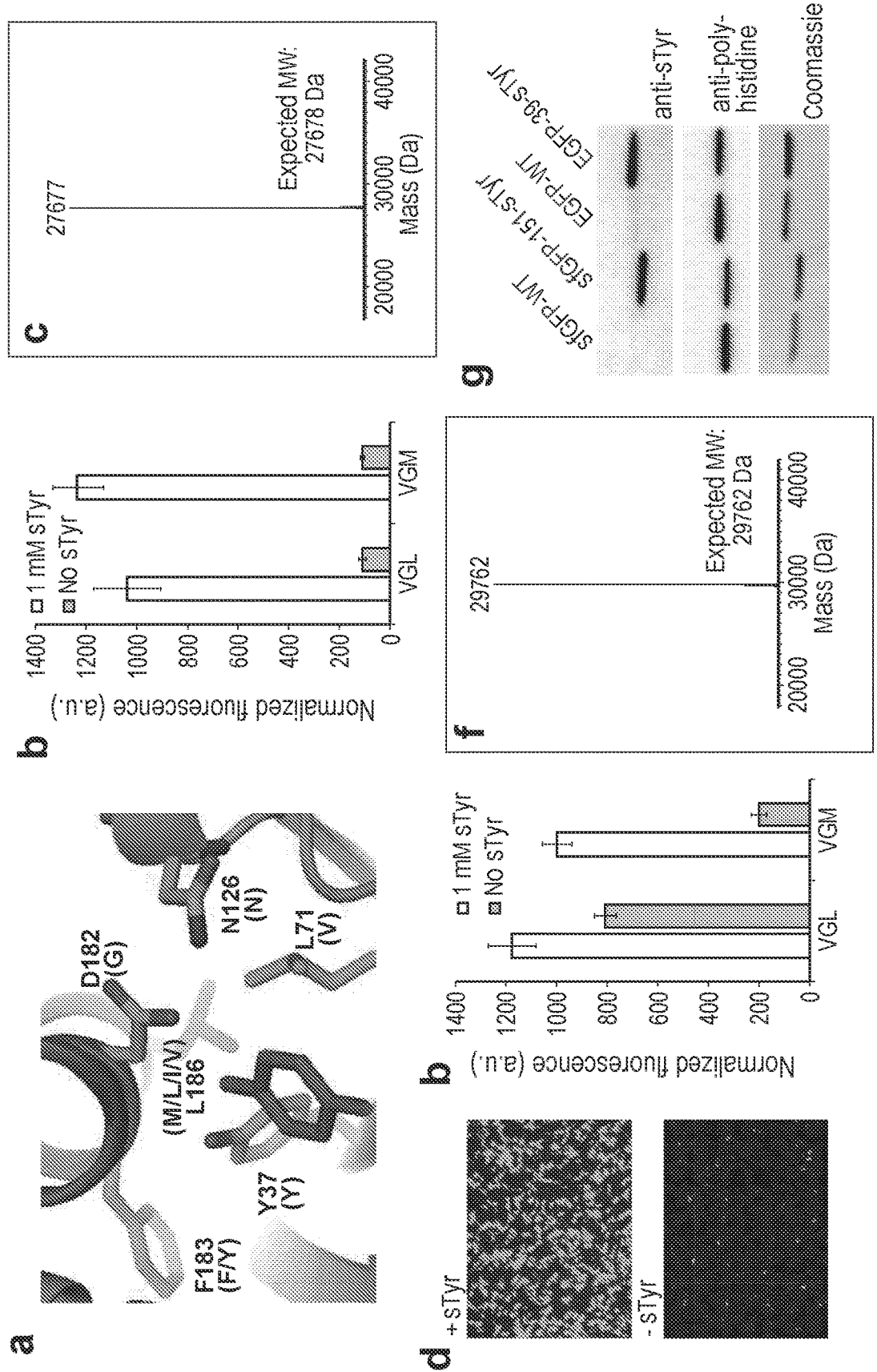
FIG. 2A-G shows genetically encoding sTyr using the EcTyrRS/tRNA pair. 2a, The active site of EcTyrRS showing the bound substrate in magenta, and highlighting residues that were randomized. Mutations found in the sTyr selective variants are noted in parenthesis in red. 2b, Two EcTyrRS mutants facilitate sfGFP-151-TAG reporter expression in ATMY4 E. coli in the presence of sTyr (fluorescence in resuspended cells). 2c, ESI-MS analysis of the purified sfGFP-151-sTyr show expected mass. 2d, Expression of EGFP-39-TAG reporter in HEK293T cells using VGM-EcTyrRS/tRNA in the presence and absence of sTyr (fluorescence microscopy image). 2e, EGFP-39-TAG expression in HEK293T cell using VGL- and VGM-EcTyrRS (fluorescence in clarified cell-free extract). 2f, ESI-MS analysis of the purified EGFP-39-sTyr show expected mass. 2g, Purified wild-type and sTyr-incorporated sfGFP (ATMY4-expressed) and EGFP (HEK293T-expressed) reporter proteins analyzed by anti-sTyr and anti-polyhistidine tag Western blot, as well as Coomassie staining following SDS-PAGE. Data in e and f shown as mean±s.d. (n=3 independent experiments)
Figure 6:
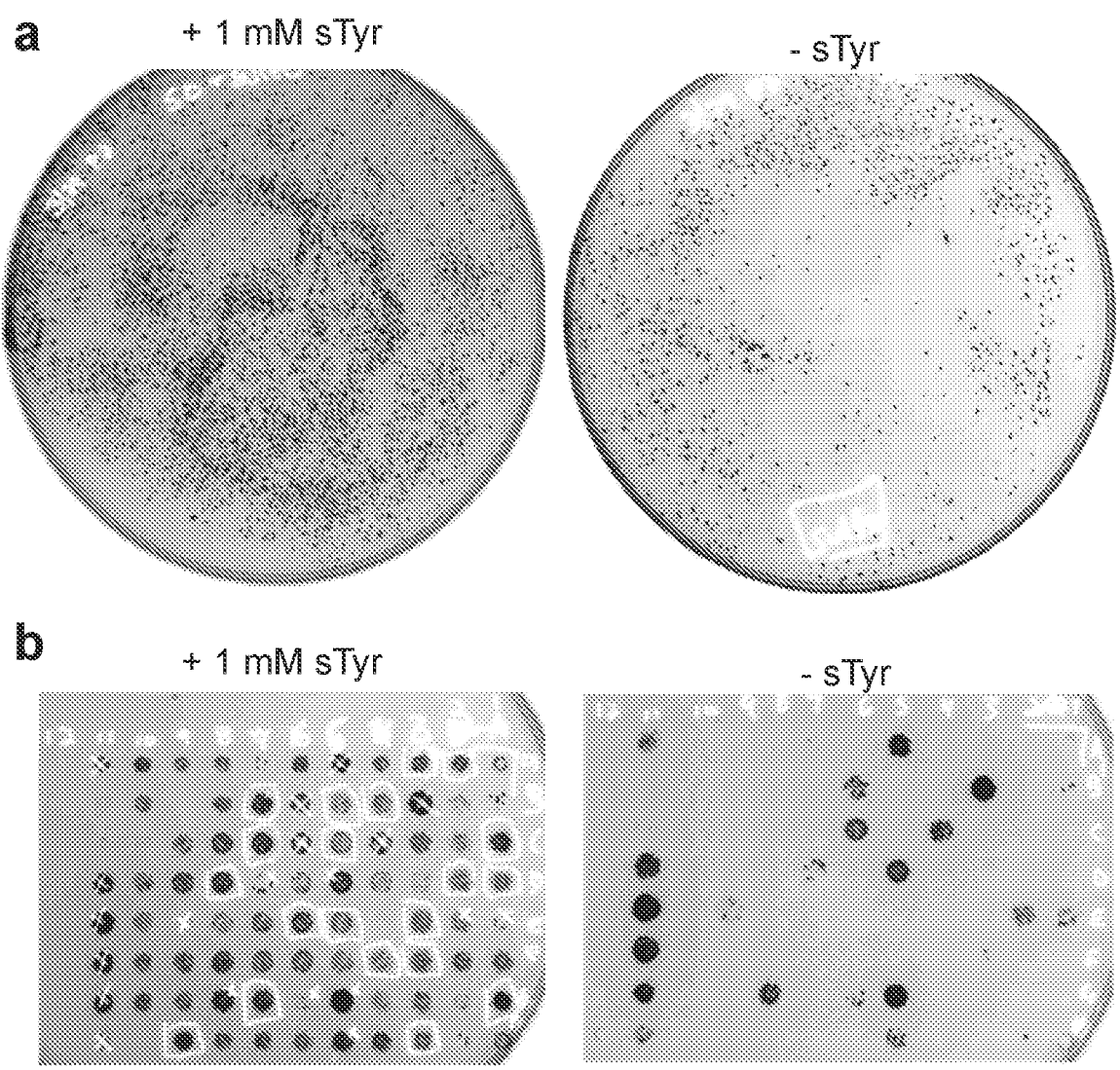
FIG. 6A-B show the pool of EcTyrRS library of mutants selected through a single round each of positive and negative selection show substantial sTyr-dependent survival in a subsequent round of positive selection. 6b, shows that many individual clones isolated from these plates also show the same phenotype.

A library of EcTyrRS mutants encoded in the pBK vector (pBK-EcYRS1) was constructed by randomizing six active site residues (Y37 to FLIMVSTAYHCG (SEQ ID NO: 2), L71 to NBT, N126 to NSPTACGDH (SEQ ID NO: 3), D182 to NST, F183 to NNK, L186 to NNK) surrounding the phenolic hydroxyl of the bound tyrosine substrate (FIG. 2a). The pBK-EcYRS1 library was subjected to a previously developed double-sieve selection system in ATMY *E. coli*. The positive selection enriches active aaRS mutants using a TAG-inactivated chloramphenicol acetyltransferase reporter, while the negative selection removes mutants that charge canonical amino acids using a TAG-inactivated toxic barnase gene. Just after a single round of positive and negative selection each in ATMY3 *E. coli*, the library demonstrated highly sTyr-dependent survival in the presence of chloramphenicol, indicating the enrichment of sTyr-selective EcTyrRS mutants (FIG. 6a). Several individual clones from this selected pool of mutants also replicated the same sTyr-dependent phenotype (FIG. 6b). DNA sequencing of such clones revealed the presence of several distinct but highly convergent clones, where Y37, and N126 are conserved, L71 and D182 are mutated to V and G, respectively, F183 is either conserved or mutated to Y, and L186 is either conserved or is mutated to M, I, or V (FIG. 2a). The enlarged active sites of these mutants were consistent with the need to accommodate the additional sulfate group of sTyr.

To evaluate the sulfotyrosine incorporation efficiency of the EcTyrRS mutants the VGL and VGM (SEQ ID NO. 4 and 5, respectively) variants were were individually co-transformed (encoded in the pBK plasmid) with a pEvolT5-sfGFP-151-TAG reporter plasmid in ATMY4 *E. coli* strain (encodes two genomic copies of tRNAEcTyrCUA). These cells expressed sfGFP only in the presence of sTyr upon induction with IPTG (FIG. 2b). Purification of this reporter protein using a C-terminal polyhistidine tag (8-10 mg/L) followed by ESI-MS analysis showed a mass consistent with the incorporation of sTyr (FIG. 2c). Western-blot analysis using an anti-sTyr monoclonal antibody further corroborated the presence of sTyr in this protein (FIG. 2g). These observations confirm that an engineered EcTyrRS/tRNA pair that selectively incorporates sTyr in response to UAG has been generated.

Figure 7:
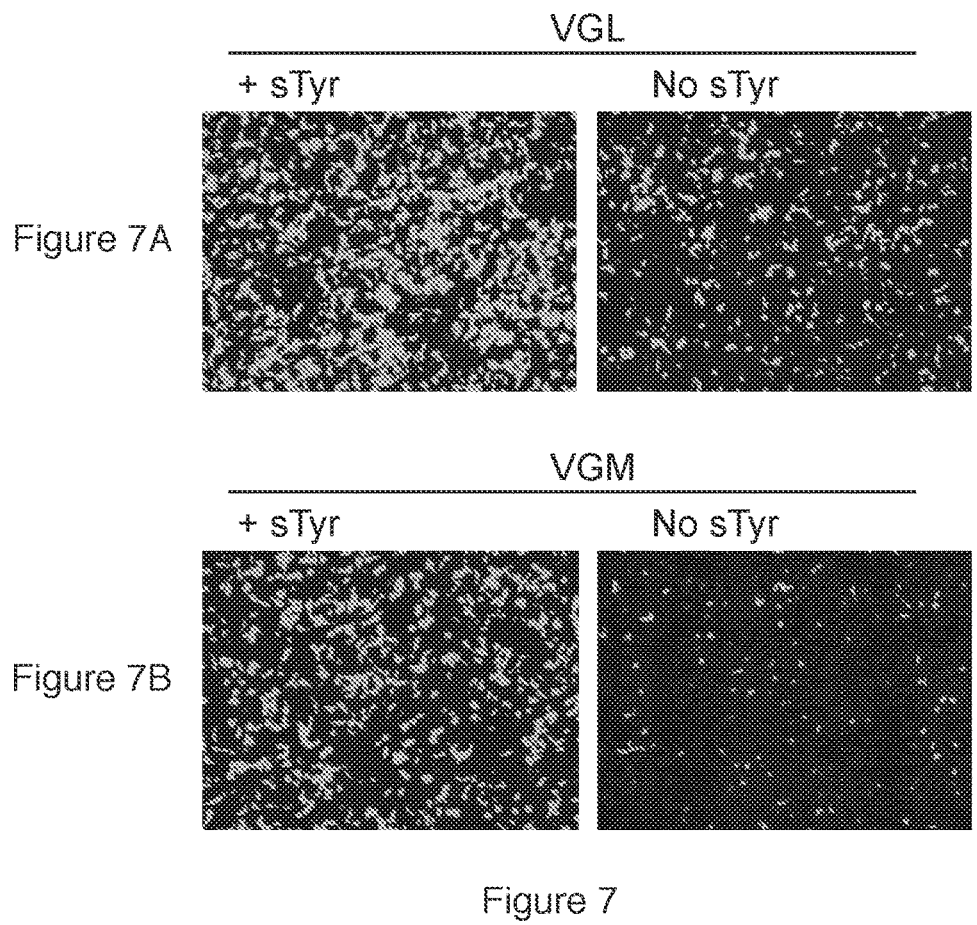
FIG. 7A-B show fluorescence images of HEK293T cells expressing EGFP-39-TAG reporter using VGL- or VGM-EcTyrRS mutant in the presence or absence of sTyr (1 mM).

Next, it was explored if these mutant EcTyrRS/tRNA pairs can be used in mammalian cells for co-translational sTyr incorporation. A mammalian expression plasmid pB1U-Sulfo-16xtYR-TAG was created that expresses the VGL or the VGM EcTyrRS as well as 16 copies of the tRNA$^{EcTyr}_{CUA}$. Co-transfection of this plasmids with pAc-Bac1-EGFP-39-TAG led to robust expression of EGFP in the presence of sTyr, while significantly reduced reporter expression was observed in its absence (FIG. 2d-2e, FIG. 7). The VGM mutant exhibited lower levels of UAG suppression in the absence of sTyr (FIG. 2d-2e, FIG. 7), The reporter protein expressed in the presence of sTyr was isolated from HEK293T cells (100-120 µg from ~10⁷ cells) using a C-terminal polyhistidine tag and analyzed by ESI-MS, which showed a mass consistent with sTyr incorporation (FIG. 2f). Western-blot using an anti-sTyr antibody further confirmed the presence of sTyr in EGFP-39-sTyr, but not in wild-type EGFP (FIG. 2g) that was expressed and purified in a similar manner.

Figure 3:
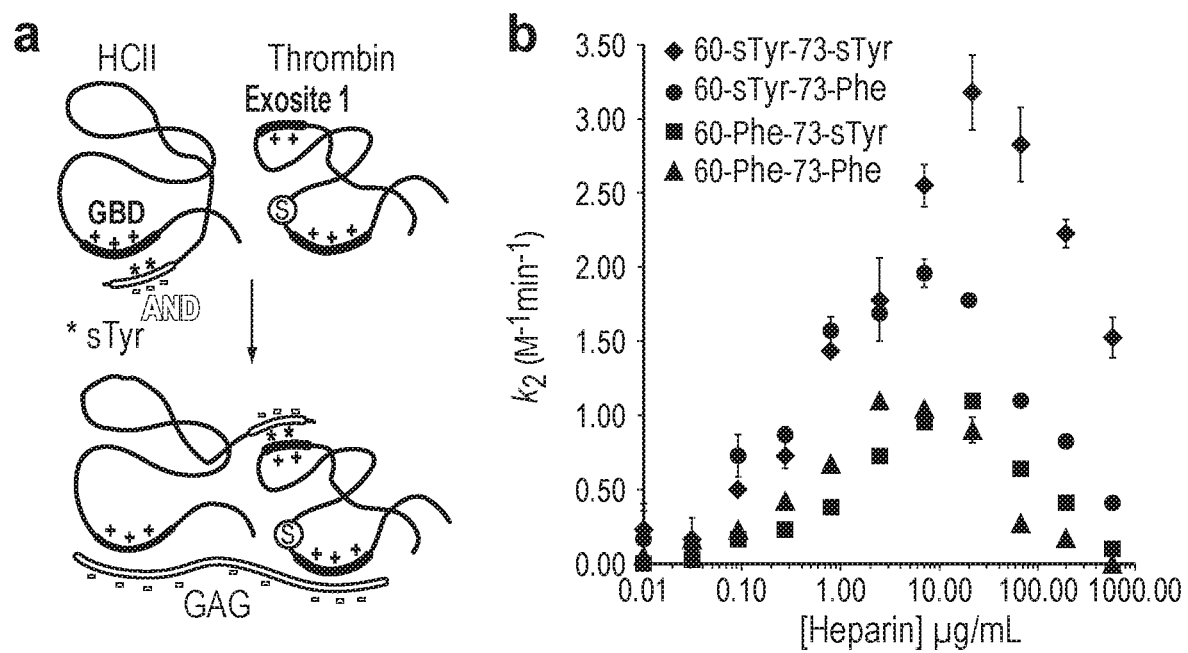
FIG. 3A-B shows expression and biochemical analysis of precisely sulfated HCII. 3a, The model for GAG-activated thrombin inhibition of HCII, which is sulfated at Tyr60 and Tyr73 (shown as green stars). 3b, Second-order rate constant of thrombin inhibition by different HCII mutants at various heparin concentrations.
Figure 8:
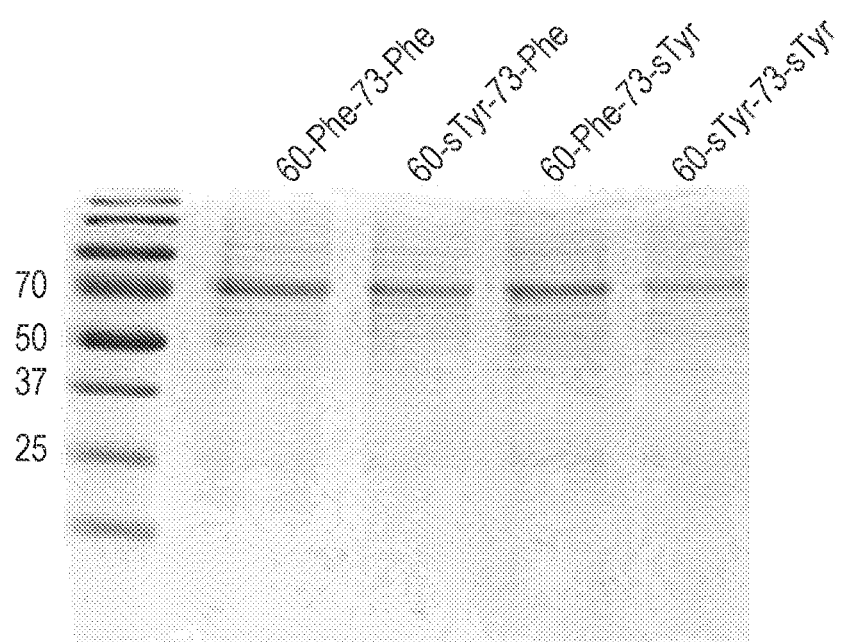
FIG. 8 shows SDS-PAGE analysis of secreted HCII mutants expressed in HEK293T cells and isolated from the culture media using a C-terminal polyhistidine tag. Due to well-established glycosylations, the observed molecular weight is significantly larger than what is predicted from the primary sequence (~57 kDa).
Figure 9:
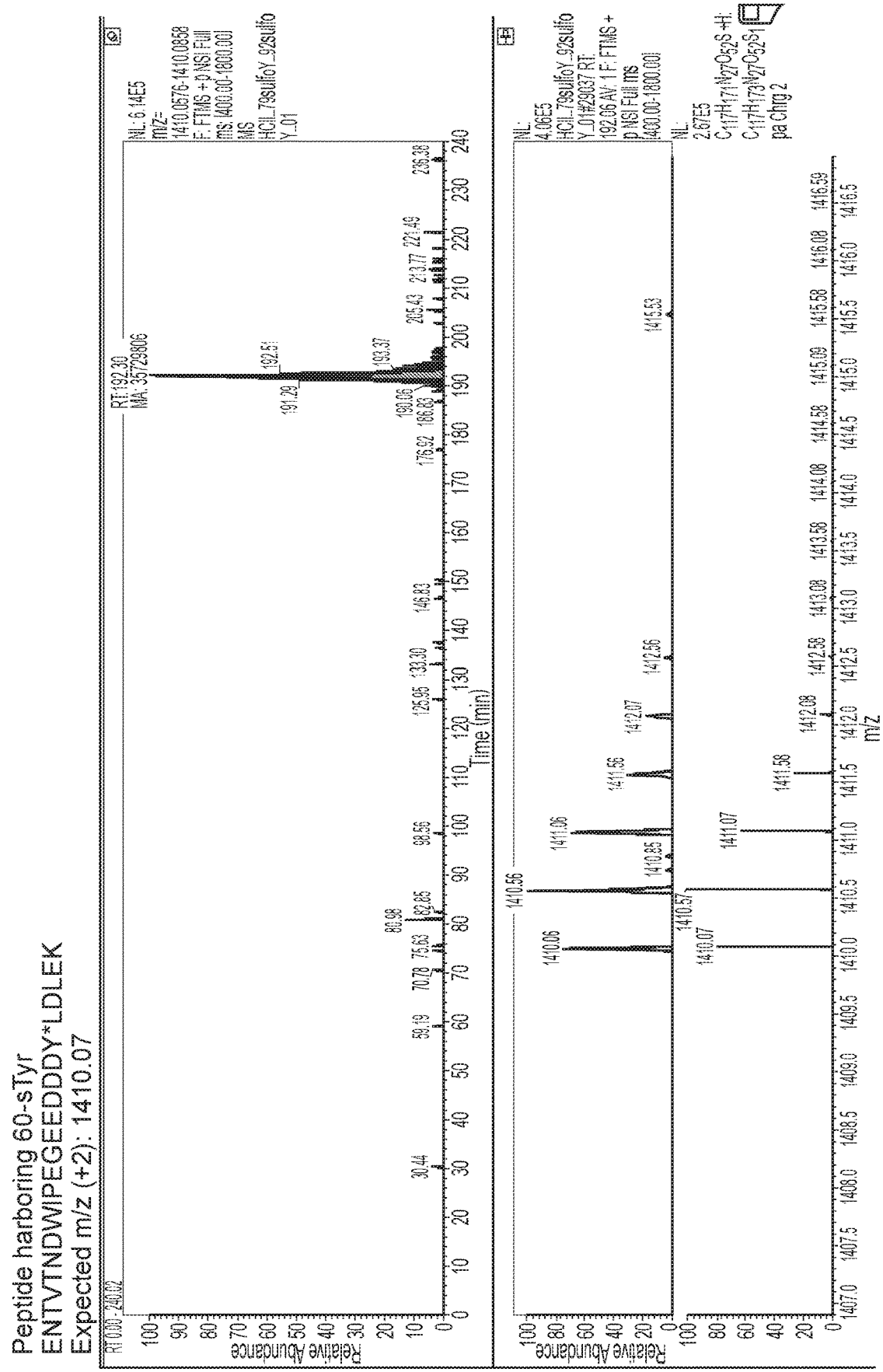
FIG. 9 shows trypsin digestion followed by LC-MS analysis of HCII-60-sTyr-73-sTyr isolated from HEK293T cells identifies the presence of the peptide harboring 60-sTyr (ENTVTNDWIPEGEEDDDY*LDLEK SEQ ID NO:11).
Figure 10:
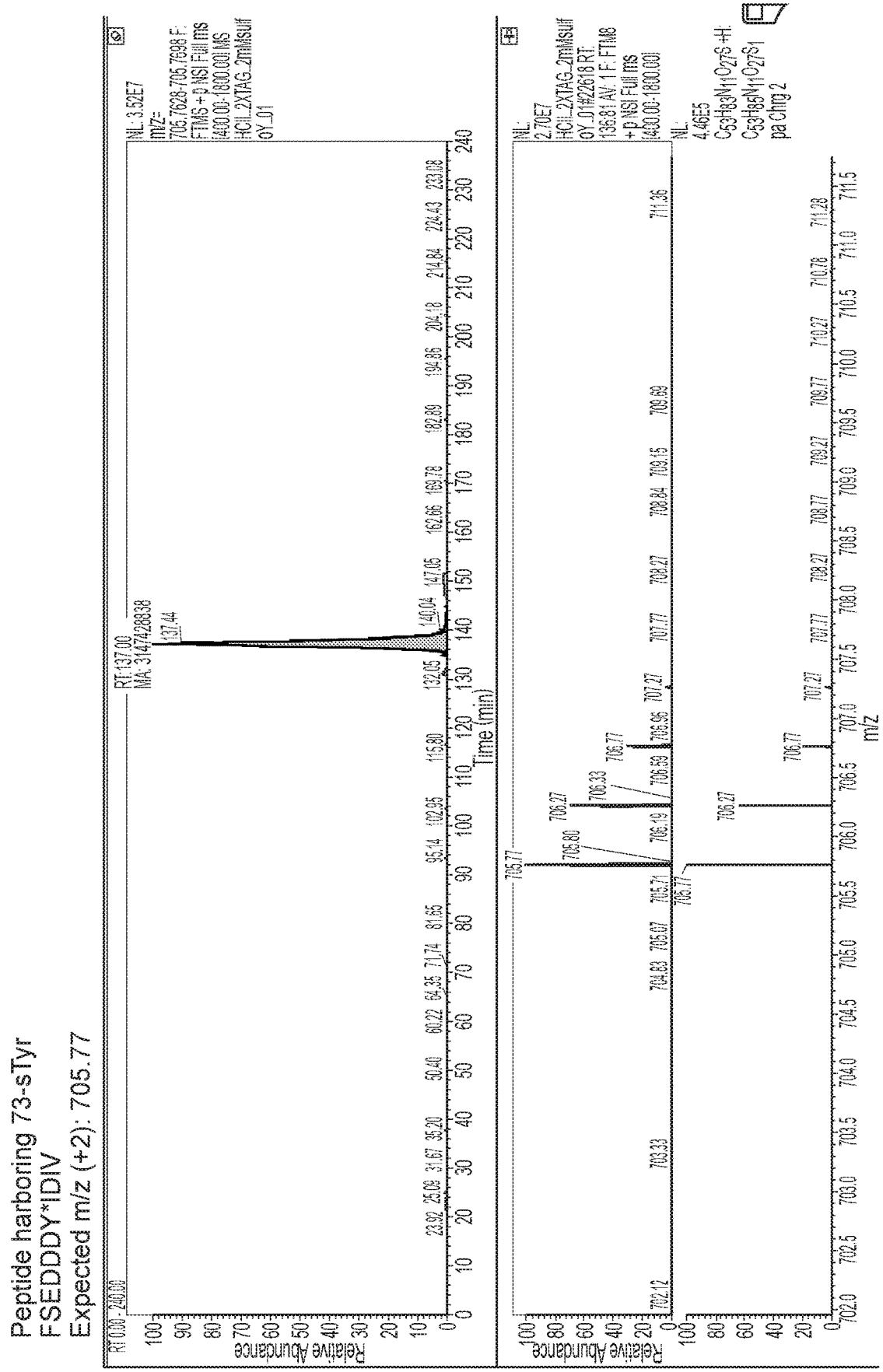
FIG. 10 shows trypsin+elastase double digestion followed by LC-MS analysis of HCII-60-sTyr-73-sTyr isolated from HEK293T cells identifies the presence of the peptide harboring 73-sTyr (FSEDDDY*IDIV SEQ NO: 13). The HCII fragment harboring the 73 residue through trypsin digestion alone was not found, likely due to its large predicted size.
Figure 11:
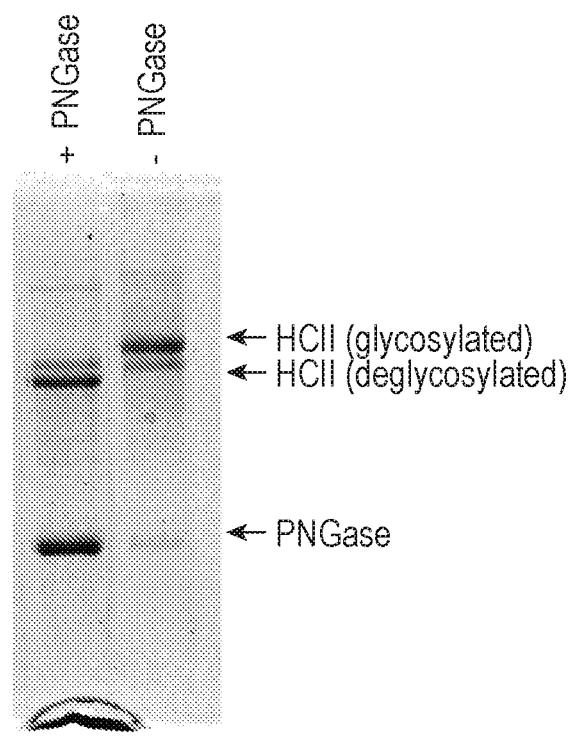
FIG. 11 shows PNGase F treatment of purified HCII-60-sTyr-73-sTyr substantially reduces its molecular weight by removing N-linked glycans.
Figure 12:
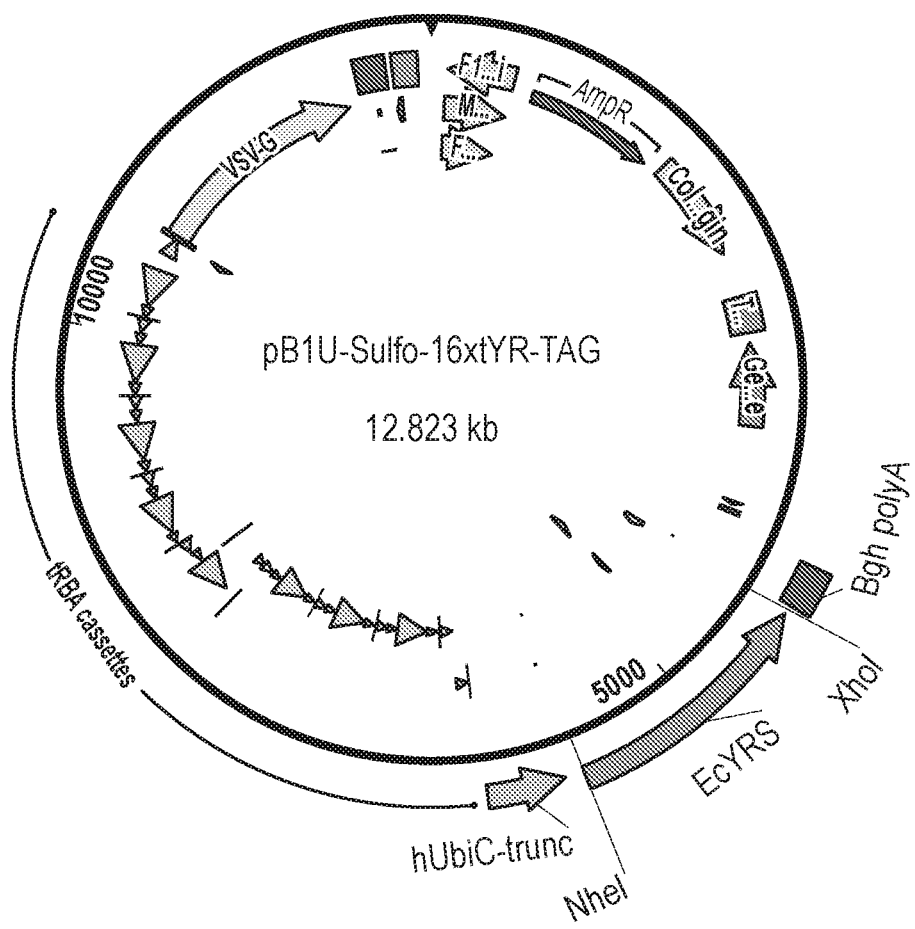
FIG. 12 depicts the plasmid map of pB1U-Sulfo-16xtYR-TAG.
Figure 14:
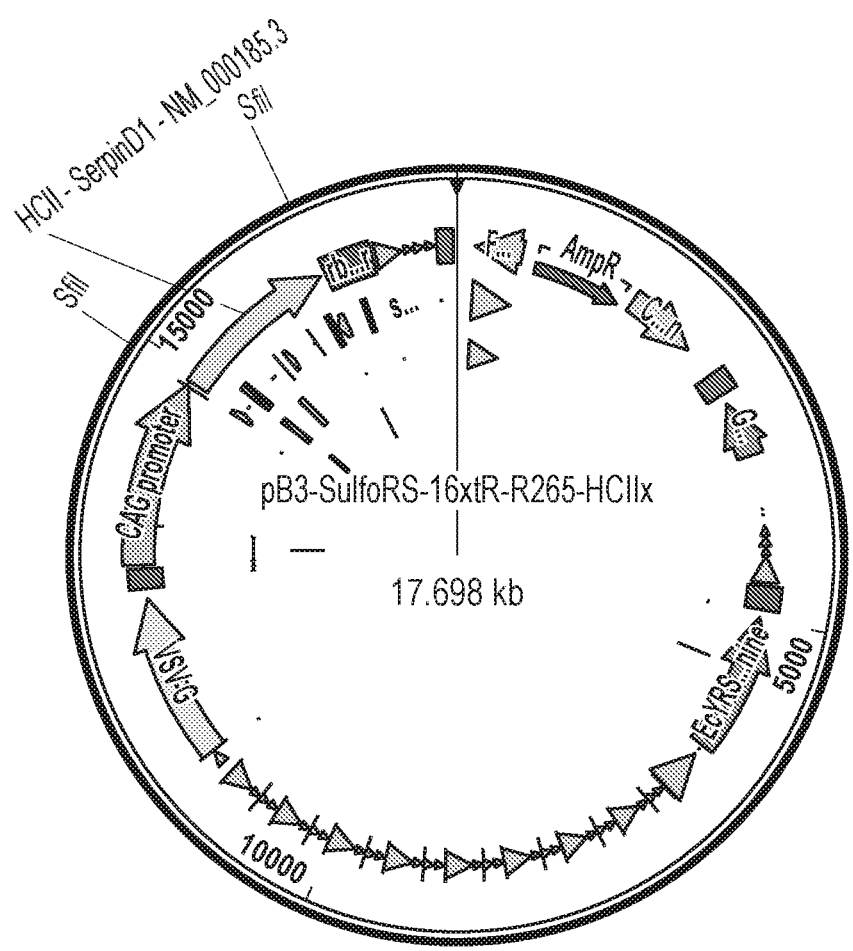
FIG. 14 depicts the plasmid map of pB3-sulfoRS-16xtR-R265-HCIIx.
Figure 17:
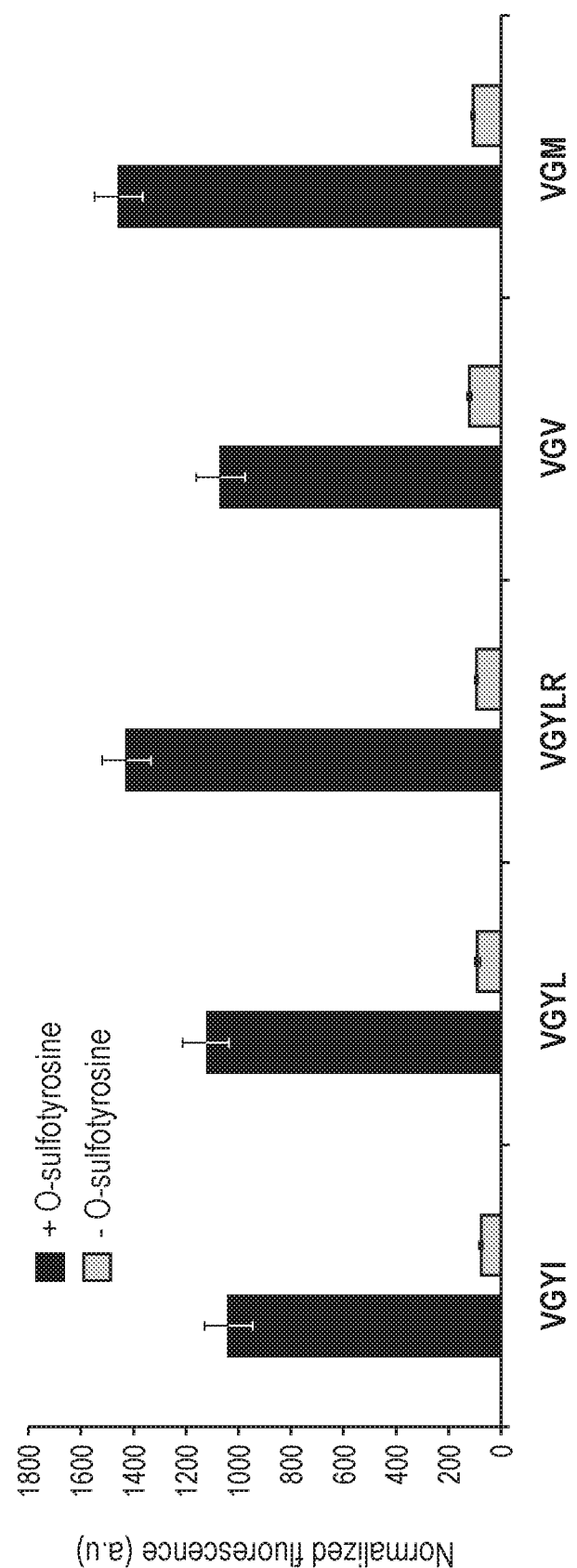
FIG. 17 shows the sulfotyrosine charging activity of the EcTyr-RS mutants VGYI; VGYL; VGYLR and VGV (SEQ ID NOS: 6-9) and VGM (SEQ ID NO:5). EcTyrRS mutants facilitate sfGFP-151-TAG reporter expression in ATMY4 *E. coli* in the presence of sTyr (fluorescence in resuspended cells).

The platform of the present invention should allow facile expression of native eukaryotic proteins homogeneously sulfated at native sites. The present invention sought to demonstrate this using human heparin cofactor II (HCII) as a model system. HCII, a large secreted glycoprotein, is a serine protease inhibitor (serpin) that irreversibly inhibits thrombin, a key player in executing blood coagulation. This anticoagulant activity of HCII is triggered by glycosaminoglycans (GAGs) such as heparin. In the absence of GAGs, the acidic N-terminal domain (AND) of HCII binds its glycosoaminoglycan binding domain (GBD), resulting in an auto-inhibited state (FIG. 3a). GAGs activate HCII by binding its GBD and displacing the AND, which then recruits thrombin by binding its exosite 1 (FIG. 3a). The AND of HCII, which can bind both thrombin exosite I and GBD, is sulfated at two distinct sites (Tyr60 and Tyr73) whose roles in HCII activity is poorly understood. The absence of ER-Golgi processing precludes bacterial expression of HCII in its native glycosylated state, while overexpression in eukaryotic hosts can result in incomplete sulfation. UAG codons were introduced at 60 and 73 positions of full-length human HCII and overexpressed it in HEK293T cells in the presence of our sTyr incorporation system. Full-length HCII was successfully isolated from the culture medium using a C-terminal polyhistidine tag (FIG. 8). Whole-protein ESI-MS of this large protein was challenging, but the presence of sTyr at both sites through protease digestion followed by LC-MS analysis (FIG. 9, 10) was confirmed. Glycosylase (PNGase) treatment significantly reduced the molecular weight of the protein (FIG. 11), suggesting the presence of robust N-linked glycosylation. These results confirm that the platform of the present invention can be used to express endogenous eukaryotic proteins precisely sulfated at multiple sites.

In addition to 60-sTyr-73-sTyr, we also expressed and purified HCII mutants 60-Phe-73-Phe (to prevent sulfation), 60-sTyr-73-Phe, and 60-Phe-73-sTyr (FIG. 8) and evaluated their thrombin inhibition activities using an established biochemical assay. For each HCII mutant, second-order rate constants ($k_2$) of thrombin inhibition were measured at different heparin concentrations to find the optimal [heparin], at which maximal inhibition rate is observed (FIG. 3b), 60-sTyr-73-sTyr exhibited a maximal rate constant of $3 \times 10^8$ $M^{-1}min^{-1}$ at ~20 µg/mL heparin, which is in close agreement with previously reported data. Interestingly, the absence of sTyr at site 73 (60-sTyr-73-Phe) led to a slightly lower maximal $k_2$ but a substantially reduced (~3 fold) optimal [heparin], whereas the 60-Phe-73-sTyr mutant (no sTyr at site 60) had an unchanged optimal [heparin] but a significantly lower maximal $k_2$ (FIG. 3b). The 60-Phe-73-Phe mutant showed both a low maximal $k_2$, and a reduced optimal [heparin]. The preliminary biochemical evaluation of precisely sulfated HCII mutants suggests important—yet distinct—roles the two sulfation PTMs play in fine-tuning its GAG-triggered thrombin inhibition activity: while the 73-sTyr appears to contribute more to AND-GBD association, the 60-sTyr might be more important for thrombin recruitment.

Without further elaboration, it is believed that one skilled in the art can, based on the above description, utilize the present invention to its fullest extent. The following specific embodiments and examples are, therefore, to be construed as merely illustrative, and not limitative of the remainder of the disclosure in any way whatsoever

EXAMPLES

Materials and Methods

General Biological Reagents, Strains, and Protocols

Using E. coli strain DH10B (Life Technologies) was used for plasmid propagation and cloning. E. coli strains were cultured on LB-agar plates with appropriate antibiotic concentrations as follows: 95 µg/mL spectinomycin, 50 µg/mL chloramphenicol, 30 µg/mL kanamycin. Phusion high fidelity DNA polymerase (Thermo-Fischer) was used for PCR amplifications and restriction enzymes were obtained from New England Biolabs. DNA oligonucleotides were purchased from Integrated DNA Technologies, while Sanger sequencing was performed by Eton Bio. Engineered E. coli strain ATMY3 (contains one genomic copy of tRNA$^{EcTyr}_{CUA}$; no genomic EcTyrRS) was used as the selection host for the directed evolution of EcTyrRS. Engineered E. coli strain ATMY4 (contains two genomic copies of tRNA$^{EcTyr}_{CUA}$; no genomic EcTyrRS) was used as the expression host for expressing recombinant proteins incorporating sTyr.

HEK293T cell line was purchased from ATCC (ATCC CRL-3216) and maintained in DMEM (high glucose) supplemented with 10% FBS and Penicillin/Streptomycin. Cells were grown in a 37° C. 100% humidity, 5% $CO_2$.

EcTyrRS Library Construction

In the EcYRS1 library (pBK-EcYRS1), six residues were randomized as follows: Y37-FLIMVSTAYHCG (SEQ ID NO:2), L71-NBT, N126-NSPTACGDH (SEQ ID NO:3) D182-NST, F183-NNK, L186-NNK. A previously reported library (pBK-EcYRS1a) was used, which contains the desired Y37, D182, F183, and L186 randomizations, as the template to generate pBK-EcYRS1 by sequential overlap of extension PCR. Piece A was amplified with primers pBK seqT-F and EcYRS-L71-oR. Piece B was amplified with EcYRS-L71-NBT-F and EcYRS-N126-oR, and subsequently overlapped with piece A using terminal primers pBK seqT-F and EcYRS-N126oR to create piece AB. Lastly, piece C was amplified with EcYRS-N126x-F (x corresponds to nine different codons) and pBK MCS JIsqR for all desired N126 variants. Piece C variants were combined in equal distribution and were subsequently overlapped with piece AB to form the full length aaRS PCR product.

After amplification, the aaRS PCR product was digested with NdeI/NcoI (NEB) and ligated by T4 DNA Ligase (NEB) into the pBK vector digested with the same restriction enzymes. The ligation mixture was ethanol precipitated with Yeast-tRNA (Ambion) and transformed into electrocompetent DH10B cells. Greater than $10^8$ transformants were obtained to ensure library coverage.

Directed Evolution of EcTyrRS-SulfoY Variant in ATMY3

Positive selection 1: The pBK-EcYRS1 library was transformed into ATMY3 containing the positive selection plasmid pRepTrip2.3P-EcQtR-2x. The pRep plasmid expresses a chloramphenicol acetyl transferase (CAT) reporter containing a Q98TAG, an ampicillin resistance gene containing a 3TAG, an arabinose inducible T7 RNA polyermase containing two TAG codons (site 8 and 14), a T7 promoted GFPuv, and two copies of the E. coli tRNA$^{Gln}$ expressed from its endogenous promoter. Approximately $9 \times 10^8$ colony forming units were plated on LB+0.5× spectinomycin, tetracyclin, and kanamycin+0.02% arabinose+30 µg/min ampicillin+30 or 50 µg/mL, chloramphenicol in the presence of 1 mM sTyr for 18 hat 37° C. After 18 h, colonies from plates were harvested with 15 mL LB, centrifuged and selected pBK plasmid pool (pBK-EcYRS1a-P1) was purified via miniprep and isolated via gel purification.

For Negative selection: The isolated plasmid was subsequently transformed into ATMY3 containing pNeg2-2xQtR (contains arabinose dependent barnase with 3TAG, 45TAG, and two copies of the E. coli tRNA$^{Gln}$). Approximately $10^8$ cells were plated on LB-agar plates containing 0.5× spectinomycin, ampicillin, and kanamycin+0.02% arabinose in the absence of sTyr for 12 h at 37° C. After 12 h, colonies from plates were harvested with 15 mL LB, centrifuged and the pBK library subjected to one positive selection and one negative selection (pBK-EcYRS1a-P1N1) was purified via miniprep.

Positive selection 2: pBK-EcYRS1a-P2N1 was subjected to a second round of positive selection ($10^6$ cfu plated). 96 single colonies from the second round of positive selection plates containing 1 mM sTyr were picked into 500 μL LB supplemented with spectinomycin, tetracyclin, kanamycin in a 96 deep-well plate and grown to confluence overnight. These overnight cultures were diluted 100 fold and 3 μL were individually spot plated on LB-Agar plates containing spectinomycin, tetracyclin, kanamycin+0.02% arabinose and 30 or 50 μg/mL chloramphenicol in the presence or absence of 1 mM sTyr. Eight pBK variants showing the most sTyr-dependent survival were picked for further characterization.

Characterization of tRNA/aaRS Activity in E. coli Via sfGFP Reporter

Preparation ATMY4 containing pEvolT5-sfGFP151TAG was transformed with pBK-EcTyrRS variants. Overnight starter cultures were diluted 100 fold in 10 mL LB containing required antibiotics and grown at 37° C. while shaking at 250 rpm in 50 mL flasks. Upon reaching 0.55 $OD_{600}$, 1 mM final IPTG was added to induce protein expression. 1 mL aliquots of induced cultures were placed in 15 mL culture tubes with or without 1 mM sulfotyrosine and grown for 18-20 h at 30° C. Afterwards, cells were pelleted, resuspended in PBS, and diluted 10 fold. Dilutions were transferred to a 96-well clear bottom plate. Expression of full-length sfGFP was measured using the associated characteristic fluorescence by a SpectraMAX M5 (Molecular Devices) multimode plate reader (Ex. 488 nm; Em. 534 nm; 515 cutoff) and normalized with respect to $OD_{600}$.

Purification of sfGFP-TAG from Bacterial Expression

Protein expression was performed in 10 mL culture as described above (sfGFP151-TAG reporter assay). Afterwards, the cells were pelleted at 5000×g, resuspended in lysis buffer [B-PER Bacterial Protein Extraction Reagent (Thermo Scientific), 1× Halt Protease Inhibitor Cocktail (Thermo Scientific), 0.01% Pierce Universal Nuclease (Thermo Scientific), and incubated for 10 min on ice. After incubation, the crude lysate was clarified at 22,000×g. The full-length sfGFP containing a C-terminal 6× HisTag (SEQ ID NO: 33) was purified using HisPur Ni-NTA resin (Thermo Scientific) according to the manufacturers protocol. SDS-PAGE and Bradford analysis were used to assess protein purity, while the molecular weight was confirmed by ESI-MS (Agilent Technologies 1260 Infinity ESI-TOF).

Site-Specific Incorporation of sTyr into Protein Expressed in Mammalian Cells

HEK293T cells were maintained as described above. pB1U-SulfoA1-16xtYR-TAG (VGL) or pB1U-SulfoB7-16xtYR-TAG (VGM) contain 16 copies of alternating U6/H1 promoted E. coli tRNA$^{Tyr}_{CUA}$ and UbiC promoted EcTyrRS mutants. pAcBac1-EGFP-39TAG was used as a reporter plasmid. $0.7×10^6$ cells per well were seeded one day prior to transfection in a 12 well plate. At 70% confluence, the transfection mixture (500 ng each of suppressor and reporter plasmid, 18 μL DMEM, 3.5 μL Sigma PEI (1 mg/mL), 10 min incubation prior to addition) was added to each well and gently mixed. A final concentration of 2 mM sTyr was added to the wells at the time of transfection. After 48 h, cells were harvested by centrifugation at 5000×g and residual media was removed. 50 μL lysis buffer (10 mL CellLytic M, 1× Halt Protease inhibitor, 0.01% Pierce universal nuclease) was added per well and incubated for 10 min. After incubation, cells were clarified by centrifugation and lysate was analyzed for fluorescence in the SpectraMAX M5 (Molecular Devices) under the same conditions as sfGFP.

For purification and further charectrization, EGFP-39-sTyr was expressed in 10 cm dishes ($8.5×10^6$ seeded 24 h prior to transfection). 5 μg suppressor plasmid and 5 μg reporter plasmid were incubated with 180 μL DMEM (no FBS) and 40 μL PEImax (Polysciences; 1 mg/mL). 2 mM sTyr and 2 mM Sodium Butyrate was added at the time of transfection. After 48 hr, cells were harvested at 5000×g. 600 μL lysis buffer (CellLytic M, 1× Halt protease inhibitor, 0.01% Pierce universal nuclease) was used to lyse the cells. After 10 min incubation, the lysate was clarified by centrifugation and the protein was purified using HisPur Ni-NTA resin (Thermo-Scientific). Purity and the molecular weight of the expressed protein was analyzed by SDS-PAGE and ESI-MS (Agilent Technologies 1260 Inifinity ESI-TOF).

Anti-His and Anti-Sulfotyrosine Western Blot of GFP Reporters

Western blot was used to confirm the presence of a polyhistidine tag (via anti-HisTag blot) and the presence of sulfotyrosine (via anti-sTyr blot) in reporter proteins expressed above. 500 ng each of purified wild-type or sTyr-incorporated mutant of sfGFP or EGFP reporter proteins were resolved by SDS-PAGE, and transferred to a PVDF membrane (Life Technologies) using a Trans-Blot Turbo Transfer System (BioRad) in Towbin Transfer Buffer (at 12V for 30 min, twice). After complete transfer, membrane was blocked in 10 mL 5% milk in TBST (HisBlot) or 10 mL Pierce Superblocker (Fisher Scientific) at 4° C. overnight with constant agitation. Membranes were subsequently incubated in 1:3000 anti-HisTag mouse mAb (Invitrogen, MA121315, in 5% milk TBST) or 1:6000 anti-Sulfotyrosine mouse mAb (Millipore Sigma, Clone: 1CA2, in Pierce Superblocker) overnight. Next, the membrane was washed six times, 10 min per wash, using TBST at room temperature. Afterwards, 1:6000 dilution of chicken anti-mouse secondary antibody (Invitrogen, SA1-72021, in 5% milk TBST) was incubated for 2 h at room temperature. The membrane was washed and activated using SuperSignal West Dura Kit (Fisher Scientific), The activated blot was imaged on the ChemiDoc MP imaging system (BioRad).

Expression and Purification of Heparin Cofactor II (HCII)

HEK293T cells were maintained as described above. pB3-SulfoRS-16xYtR-TAG-HCII contains the following three components: 16 copies of alternatingly H1/U6 promoted E. coli tyrosine tRNA$_{CUA}$, a UbiC promoted EcTyrRS mutant, and HCII mutants under a CAG promoter. 10 cm dishes were seeded with $8.5×10^6$ cells 24 h prior to transfection. Afterwards, DMEM +FBS media was aspirated and replaced with DMEM without FBS. A transfection mixture (10 μg pB3 plasmid, 180 μL DMEM, 50 μL PEI Max) was incubated for 10 min prior to addition. 2 mM sTyr and 2 mM sodium butyrate were added at the time of transfection. Since HCII is a secreted protein, the media was harvested on days 2 and 3 post transfection, stored at 4° C. for up to 2 days, and adherent HCII expressing cells were re-supplemented with DMEM (no FBS)+2 mM sTyr+2 mM sodium butyrate. Collected media containing overexpressed HCII (20 mL total per 10 cm plate) were pooled and subjected to purification.

HCII containing media was centrifuged at 5,000×g at 4° C. for 30 min to remove any residual debris. The supernatant was concentrated with Amicon 30 kDa MWCO centrifugal filters to approximately 2 mL. For concentrated media harvested from five 10 cm dishes, 1 mL Ni-NTA (Thermo-Scientific) resin was used for protein purification. Bound protein was washed with 50 mL of wash buffer containing PBS+45 mM imidazole. HCII was eluted with 10 mL elution buffer, concentrated down to 1 mL using a 30 kDa MWCO filter, and buffer exchanged into HNPN –PEG buffer (20 mM HEPES, pH 7.4, 150 mM NaCl, 0.05% NaN$_3$). Protein yields and purity were analyzed by Bradford, SDS-PAGE, anti-His tag dot blot, and tryptic/elastase mass spectrometry.

Deglycosylation Assay of HCII

PNGase F was purchased from Promega (V4831). 18 µL (10 µg, in 0.5 mM Tris-HCl, pH 7.8) purified recombinant HCII was incubated at 37° C. with or without 2 µL PNGase for 18 hrs. After incubation, mixtures were resolved by SDS-PAGE and imaged via ChemiDoc imaging.

Tryptic & Elastase Mass Spectrometry Characterization of HCII

An in gel digestion was performed to prepare peptides for MS analysis. 1000-2000 ng HCII was resolved by SDS-PAGE. Gel was stained for 1 hr, and destained overnight. After destain, HCII bands were sliced and cut into approximately 1 mm$^2$ pieces. Pieces were placed in microcentrifuge tubes containing 500 µL 100 mM ammonium bicarbonate. Gel bands were frozen at –80° C. overnight in the 500 µL ammonium bicarbonate. Gel bands were thawed, supernatant was removed, and gel bands were washed 1-2× for 15 min with 500 µL 100 mM ammonium bicarbonate. After washes, supernatant was removed and 200 µL 10 mM TCEP was added to completely cover gel bands. Samples were placed in a 60° C. water bath for 30 min. Samples were quickly spun and TCEP was aspirated. 200 µL 55 mM iodoacetamide was added to cover the gel bands. Tubes were placed in the dark for 30 min at RT. Supernatant was removed and gel bands were washed 3× for 15 min in 500 µL 50:50 acetonitrile:100 mM ammonium bicarbonate. After washes, supernatant was removed and 50 µL acetonitrile was added to completely dehydrate the gel bands (turned opaque). Acetonitrile was removed and residual solvent was removed using a SpeedVac for 5 min.

Sequencing grade trypsin (V5111) and neutrophil elastase (V1891) was purchased from Promega. Sample was resuspended in either trypsin (for 60 site) or trypsin+elastase (for 73 site). For trypsin, 200 ng trypsin (20 µL, resuspended in 25 mM ammonium bicarbonate) was added to dehydrated gel slices. For trypsin+elastase, 300 ng (30 µL, 25 mM ammonium bicarbonate) trypsin was added, immediately followed by 35 µL elastase (30 ng, resuspended in double distilled water according to manufacturer protocol)+50 µL 50 mM Tris-HCl. In both cases, enzymes were incubated with gel sample for 10 min before 200 µL 50 mM ammonium bicarbonate was added and placed at 37° C. incubator overnight. Next, the supernatant was transferred to a clean tube and 100 µL formic acid was added to the gel bands followed by a 15 min incubation at RT. The supernatant was aspirated and combined with the supernatant from the last step. Formic acid washes of the gel slices were repeated two more times. Next, 150 µL acetonitrile was added to cover the gel slices, incubated at RT for 15 min, and combined with all previous washes. Acetonitrile washes were repeated two more times until bands became opaque. Lastly, the peptide sample (~500 µL consisting of the overnight incubation supernatant, formic acid washes, and acetonitrile washes) was evaporated down to 10 µL using SpeedVac and stored at –80° C. until subjected to HPLC-MS analysis.

Digested peptides were analyzed by LC-MS using an LTQ Orbitrap XL mass spectrometer (Thermo Fisher) coupled to an EASY-nLC 1000 nanoLC (Thermo Fisher). 18 µL of sample was loaded onto 100 µm fused silica column with a 5 µm tip packed with 10 cm of Aqua C18 reverse-phase resin (Phenomenex) using the EASY-nLC 1000 autosampler. Peptides were eluted with a gradient 0-55% buffer B in buffer A (buffer A: 95% water, 5% acetonitrile, 0.1% formic acid; buffer B; 20% water, 80% acetonitrile, 0.1% formic acid). The flow rate through the column was set to 400 nl/min and the spray voltage was set to 3.5 kV. One full MS scan (400-1800 MW) was followed by seven data dependent scans. For the data dependent scans, a mass list was used to target the predicted peptides with sTyr at residues 60 and 73. In the absence of a targeted peptide, data dependent scans were performed on the nth most intense ions in the MS1. MS1 spectra and total ion chromatograms were manually analyzed for peptide identification and presence of sulfation at each residue.

HCII-Thrombin Activity Assay

To calculate the second order rate constant of thrombin inhibition by HCII, thrombin was incubated with excess HCII under pseudo-first order conditions in the presence of different heparin concentrations (details below). The reaction was quenched after 1 minute and the residual thrombin activity ($k_{inhibited}$) was measured using a chromogenic substrate. The pseudo-first order rate constant ($k_1$) was calculated from this using the equation $k_1 = -\ln(k_{inhib}/k_{uninhib})/t$, where $k_{uninhib}$ is the activity of thrombin in the absence of HCII inhibition under identical treatment. The second order inhibition rate constant ($k_2$) was calculated from $k_1$ using the equation $k_2 = k_1/[HCII]$ with units of $M^{-1}min^{-1}$. The second order rate constant at each heparin concentration was plotted against the corresponding heparin concentration.

Concentrations of different HCII protein were measured by Bradford and normalized by anti-His dot-blot assay (blot intensities quantified via ChemiDoc imaging). Clear plastic 96 well plates were coated with 2 mg/mL ovalbumin (Fisher) for 1 hr at 37° C. Ovalbumin was removed by tapping the plate on a paper towel. A master mix of 2 mg/mL ovalbumin, 0-2 mg/mL heparin (Fisher), 0.6 nM α-thrombin (Fisher) in HNPN (20 mM HEPES, pH 7.4, 150 mM NaCl, 0.05% NaN3) were incubated in the treated 96 wells for 1 min with 10 nM HCII. After 1 min, 10 µL of a solution of 1 mg/mL polybrene was directly added to all wells using a multichannel pipet to quench the heparin-dependent inhibition of thrombin by HCII. The plates were spun down in a bucket centrifuge for 10 min at 3,500 rpm to precipitate the heparin/polybrene complex. 100 µL supernatant was removed and 50 µL 450 µM ChromozymeTH (Sigma) substrate was added to measure the amount of residual thrombin activity by monitoring the absorbance on the SpectroMax plate reader at 405 nm for 1 hr in triplicate.

List of Oligonueleotides shown below in Table 1 (SEQ ID NOS: 17-32)

| Primer Name | Sequence |
|---|---|
| SEQ ID NO: 17 pBK seqT-F | ATTACGCTGACTTGACGGGACGG |
| SEQ ID NO: 18 EcYRS-L71-oR | CGCAACCGGCTTGTGGCCCGCCTGC |
| SEQ ID NO: 19 EcYRS-L71-NBT-F | GCAGGCGGGCCACAAGCCGGTTGCG nbtGTAGGCGGCGCGACGGGTCTGA TTG |

-continued

| Primer Name | Sequence |
| --- | --- |
| SEQ ID NO: 20 EcYRS-N126-oR | GTTCGCCGCGATAGCAGAGTTTTC |
| SEQ ID NO: 21 EcYRS-N126x-F | GAAAACTCTGCTATCGCGGCGAACn nnTATGACTGGTTCGGCAATATGAA TGTGCTGAC |
| SEQ ID NO: 22 pBK MCS JisqR | GAGATCATGTAGGCCTGATAAGCGT AGC |
| SEQ ID NO: 23 EcYRS-NheI-F | GCTAGCGCCACCATGGCAAGCA |
| SEQ ID NO: 24 EcYRS-XhoI-R | aataatCTCGAGTTATTTCCAGCAA ATCAGACAGTAATTCTTTTTACC |
| SEQ ID NO: 25 HCII-SfiI-F | TGGCAAAGAATTGGCCAAGGAGGCC ACCATGAAACACTCATTAAACGCAC TTC |
| SEQ ID NO: 26 10xH is-TGA-SfiI-R ("1.0xHis" disclosed as SEQ ID NO: 34) | TGGCGGCCGGCCAGGCCTCAATGAT GGTGGTGATGATGATGGTGATGATG |
| SEQ ID NO: 27 HCII-79-Phe-R | GTCGTCGTCTTCACTGAATATCTTC TCCAGGTCCAGaaaGTCGTCGTCCT CCTCCCCC |
| SEQ ID NO: 28 HCII-79-TAG-R | GTCGTCGTCTTCACTGAATATCTTC TCCAGGTCCAGctaGTCGTCGTCCT CCTCCCCC |
| SEQ ID NO: 29 HCII-92-Phe-F | CTGGACCTGGAGAAGATATTCAGTG AAGACGACGACtttATCGACATCGT CGACAGTCTG |
| SEQ ID NO: 30 HCII-92-TAG-F | CTGGACCTGGAGAAGATATTCAGTG AAGACGACGACtagATCGACATCGT CGACAGTCTG |
| SEQ ID NO: 31 HCII-80-iF | CTGGACCTGGAGAAGATATTCAGTG AAGACGACGAC |
| SEQ ID NO: 32 HCII-80-iR | GTCGTCGTCTTCACTGAATATCTTC TCCAGGTCCAG |

Plasmid Content and Construction pB1U-Sulfo-16xtYR-TAG: EcTyrRS VGL and VGM variants were amplified from pBK with oligonucleotides EcYRS-NheI-F and ExYRS-XhoI-R and subcloned into pB1U-OMeYRS-16xtYR-TAG between NheI and XhoI.

pB3-SulfoRS-16xYtR-TAG-HCII: pAcBac3 OMeYRS was used as a starting vector to construct this plasmid. pB3 (abbreviated pAcBac3) is identical to pB1u except it contains a CAG promoter upstream from an SfiI site as well as 4 additional tRNA cassette copies. OMeYRS was replaced with SulfoRS via NheI/XhoI as previously described in pB1U cloning description. The SfiI site was used to insert HCII. HCII-SfiI-F and 10xHis-TGA-SfiI-R ("10xHis" disclosed as SEQ ID NO: 34) were used to amplify HCII from pCMV-SerpinD1 (Origine, SC120039). Mutations were introduced via overlap extension (see primer list for 79, 92, and 80 overlap primers—79 and 92 correspond to 60 and 73 sites, respectively). HCII insert and vector were digested with SfiI and ligated via traditional RE cloning.

In summary, the present invention has developed a platform for site-specific incorporation of sTyr into proteins expressed in eukaryotic cells with high fidelity and efficiency, which would be a valuable tool for investigating the consequences of tyrosine sulfations found in the eukaryotic proteome. This platform can also be used to express therapeutically relevant proteins homogeneously modified with functionally important sulfations. Additionally, the ability to incorporate sTyr into virtually any site of any protein in eukaryotic cells offers intriguing opportunities for novel synthetic biology applications.

REFERENCES

The references listed in this application are herein incorporated by reference in their entirety.
1 Moore, K. L. Protein tyrosine sulfation: a critical post-translation modification in plants and animals. *Proceedings of the National Academy of Sciences of the United States of America* 106, 14741-14742, doi:10.1073/pnas.0908376106 (2009).
2 Seibert, C. & Sakmar, T. P. Toward a framework for sulfoproteomics: Synthesis and characterization of sulfotyrosine-containing peptides. *Biopolymers* 90, 459-477, doi:10.1002/bip.20821 (2008).
3 Stone, M. J., Chuang, S., Hou, X., Shoham, M. & Zhu, J. Z. Tyrosine sulfation: an increasingly recognised post-translational modification of secreted proteins. *New biotechnology* 25, 299-317 (2009).
4 Yang, Y. S. et al, Tyrosine sulfation as a protein post-translational modification, *Molecules* (Basel, Switzerland) 20, 2138-2164, doi:10.3390/molecules20022138 (2015).
5 Farzan, M. et al. Tyrosine sulfation of the amino terminus of CCR5 facilitates HIV-1 entry. *Cell* 96, 667-676 (1999).
6 Huang, C.-c. et al. Structural basis of tyrosine sulfation and VH-gene usage in antibodies that recognize the HIV type 1 coreceptor-binding site on gp120. *Proceedings of the National Academy of Sciences of the United States of America* 101, 2706-2711 (2004).
7 Li, X., Hitomi, J. & Liu, C. C. Characterization of a Sulfated Anti-HIV Antibody Using an Expanded Genetic Code. *Biochemistry* (2018).
8 Stone, M. J. & Payne, R. J. Homogeneous sulfopeptides and sulfoproteins: synthetic approaches and applications to characterize the effects of tyrosine sulfation on biochemical function. *Accounts of chemical research* 48, 2251-2261 (2015).
9 Thompson, R. E, et al. Tyrosine sulfation modulates activity of tick-derived thrombin inhibitors. *Nature chemistry* 9, 909 (2017).
10 Mikkelsen, J., Thomsen, J. & Ezban, M. Heterogeneity in the tyrosine sulfation Chinese hamster ovary cell produced recombinant FVIII. *Biochemistry* 30, 1533-1537 (1991).
11 Chin, J. W. Expanding and reprogramming the genetic code. *Nature* 550, 53 (2017).
12 Italia, J. S. et al. Expanding the genetic code of mammalian cells. *Biochemical Society transactions* 45, 555-562, doi:10.1042/bst20160336 (2017).
13 Young, D. D. & Schultz, P. G. Playing with the molecules of life. *ACS chemical biology* (2018).
14 Liu, C. C., Brustad, E., Liu, W. & Schultz, P. G. Crystal structure of a biosynthetic sulfo-hirudin complexed to thrombin. *Journal of the American Chemical Society* 129, 10648-10649 (2007).
15 Liu, C. C. & Schultz, P. G. Recombinant expression of selectively sulfated proteins in *Escherichia coli*. *Nature biotechnology* 24, 1436-1440, doi:10.1038/nbt1254 (2006).

16 Watson, E. E. et al, Mosquito-Derived Anophelin Sulfoproteins Are Potent Antithrombotics. *ACS central science* 4, 468-476 (2018).

17 Italia, J. S., Latour, C., Wrobel, C. J. & Chatterjee, A. Resurrecting the bacterial tyrosyl-tRNA synthetase/tRNA pair for expanding the genetic code of both *E. coli* and eukaryotes. *Cell chemical biology* 25, 1304-1312. e1305 (2018).

18 Chin, J. W. et al. An expanded eukaryotic genetic code. *Science* (New York, N.Y.) 301, 964-967, doi:10.1126/science.1084772 (2003).

19 Dumas, A., Lercher, L., Spicer, C. D. & Davis, B. G. Designing logical codon reassignment—Expanding the chemistry in biology. *Chemical Science* 6, 50-69 (2015).

20 Italia, J. S. et al. An orthogonalized platform for genetic code expansion in both bacteria and eukaryotes. *Nature chemical biology* 13, 446-450, doi:10.1038/nchembio.2312 (2017).

21 Tollefsen, D. M. Heparin cofactor II. *Advances in experimental medicine and biology* 425, 35-44 (1997).

22 Tollefsen, D. M. Heparin cofactor II modulates the response to vascular injury. *Arteriosclerosis, thrombosis, and vascular biology* 27, 454-460 (2007).

23 Hortin, G., Tollefsen, D. & Strauss, A. W. Identification of two sites of sulfation of human heparin cofactor II. *Journal of Biological Chemistry* 261, 15827-15830 (1986).

24 Ciaccia, A. V., Monroe, D. M. & Church, F. C. Arginine 200 of Heparin Cofactor II Promotes Intramolecular Interactions of the Acidic Domain IMPLICATION FOR THROMBIN INHIBITION. *Journal of Biological Chemistry* 272, 14074-14079 (1997).

25 Mitchell, J. W. & Church, F. C. Aspartic acid residues 72 and 75 and tyrosine-sulfate 73 of heparin cofactor II promote intramolecular interactions during glycosaminoglycan binding and thrombin inhibition. *Journal of Biological Chemistry* 277, 19823-19830 (2002).

26 Zheng, Y., Lewis Jr, T. L., Igo, P., Polleux, F. & Chatterjee, A. Virus-enabled optimization and delivery of the genetic machinery for efficient unnatural amino acid mutagenesis in mammalian cells and tissues. *ACS synthetic biology* 6, 13-18 (2016).

While this invention has been particularly shown and described with references to preferred embodiments thereof, it will be understood by those skilled in the art that various changes in form and details may be made therein without departing from the scope of the invention encompassed by the appended claims.

---

What is claimed is:

1. A composition comprising a variant *E. coli* tyrosyl-tRNA synthetase (EcTyr-RS) wherein the variant EcTyr-RS preferentially aminoacylates an *E. coli* tyrosyl-tRNA (EctRNA$^{Tyr}$) with a sulfotyrosine analog over the naturally-occurring tyrosine amino acid, wherein the variant EcTyr-RS comprises an amino acid sequence selected from the group consisting of: SEQ ID NOS: 4-9.

2. The composition of claim 1, wherein the sulfotyrosyl analog is O-sulfotyrosine.

3. A cell comprising a variant *E. coli* tyrosyl tRNA synthetase (EcTyr-RS), wherein the variant EcTyr-RS preferentially aminoacylates an *E. coli* tyrosyl tRNA with a sulfotyrosine analog over the naturally-occurring tyrosine amino acid, and an orthogonal *E. coli* tyrosyl tRNA (Ec-tRNA$^{Tyr}$) as a pair, wherein the variant EcTyr-RS comprises an amino acid sequence selected from the group consisting of: SEQ ID NOS: 4-9.

4. The cell of claim 3, wherein the Ec-tRNA$^{Tyr}$ comprises the polynucleotide sequence SEQ ID NO: 10, wherein the tRNA has an anti-codon loop comprising a sequence that specifically binds to a selector sequence of an mRNA, wherein the selector is an amber codon.

5. The cell of claim 3, wherein the cell is an *E. coli* cell or a eukaryotic cell.

6. The cell of claim 5, wherein the eukaryotic cell is a mammalian cell.

7. The *E. coli* cell of claim 5, wherein the *E. coli* is the ATMY4 strain of *E. coli* cell.

8. A kit for producing a protein or peptide of interest in a cell, wherein the protein or peptide comprises one, or more sulfotyrosine analogs, the kit comprising:
   a. a container containing a polynucleotide sequence encoding an Ec-tRNA$^{Tyr}$ that recognizes an amber selector codon in a nucleic acid of interest in the cell; and
   b. a container containing a variant *E. coli* tyrosyl tRNA synthetase that preferentially aminoacylates the Ec-tRNA$^{Tyr}$ with a sulfotyrosyl analog, wherein the EcTry-RS comprises an amino acid sequence selected from the group consisting of: SEQ ID NOS: 4-9.

9. The kit of claim 8, wherein the kit further comprises one, or more, sulfotyrosyl analogs.

10. The kit of claim 9, wherein the sulfotyrosyl analog is O-sulfotyrosine.

11. A method of site-specifically incorporating one, or more, suflotyrosine residues into a protein or peptide produced in a cell, the method comprising,
   a. culturing the cell in a culture medium under conditions suitable for growth, wherein the cell comprises a nucleotide sequence that encodes a protein or peptide of interest with one, or more, amber selector codons at specific sites in the protein or peptide, wherein the cell also comprises a nucleotide sequence encoding an Ec-tRNA$^{Tyr}$ that recognizes the amber selector codon, and wherein the cell further comprises a nucleotide sequence encoding a variant *E. coli* tyrosyl-tRNA synthetase of claim 2, and
   b. contacting the cell culture medium with one, or more, sulfotyrosine amino acid residues under conditions suitable for incorporation of the one, or more, sulfotyrosine residues into the protein or peptide at the sites of the selector codon(s),
   thereby producing the protein or peptide of interest with one, or more site-specifically incorporated sulfotyrosine residues.

12. The method of claim 11, wherein the *E. coli* tyrosyl tRNA nucleotide sequence comprises SEQ ID NO: 10.

13. The method of claim 11, wherein the sulfotyrosine analog is O-sulfotyrosine.

14. The method of claim 11, wherein the cell is an *E. coli* cell or a eukaryotic cell.

15. The method of claim 14, wherein the cell is a mammalian cell.

* * * * *

UNITED STATES PATENT AND TRADEMARK OFFICE
CERTIFICATE OF CORRECTION

PATENT NO. : 12,435,327 B2
APPLICATION NO. : 17/594570
DATED : October 7, 2025
INVENTOR(S) : Abhishek Chatterjee et al.

Page 1 of 1

It is certified that error appears in the above-identified patent and that said Letters Patent is hereby corrected as shown below:

In the Specification

1. Column 1, Line 7, Related Application paragraph, delete "This application claims the benefit under 35 U.S.C. § 119(e) of U.S. Provisional Application No.62/837,217, filed on April 23, 2019, which is incorporated herein by reference in its entirety." and insert: -- This application is a § 371 National Phase Application of International Application No. PCT/US2020/029567, filed on April 23, 2020, now International Publication No. WO/2020/219708, published on October 29, 2020, which International Application claims the benefit under 35 U.S.C. 119(e) of U.S. Provisional Application No. 62/837,217, filed on April 23, 2019, both of which are incorporated herein by reference in their entirety. --

2. Column 2, Line 34, delete "ncbi.nhn.nih,gov/protein", insert -- ncbi.nlm.nih.gov/protein --

3. Column 7, Line 47, Brief Description of the Drawings paragraph, delete "In the accompanying drawings, reference characters refer to the same parts throughout the different views. The drawings are not necessarily to scale; emphasis has instead been placed upon illustrating the principles of the invention. Of the drawings:", insert -- In the accompanying drawings, reference characters refer to the same parts throughout the different views. The drawings are not necessarily to scale; emphasis has instead been placed upon illustrating the principles of the invention. The patent or application file contains at least one drawing executed in color. Copies of this patent or patent application publication with color drawing)s) will be provided by the Office upon request and payment of the necessary fee. Of the drawings: --

4. Column 16, Line 54, delete "Oligonueleotides", insert -- Oligonucleotides --

Signed and Sealed this
Eleventh Day of November, 2025

John A. Squires
*Director of the United States Patent and Trademark Office*